United States Patent
Adams et al.

(10) Patent No.: US 8,613,297 B2
(45) Date of Patent: Dec. 24, 2013

(54) FUEL SUPPLY SYSTEMS HAVING OPERATIONAL RESISTANCE

(75) Inventors: Paul Adams, Monroe, CT (US);
Andrew J. Curello, Hamden, CT (US);
Floyd Fairbanks, Naugatuck, CT (US);
Anthony Sgroi, Wallingford, CT (US)

(73) Assignee: Societe BIC, Clichy Cedex (FR)

( * ) Notice: Subject to any disclaimer, the term of this patent is extended or adjusted under 35 U.S.C. 154(b) by 1467 days.

(21) Appl. No.: 11/816,458

(22) PCT Filed: Feb. 16, 2005

(86) PCT No.: PCT/US2005/004826
§ 371 (c)(1),
(2), (4) Date: Aug. 16, 2007

(87) PCT Pub. No.: WO2006/088450
PCT Pub. Date: Aug. 24, 2006

(65) Prior Publication Data
US 2008/0145739 A1  Jun. 19, 2008

Related U.S. Application Data

(63) Continuation-in-part of application No. 10/978,949, filed on Nov. 1, 2004, now Pat. No. 7,762,278, which is a continuation-in-part of application No. 10/629,006, filed on Jul. 29, 2003, now Pat. No. 7,537,024.

(51) Int. Cl.
*B65B 1/04* (2006.01)
*F16N 5/02* (2006.01)

(52) U.S. Cl.
CPC .................................. *F16N 5/02* (2013.01)

USPC ............ 141/347; 141/20; 141/346; 141/354; 141/366

(58) Field of Classification Search
USPC ........................ 141/3, 20, 346, 347, 351–354, 141/363–366; 251/149.1
See application file for complete search history.

(56) References Cited

U.S. PATENT DOCUMENTS

| | | |
|---|---|---|
| 4,458,587 A | 12/1985 | Jennings |
| 5,390,702 A | 2/1995 | Smith, III |

(Continued)

FOREIGN PATENT DOCUMENTS

| | | |
|---|---|---|
| DE | 19836503 A1 | 2/2000 |
| EP | 0206517 B1 | 3/1990 |

(Continued)

OTHER PUBLICATIONS

Extended European Search Report issued in connection with the corresponding European Patent Application No. 11194757.8 on Apr. 4, 2012.

(Continued)

*Primary Examiner* — Timothy L Maust
(74) *Attorney, Agent, or Firm* — The H.T. Than Law Group

(57) ABSTRACT

Fuel supplies including multiple valve components and fuel cell systems having increased operational resistance to the insertion and/or removal of fuel supplies are disclosed. The increased operational resistance is provided by increased insertion or removal forces, multiple relative motions for insertion and/or removal, latches, actuators, ON/OFF switches, cognitive ability of the user, visual alignment, audio feedback, size of the user's hand, inter alia.

40 Claims, 45 Drawing Sheets

(56) References Cited

U.S. PATENT DOCUMENTS

| | | | |
|---|---|---|---|
| 5,398,723 | A | 3/1995 | Allread et al. |
| 5,429,155 | A | 7/1995 | Brzyski et al. |
| 5,971,019 | A | 10/1999 | Imai |
| 5,976,725 | A | 11/1999 | Gamo |
| 6,131,540 | A | 10/2000 | Bronkal |
| 6,250,348 | B1 | 6/2001 | Reinholdt |
| 6,326,097 | B1* | 12/2001 | Hockaday ............... 429/417 |
| 6,670,067 | B2* | 12/2003 | Sato et al. ............... 429/443 |
| 6,786,254 | B1* | 9/2004 | Kralick ............... 141/287 |
| 6,824,911 | B2* | 11/2004 | Franklin ............... 429/446 |
| 6,828,049 | B2* | 12/2004 | Bullock et al. ............... 429/432 |
| 6,924,054 | B2* | 8/2005 | Prasad et al. ............... 429/416 |
| 7,004,207 | B2* | 2/2006 | Finkelshtain et al. ............... 141/2 |
| 7,115,335 | B2* | 10/2006 | Eggum ............... 429/443 |
| 7,128,106 | B2* | 10/2006 | Becerra et al. ............... 141/349 |
| 7,757,731 | B2* | 7/2010 | Muller et al. ............... 141/349 |
| 7,968,250 | B2* | 6/2011 | Kaschmitter et al. ............... 429/515 |
| 8,047,229 | B2* | 11/2011 | Adams et al. ............... 137/614.03 |
| 2002/0022171 | A1 | 2/2002 | Saito et al. |
| 2003/0082427 | A1 | 5/2003 | Prasad et al. |
| 2003/0137193 | A1 | 7/2003 | Belschner et al. |
| 2003/0198846 | A1 | 10/2003 | Franklin |
| 2004/0023081 | A1 | 2/2004 | Ushiro et al. |
| 2004/0081884 | A1 | 4/2004 | Bean et al. |
| 2004/0096721 | A1 | 5/2004 | Ohlsen et al. |
| 2004/0115495 | A1 | 6/2004 | Asai et al. |
| 2004/0131903 | A1 | 7/2004 | Shioya |
| 2004/0209142 | A1 | 10/2004 | Becerra et al. |
| 2004/0247960 | A1 | 12/2004 | Sato et al. |
| 2005/0008903 | A1 | 1/2005 | Bourilkov et al. |
| 2005/0008908 | A1 | 1/2005 | Kaye et al. |
| 2005/0022883 | A1 | 2/2005 | Adams et al. |
| 2005/0147864 | A1 | 7/2005 | Eggum |
| 2006/0172171 | A1 | 8/2006 | Deinzer et al. |
| 2007/0065706 | A1 | 3/2007 | Adams et al. |

FOREIGN PATENT DOCUMENTS

| | | |
|---|---|---|
| EP | 0927849 A | 7/1999 |
| EP | 1291947 A1 | 3/2003 |
| EP | 1306919 A2 | 5/2003 |
| EP | 1313160 A1 | 5/2003 |
| EP | 1434296 A1 | 6/2004 |
| EP | 1463137 A2 | 9/2004 |
| EP | 2236423 A2 | 10/2010 |
| FR | 2549141 A1 | 1/1985 |
| GB | 2275324 A | 8/1994 |
| JP | 2002081589 A | 3/2002 |
| JP | 2002372228 A | 12/2002 |
| RU | 1789793 A1 | 1/1993 |
| RU | 8321 U1 | 11/1998 |
| RU | 2159598 C1 | 11/2000 |
| RU | 2169285 C2 | 6/2001 |
| RU | 31573 U1 | 8/2003 |
| RU | 2245491 C2 | 1/2005 |
| SU | 469080 A | 7/1975 |
| SU | 922395 A | 4/1982 |
| SU | 1732101 A1 | 5/1992 |
| SU | 1789793 A1 | 1/1993 |
| TW | 497285 | 8/2002 |
| TW | 543220 | 7/2003 |
| TW | 552736 | 9/2003 |
| WO | 03075637 A2 | 9/2003 |
| WO | 2004050798 A2 | 6/2004 |
| WO | 2004051781 A1 | 6/2004 |
| WO | 2005069882 A2 | 6/2004 |
| WO | 2006050261 A2 | 5/2006 |

OTHER PUBLICATIONS

Extended European Search Report issued in connection with the corresponding European Patent Application No. 11194759.4 on Apr. 4, 2012.
European Search Report issued in connection with corresponding European Patent Application No. 05723113.6 on Sep. 23, 2009.
Translated Abstract for JP 2002081589 A1.
International Search Report and Written Opinion for PCT/US05/04826, mailed on Oct. 13, 2005.
International Preliminary Examination Report for PCT/US05/04826, mailed on Oct. 4, 2006.
Extended European Search Report issued in connection with the corresponding European Patent Application No. 11194738.8 on Mar. 29, 2012.
Extended European Search Report issued in connection with the corresponding European Patent Application No. 11194745.3 on Mar. 29, 2012.
Extended European Search Report issued in connection with the corresponding European Patent Application No. 11194747.9 on Mar. 29, 2012.
Extended European Search Report issued in connection with the corresponding European Patent Application No. 11194748.7 on Mar. 29, 2012.
Taiwanese search report.
English translation of JP 2002372228.
Original Office Action, issued in connection with corresponding Russian Patent Application No. 2007133913, and translation thereof.
Translation for FR 2549141 A1.
Translated Abstract for RU 2245491 C2.
Translated Abstract for DE 19836503 A1.

* cited by examiner

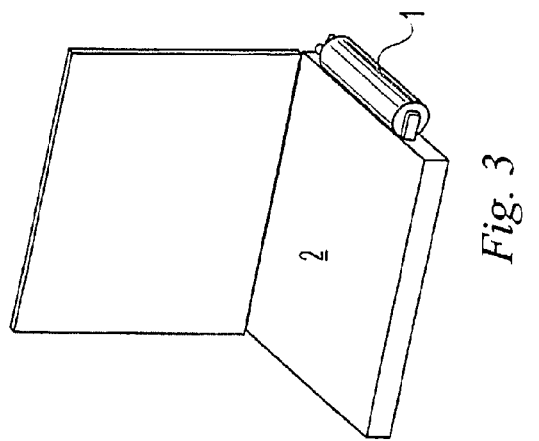
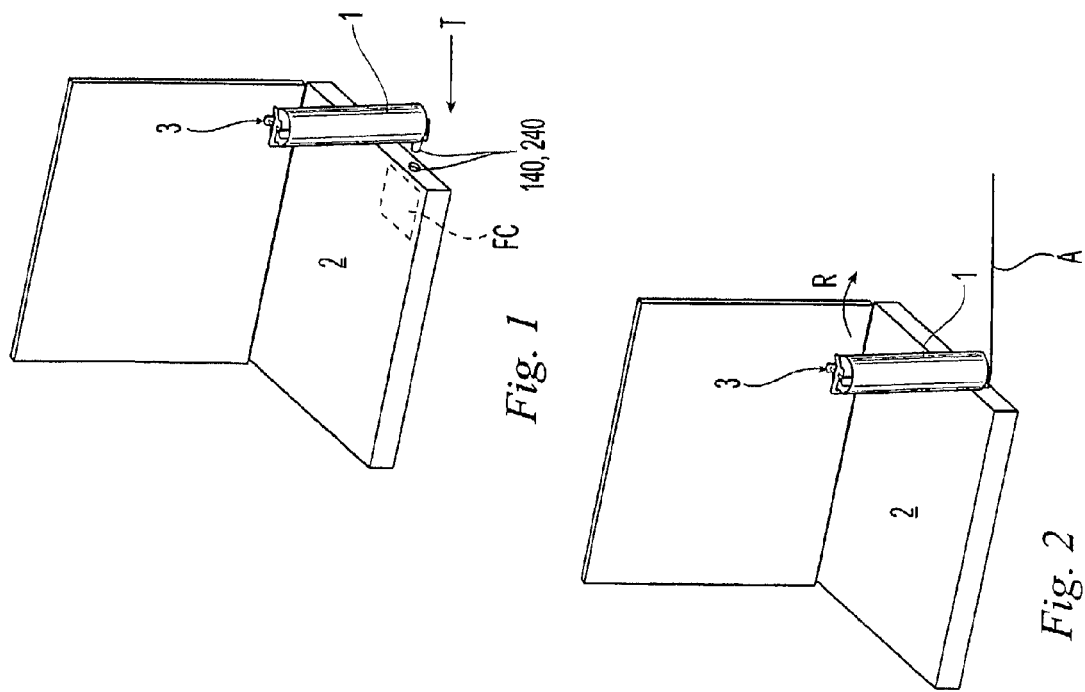

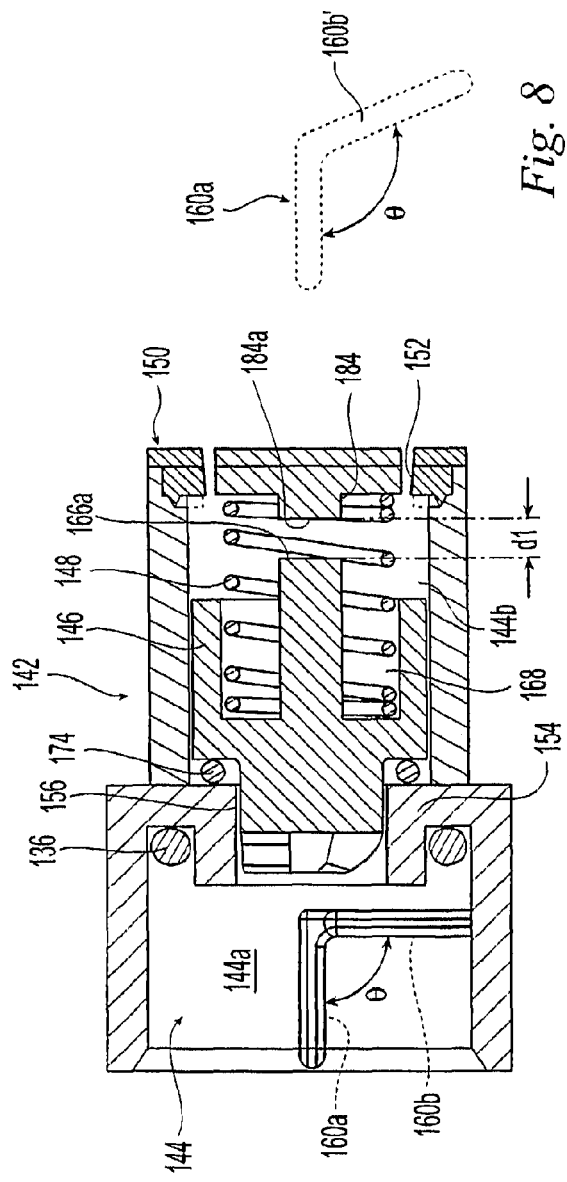
Fig. 7
Fig. 8
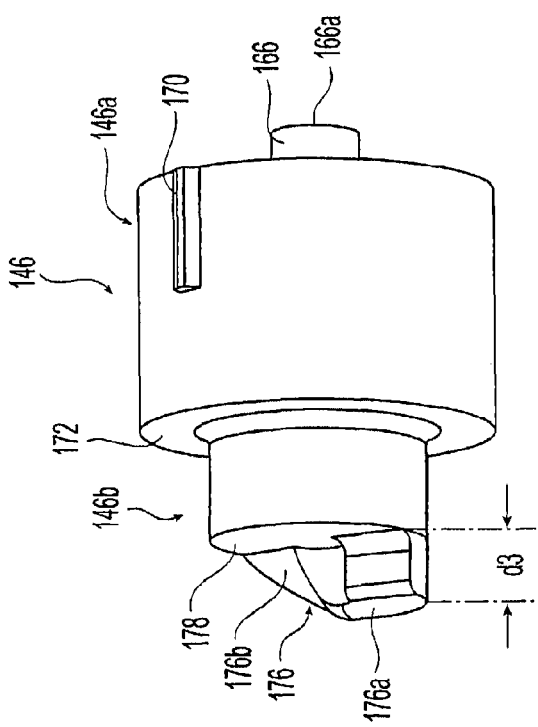
Fig. 9

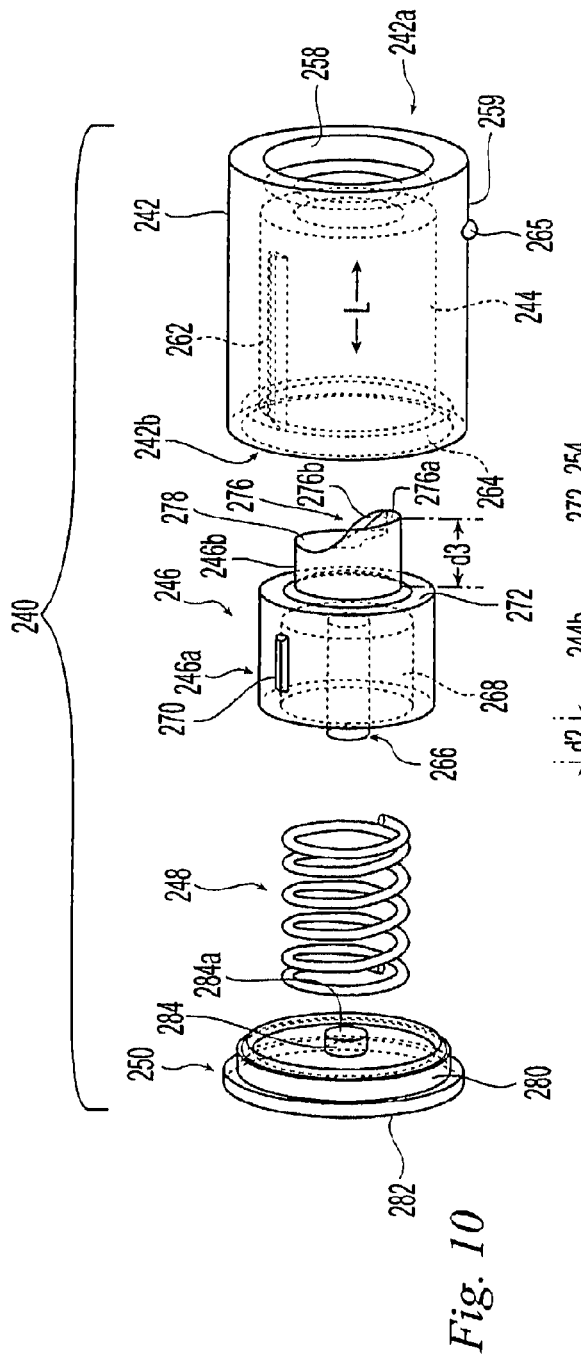
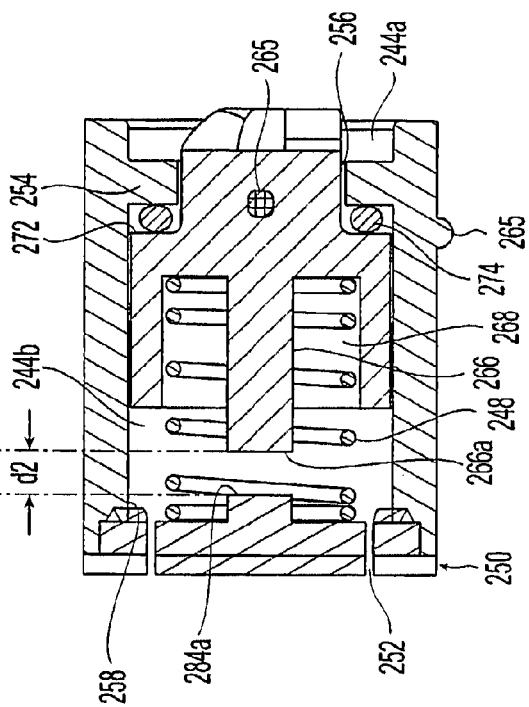
Fig. 10
Fig. 11

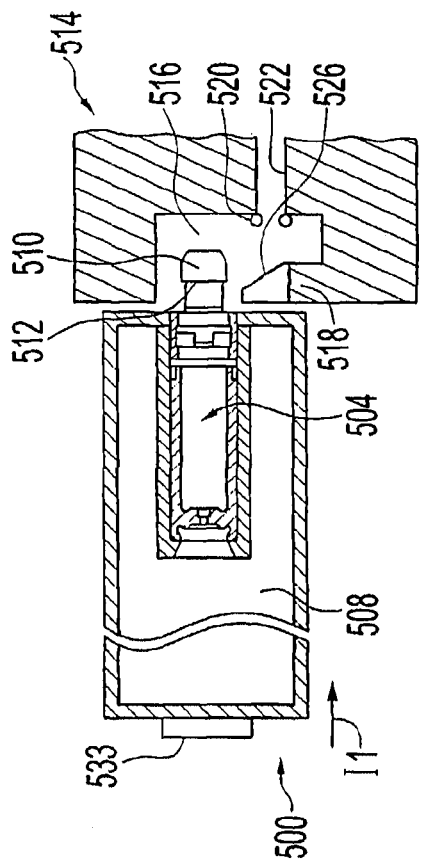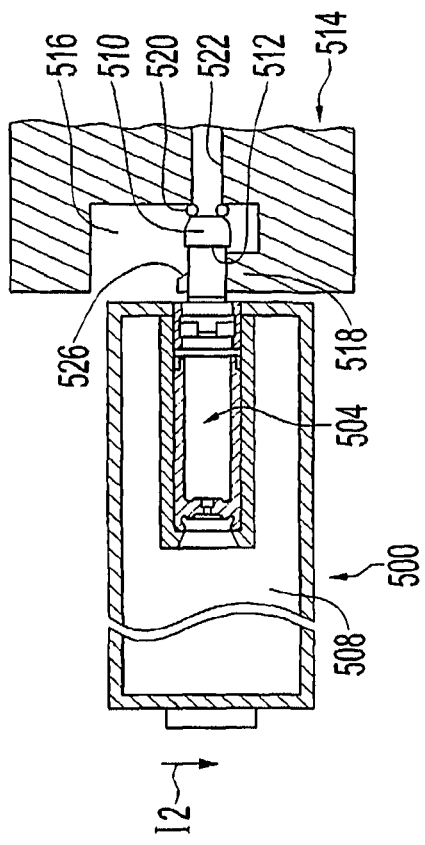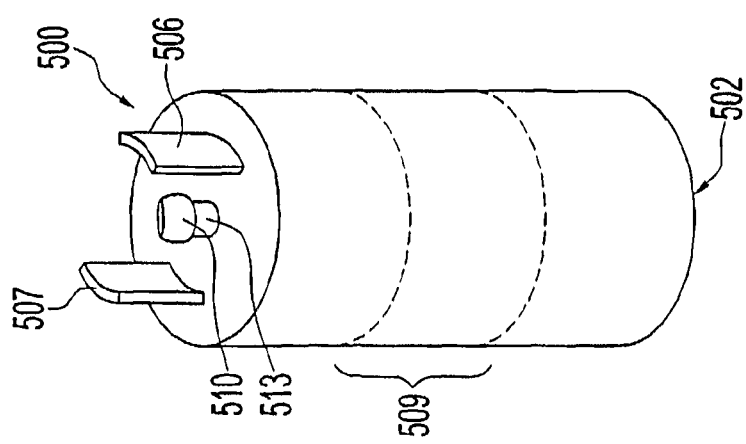

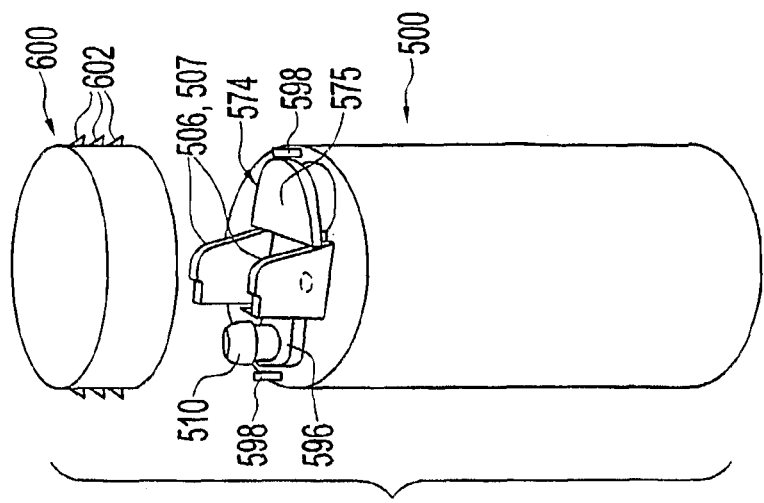
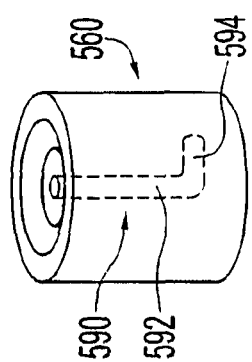
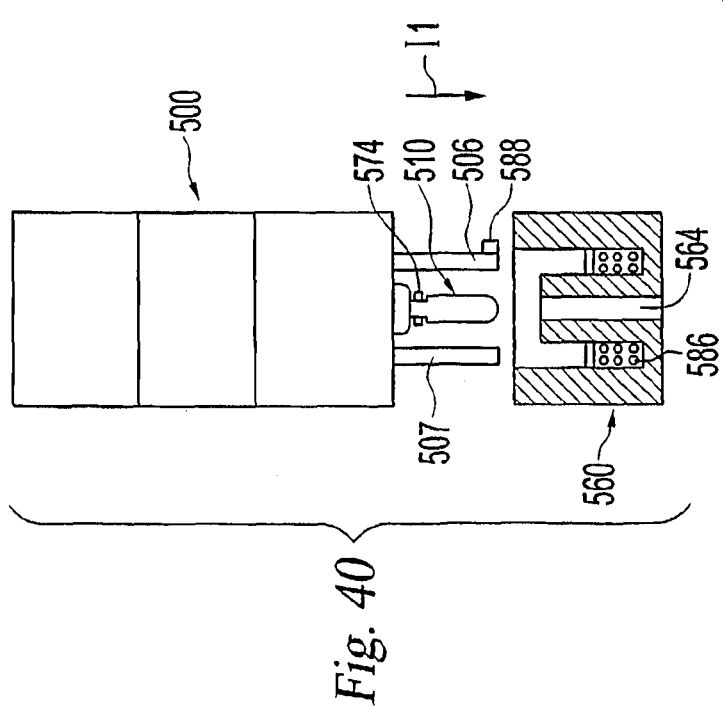

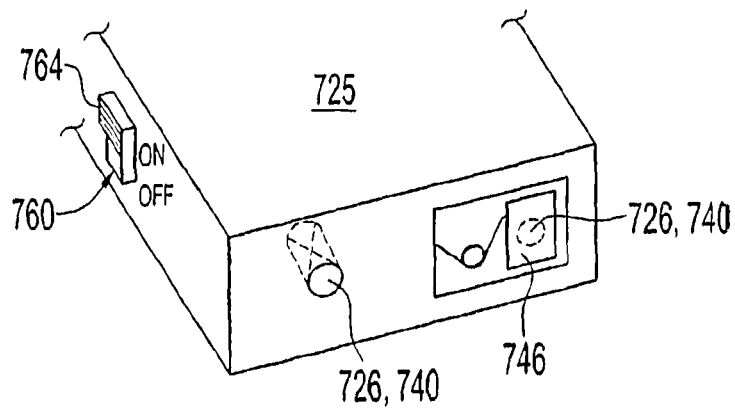
Fig. 85
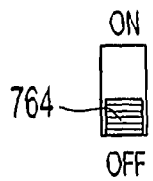
Fig. 86A
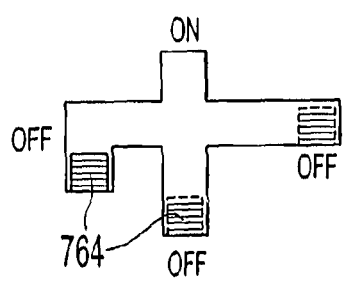
Fig. 86C
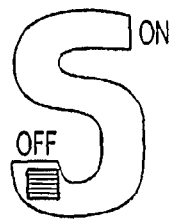
Fig. 86D
Fig. 86B
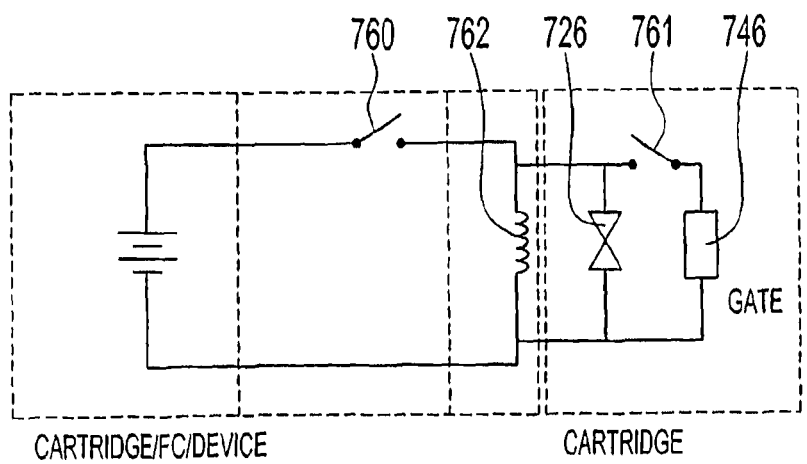
Fig. 87

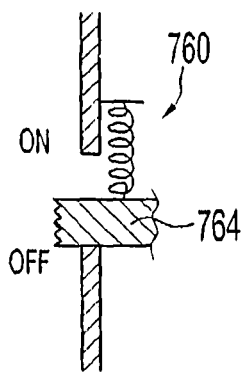
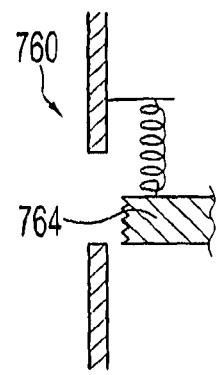
*Fig. 88A*    *Fig. 88B*
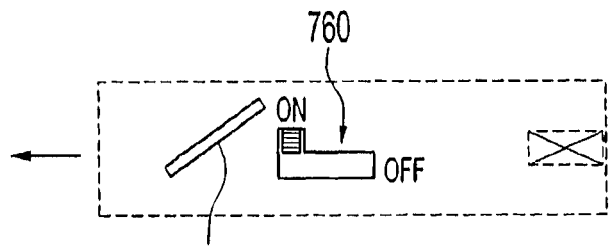
*Fig. 89A*
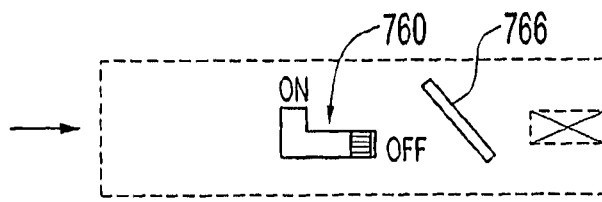
*Fig. 89B*
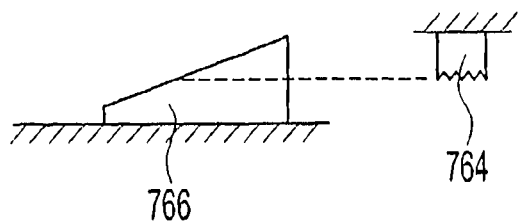
*Fig. 90*

FUEL SUPPLY SYSTEMS HAVING OPERATIONAL RESISTANCE

CROSS-REFERENCE TO RELATED APPLICATIONS

This application is a continuation-in-part of co-pending patent application entitled "Valves for Fuel Cartridges," bearing application Ser. No. 10/978,949, filed on Nov. 1, 2004, which is a continuation-in-part of co-pending patent application entitled "Fuel Cartridge with Connecting Valve," bearing application Ser. No. 10/629,006, filed on Jul. 29, 2003. The disclosure of the '949 application and the '006 application are incorporated by reference herein in their entireties.

FIELD OF THE INVENTION

This invention generally relates to fuel supply systems for various fuel cells, more specifically, the present invention relates to fuel supply systems having higher operational resistance.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel, (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel, (iii) PEM fuel cells that can consume non-hydrogen fuel directly or direct oxidation fuel cells and (iv) solid oxide fuel cells (SOFC) that directly convert hydrocarbon fuels to electricity at high temperature.

Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell, and also has promising power application for consumer electronic devices. Solid oxide fuel cells (SOFC) convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH+H_2O \rightarrow CO_2+6H^++6e^-$$

Half-reaction at the cathode:

$$1.5O_2+6H^++6e^- \rightarrow 3H_2O$$

The overall fuel cell reaction:

$$CH_3OH+1.5O_2 \rightarrow CO_2+2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Another fuel cell reaction for a metal hydride, such as sodium borohydride, reformer fuel cell is as follows:

$$NaBH_4+2H_2O \rightarrow (\text{heat or catalyst}) \rightarrow 4(H_2)+(NaBO_2)$$

Half-reaction at the anode:

$$H_2 \rightarrow 2H^++2e^-$$

Half-reaction at the cathode:

$$2(2H^++2e^-)+O_2 \rightarrow H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference.

In a direct borohydride fuel cell (DBFC), the reaction is as follows:

Half-reaction at the anode:

$$BH_4-+8OH- \rightarrow BO_2-+6H_2O+8e-$$

Half-reaction at the cathode:

$$2O_2+4H_2O+8e- \rightarrow 8OH-$$

One of the most important features for fuel cell application is fuel storage. Another important feature is to regulate the transport of fuel out of the fuel cartridge to the fuel cell. To be commercially useful, fuel cells such as DMFC systems should have the capability of storing sufficient fuel to satisfy the consumers' normal usage. For example, for mobile or cell phones, for notebook computers, and for personal digital assistants (PDAs), fuel cells need to power these devices for at least as long as the current batteries, and preferably much longer. Additionally, the fuel cells should have easily replaceable or refillable fuel tanks to minimize or obviate the need for lengthy recharges required by today's rechargeable batteries.

Valves are needed for transporting fuel between fuel cartridges, fuel cells and/or fuel refilling devices. The known art discloses various valves and flow control devices such as those described in U.S. Pat. Nos. 6,506,513 and 5,723,229 and in U.S. published application nos. 2003/0082427 and 2002/0197522.

Since the fuel stored in the fuel cartridges and transported through the valves can be caustic, a need exists for fuel supply systems which resist valve operation by unintended users.

SUMMARY OF THE INVENTION

The present invention is directed to fuel supply systems for fuel cells that have higher operational resistance to discourage operation by unintended users.

In accordance with one aspect of the present invention, the valve has two components. One is attachable to the fuel supply and the other one is attachable to either the fuel cell or the electronic device. The first and second valve components are movable in at least two directions relative to each other to establish the flow path, or are movable in a single motion with higher force. Moving in at least two directions preferably requires the user to have a predetermined level of cognitive abilities and/or physical characteristics in order to reduce the possibility of unintended operation. Such fuel supply systems are shown in for example FIGS. 1-15 and 17-24, among others. The various other embodiments that also require two movements of fuel supply with respect to the receptacle such as in the system of FIGS. 26-41 are of this type. Other embodiments require multiple motions to connect but a single motion to disconnect, as shown in FIGS. 93-96. Other embodiments have a first valve component that preferably would not open until the sealing plunger is moved, e.g., rotated, and a second valve component having a device capable of moving or rotating the sealing plunger in the first valve component, as shown in FIGS. 97-99. These systems can also be categorized in the ways, as shown below; thus, these categories are not mutually exclusive.

Another type of fuel supply system includes a first valve component and a second valve component connectable to the first valve component. The first valve component or nozzle is a part of the fuel supply and the second valve component or outlet is part of a receptacle. The receptacle can be mated to a fuel cell FC, a refilling device or an electronic device. The receptacle may also have an internal seal, such as a check valve. This fuel supply system may include an actuator for one of the valve components. In one embodiment, the fuel supply is removably connectable to the receptacle such that a flow path is selectively established between the nozzle and the outlet in the receptacle, and the actuator selectively opens the nozzle so that the flow path is established. The actuator can be a stationary wedge portion, as shown in FIGS. 26-27 and 33-34, a rotatable coupling member receiving the nozzle, as shown in FIGS. 33-39, or a pivotable actuator, as shown in FIGS. 36-37, 42, and et seq.

In order to provide operational resistance to unintended users, other fuel supply systems may employ shields to limit access to the nozzle, as shown in FIGS. 25, 28-29 and 31, covers that limit access to the nozzle, as shown in FIGS. 42-47, cartridge retention assemblies, as shown in FIG. 30, and various stop or latch members to block the actuator, as shown in FIGS. 47, 53-59, 65-79. Some covers require multiple motions to be removed before the nozzle can be accessed, as shown in FIG. 42b. Some latches can be located on the receptacle, as shown in FIG. 47, and some actuators are movable relative to the fuel supply, as shown in FIGS. 48-50.

Some of the latch members can be pivotable, as shown in FIGS. 65-79, and some can be multi-mode that requires at least one of two different actuation forces depending on the position of the latch member, as shown in FIGS. 76-79. Some latches may have multiple components, as shown in FIGS. 71-75. Some other latches need to be movable in multiple motions, as shown in FIGS. 54-59.

Other types of fuel supply systems may require multiple movements, e.g., at least in two directions, to remove the fuel supply from the receptacle, fuel cell or electronic device. The removal movements may be the same as the insertion movements, or may be different therefrom. Another type of fuel supply may require a high insertion force and/or a high removal force for connection, e.g., at least about 2.25 kg or 3 kg with a single or simple motion, as shown in FIGS. 45-46. Other fuel system may require a single insertion motion and multiple removal actions, or multiple insertion motions and single removal motion, as shown in FIGS. 93-96. Other fuel system may require two hands or two fingers for insertion or removal or both. Another fuel supply system requires a threshold cognitive ability to operate. Yet another fuel supply system requires a hand of certain size for connection.

Other fuel supply systems need visual alignment and/or audio confirmation to connect, as shown in FIGS. 80-81. Other systems have covers or gates shielding the valve, as shown in FIGS. 82-83, and these gates may limit the time that the valve is exposed for connection. Other fuel systems have ON/OFF mechanical or electronic switches to control access to the fuel, as shown in FIGS. 85-87. These switches can be moved in multiple directions to open, as shown in FIGS. 85-87, and they can be biased, as shown in FIG. 88. Some switches can be contacted and moved by the pulp of an adult user, as shown in FIG. 88b. The switches can be automatically turned OFF when the fuel supply is withdrawn or can be automatically turn ON when the fuel supply is inserted into the receptacle. The nozzle or valve component on the fuel supply can be located eccentrically relative to the center line of the fuel supply, as shown in FIGS. 80-81 and 91.

BRIEF DESCRIPTION OF THE DRAWINGS

In the accompanying drawings, which form a part of the specification and are to be read in conjunction therewith and in which like reference numerals are used to indicate like parts in the various views:

FIGS. 1-4 illustrate a fuel supply equipped with a valve component of FIGS. 6-16 being inserted into an exemplary electronic host device;

FIG. 7 is an enlarged, cross-sectional view of the valve component of FIG. 6 in an assembled state with a plunger at an initial position;

FIG. 8 is an enlarged, plan view of an alternative groove for use on the valve component of FIG. 7;

FIG. 9 is an enlarged, perspective view of the plunger of valve component of FIG. 6;

FIG. 10 is an exploded, perspective view of a second connecting valve component suitable for use with the first valve component of FIG. 6;

FIG. 11 is an enlarged, cross-sectional view of the valve component of FIG. 10 in an assembled state with a plunger at an initial position;

FIG. 25 is a perspective view of an alternative preferred embodiment of a fuel cartridge;

FIGS. 26-27 are cross-sectional views of the fuel cartridge of FIG. 25 and a receptacle, wherein the fuel cartridge and a valve assembly are in an intermediate state and a fully installed state, respectively;

FIG. 40 is a partial, cross-sectional view of a fuel cartridge with a modified nozzle and modified coupling member, wherein the fuel cartridge is in an uninstalled position;

FIG. 41 is a perspective view of the modified coupling member of FIG. 40;

FIG. 42A is a perspective view of a modified fuel cartridge with a pivotable actuator and a cover.

FIG. 85 is a partial perspective view of a cartridge of the present invention with an on/off switch and a valve or gate;

FIGS. 86A-D show exemplary switch configurations;

FIG. 87 is a schematic electrical circuit showing the possible locations and connections of the cartridge of FIG. 85;

FIGS. 88A-B are partial cross-sectional views of a spring-biased switch.

FIG. 89A is a schematic side view of the cartridge of FIG. 85 or FIG. 87 being withdrawn from the device; FIG. 89B is a schematic side view of the cartridge of FIG. 85 or FIG. 87 being inserted into the device;

FIG. 90 is a comparative side view of a ramp shown in FIG. 89A adapted to return the switch to OFF position when the cartridge is withdrawn;

DETAILED DESCRIPTION OF THE PREFERRED EMBODIMENTS

Figure 5:
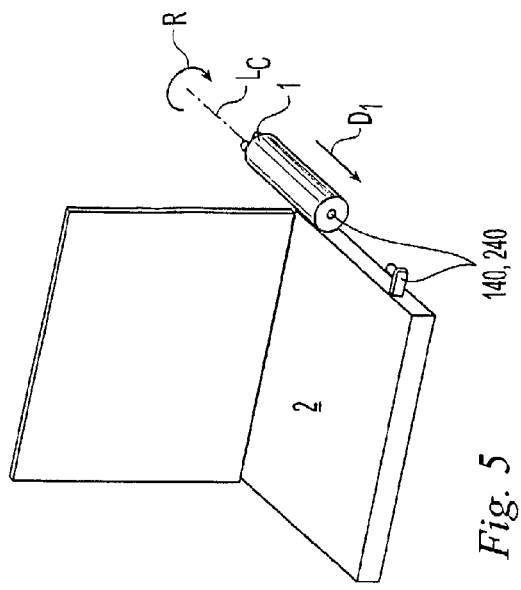
FIG. 5 illustrates an alternative embodiment of the fuel supply equipped with the valve component of FIGS. 6-16.
Figure 4:
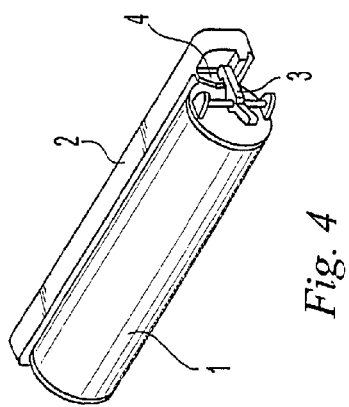

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydrides, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a blend or mixture of methanol, sodium borohydride, an electrolyte and other compounds, such as those described in U.S. Pat. Nos. 6,554,877, 6,562,497 and 6,758,871, which are incorporated by reference in their entireties. Fuels also include those that are partially dissolved in solvent and partially suspended in solvent, described in U.S. Pat. No. 6,773,470 and those that include both liquid fuel and solid fuels, described in United States published patent application number 2002/076602. These references are also incorporated by reference in their entireties.

Fuels also include a metal hydride such as sodium borohydride ($NaBH_4$) and water, discussed above and the low pressure, low temperature produced by such reaction. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002) at pp. 20-25. As used in the present application, the term "fuel cell" also includes microengines. Other applications include storing traditional fuels for internal combustion engines, and hydrocarbons, such as butane for pocket and utility lighters and liquid propane.

As used herein, the term "receptacle" includes but not limited to any feature or element that receives a fuel supply or a valve from the fuel supply. This term further includes device or element that forms a cavity on the electronic device or fuel cell or protrudes therefrom or forms on a face thereof, or a combination thereof. Exemplary receptacles include valves, alignment features, retention features and electrical interface. All of which may be protruding, recessed or located on a surface of the electronic device or fuel cell.

Suitable fuel supplies include those disclosed in commonly owned, co-pending U.S. patent application Ser. No. 10/356, 793, entitled "Fuel Cartridge for Fuel Cells," filed on Jan. 31, 2003. The disclosure of this application is hereby incorporated in its entirety.

Broadly, fuel supply systems of the present invention include cooperating valve components. One valve component can be mated to a fuel cartridge containing fuel and the other valve component can be mated to a fuel cell FC, a refilling device or an electronic device powered by the fuel cell. The present invention generally applies to several types of fuel supply systems. One type of fuel supply system includes a first valve component and a second valve component connectable to the first valve component such that a flow path is established through the first and second valve components. As used herein, "valve components" include, but are not limited to, valve components having a seal, such as check valves, duckbill valves, electrical valves (e.g., solenoid valves), magnetic valve and washer with a closed slit (also known as septum), and valve components with no seal, such as an open tube, an outlet or a piercing needle. At least one of the valve components should have an internal seal. For example, a suitable valve may comprise one valve component having an internal seal and the other valve component having an open conduit so that when the internal seal opens a flow path is established there through. Suitable valve components are discussed in the parent application, in the '006 parent patent application and in United States Pub. Pat. Appl. No. 2003/0082427. All of these references are incorporated herein by reference in their entireties.

An embodiment of a suitable fuel cell cartridge is shown in FIG. 1. Cartridge or fuel supply 1 may contain any type of fuel cell fuels, as discussed above.

Referring to FIGS. 1-5, fuel supply 1 has one of valve components 140 or 240 and electronic host device 2 is equipped with the other valve component. First, fuel supply 1 is positioned relative to device 2 so that valve components 140 and 240 are aligned with each other (as shown in FIG. 1). Then, fuel supply 1 and/or electronic device 2 are moved relative to each other along translational direction T so that valve components 140, 240 are inserted into each other. Thereafter, fuel supply 1 and device 2 are moved rotationally relative to each other in direction R about axis A so that cam surfaces 176, 276 (shown in FIGS. 7 and 10) in valve components 140, 240 act on each other to establish fluid communication between valve components 140 and 240. The fuel supply 1 is shown after rotation in direction R in FIGS. 3 and 4. At this point, fuel can be pumped or otherwise transported from fuel supply 1 to a fuel cell FC inside device 2. While a translational movement and a rotational movement are illustrated in FIGS. 1-3, it will be noted that any combination of two or more movements can be employed to connect fuel supply 1 to electronic host device 2 or to fuel cell FC. For example, two translational movements, two rotational movements or one translational and one rotational movement in any order can be used. Additionally, different locking and unlocking mechanisms for fuel supply 1 and electronic device 2 could be designed/implemented that require different components and operations or motions than those discussed herein to release fuel supply 1.

Optionally, fuel supply 1 can also have latch 3 located thereon, so that after fluid communication is established between valve components 140, 240, latch 3 can mate with corresponding ledge 4 located on electronic host device 2 to hold fuel supply 1 in place. While latch 3 is illustrated to be rotationally mounted on fuel supply 1 and is hooked at one end to lock with ledge 4, latch 3 can have any configuration and can be connected or supported in any manner to fuel supply 1. For example, latch 3 can be an arm integrally connected to fuel supply 1, such that when a moment is applied to the arm the arm bends to lock with ledge 4.

In the alternative embodiment, shown in FIG. 5, fuel supply 1 has one of valve components 140 or 240 and electronic host device 2 is equipped with the other valve component. First, fuel supply 1 is positioned relative to device 2 so that valve components 140 and 240 are aligned with each other. Then, fuel supply 1 and/or electronic device 2 are moved relative to each other along translational direction D1 so that valve components 140, 240 are inserted into each other. Thereafter, fuel supply 1 and device 2 are moved rotationally relative to each other in direction R about cartridge axis $L_C$ so that cam surfaces 176, 276 (shown in FIGS. 7 and 10) in valve components 140, 240 act on each other to establish fluid communication between valve components 140 and 240. At this point, fuel can be pumped or otherwise transported from fuel supply 1 to a fuel cell inside device 2.

Cartridge axis $L_C$ can be co-axial with axis A, as shown in FIG. 5 or non co-axial with axis A, as shown in FIG. 2, where cartridge axis $L_C$ is substantially perpendicular to axis A.

Figure 6:
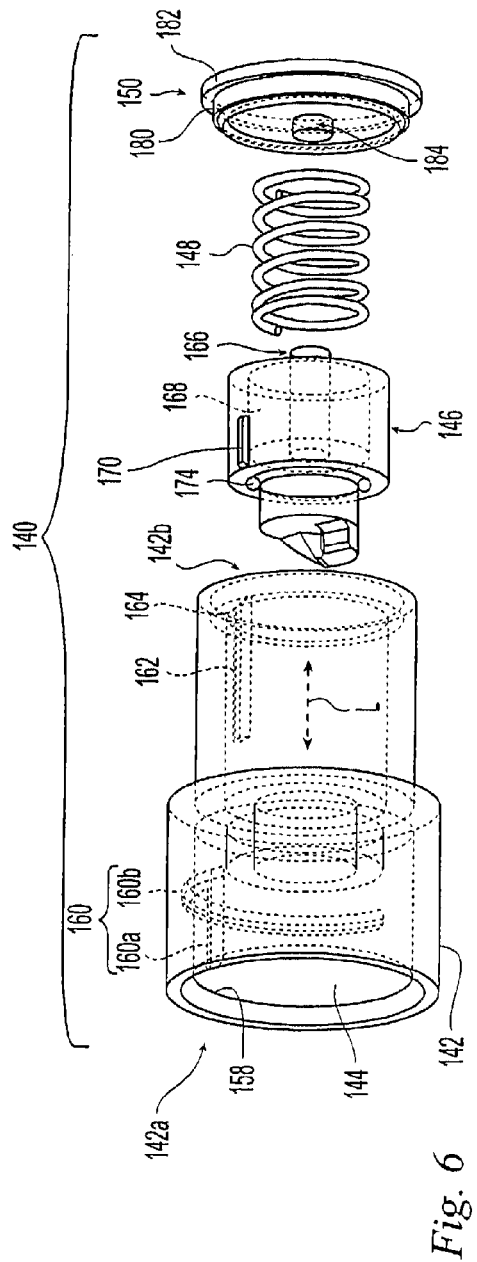
FIG. 6 is an exploded, perspective view of a first connecting valve component according to another aspect of the present invention.

FIG. 6 illustrates one embodiment of first valve component 140 forming connecting valve, designated as V (See FIG. 12) with second valve component 240, shown in FIG. 10. First valve component 140 can be mated to cartridge 1 or to the fuel cell FC, the refilling device or the electronic device as illustrated in FIG. 1.

First valve component 140 comprises a main housing 142 that defines stepped chamber 144. Plunger 146, spring 148, and portions of end cap 150 are received within chamber 144. Plunger 146 is movable in longitudinal direction L within chamber 144 with respect to main housing 142. End cap 150, however, is removably or irremovably fixed to main housing 142. In one preferred embodiment, end cap 150 can be snap fitted or ultrasonically welded to main housing 142. Alternatively, these components can be joined by adhesive bonding, ultrasonic bonding, welding, spin welding, radio frequency welding, heat sealing, or the like. End cap 150 defines a plurality of openings 152, as shown in FIG. 7, for fuel to flow therethrough.

Referring to FIGS. 6 and 7, main housing 142 further includes radially-inwardly extending wall 154 that divides chamber 144 into external chamber portion 144a and internal chamber portion 144b. Wall 154 includes opening 156 to allow fluid communication between the external and internal chamber portions 144a and b. External O-ring 136 is located on exterior side of radial wall 154. Alternatively, O-ring 136 can be located on valve component 240.

Inner surface 158 of main housing 142 near first end 142a includes groove 160 (shown in phantom) with longitudinally extending section 160a (shown in phantom) and circumferentially extending section 160b (shown in phantom). Preferably, the angle Θ between section 160a and first portion of section 160b, as shown in FIG. 7, is about 90°. In an alternative embodiment, as shown in FIG. 8, the angle Θ between section 160a and first portion of section 160b' is greater than about 90°. The advantage of the configuration of FIG. 8 will be discussed below.

Inner surface 158 of main housing 142 near second end 142b includes longitudinally extending groove 162 (shown in phantom). Main housing 142 near second end 142b further includes circumferentially extending recess 164 (shown in phantom).

With reference to FIGS. 6-9, plunger 146 includes enlarged diameter portion 146a and reduced diameter portion 146b. Enlarged portion 146a includes longitudinally extending rod 166 circumferentially surrounded by chamber 168. Rod 166 includes free end 166a. The outer surface of enlarged diameter portion 146a includes longitudinally extending projection rib 170. Radially extending surface 172 of enlarged portion 146a receives inner O-ring 174.

Reduced diameter portion 146b includes cam surface 176 projecting from surface 178. The distance between free end 176a of cam surface 176 and surface 178 is designated d3. Cam surface 176 further includes ramped portion 176b. With reference to FIG. 6, end cap 150 includes outer ring 180 projecting from wall 182. End cap 150 further includes rod 184 projecting from wall 182 and centrally spaced from and coaxially aligned with ring 180. Rod 184 includes free end 184a.

With reference to FIGS. 6-9 when plunger 146 is placed in main housing 142, rib 170 of plunger 146 is received in groove 162 of main housing 142 to assure proper alignment of plunger 146 with main housing 142. Enlarged diameter portion 146a of plunger 146 is received in inner chamber portion 144b of main housing 142 and reduced diameter portion 146b of plunger 146 extends through opening 156. Next, spring 148 is installed within plunger inner chamber 168 surrounding rod 166. Then, end cap 150 is connected to main housing 142 so that spring 148 also surrounds end cap rod 184 and such that ring 180 is received in recess 164 of main housing 142.

The parts of valve component 140 are configured such that in an initial or seal position, spring 148 biases plunger 146 and consequently inner O-ring 174 into sealing engagement with radial wall 154. Also in the initial or seal position, plunger 146 is spaced from end cap 150 so that distance d1 extends between plunger rod free end 166a and end cap rod free end 184a.

With reference to FIG. 10, second valve component 240 comprises main housing 242 that defines chamber 244. Plunger 246, spring 248, and portions of end cap 250 are received within chamber 244. Plunger 246 is movable in longitudinal direction L within chamber 244 with respect to housing 242. End cap 250, however, is removably or irremovably fixed to housing 242. In one preferred embodiment, end cap 250 is ultrasonically welded to main housing 242. Alternatively, these components can be joined by adhesive bonding, ultrasonic bonding, snap fitting, welding, radio frequency welding, heat sealing, or the like. End cap 250 defines a plurality of openings 252, as shown in FIG. 11, for fuel to pass through.

Referring to FIGS. 10-11, main housing 242 further includes radially-inwardly extending wall 254 that divides chamber 244 into external chamber portion 244a and internal chamber portion 244b. Wall 254 includes opening 256 to allow fluid communication between external and internal chamber portions 244a, b. Housing 242 further includes inner surface 258 and first end 242a. Inner surface 258 of main housing 242 near second end 242b includes longitudinally extending groove 262 (shown in phantom). The interior of main housing 242 near second end 242b further includes circumferentially extending recess 264 (shown in phantom). Projecting pin 265 extends from outer surface 259 of main housing 242. More than one pin 265 and corresponding groove 260 may be present.

Plunger 246 is similar to plunger 146 and includes enlarged diameter portion 246a and narrow diameter portion 246b. Enlarged diameter portion 246a includes longitudinally extending rod 266 circumferentially surrounded by internal chamber 268. Rod 266 includes free end 266a. The outer surface of enlarged diameter portion 246a includes longitudinally extending projection rib 270. Radially extending surface 272 of enlarged portion 246a receives inner O-ring 274.

Reduced diameter portion 246b includes cam surface 276 projecting from surface 278. The distance between free end 276a of cam surface 276 and surface 272 is designated d3. Cam surface 276 further includes ramped portion 276b. With reference to FIG. 10, end cap 250 includes outer ring 280 projecting from wall 282. End cap 250 further includes rod 284 projecting from wall 282 and centrally spaced from and coaxially aligned with ring 280. Rod 284 includes free end 284a.

When plunger 246 is inside main housing 242, rib 270 is received in groove 262 to assure proper alignment of plunger 246 with main housing 242. Enlarged portion 246a of plunger 246 is received in inner chamber portion 244b of main housing 242 and reduced diameter portion 246b of plunger 246 extends through opening 256. Next, spring 248 is inserted within plunger inner chamber 268 surrounding rod 266. Then, end cap 250 is connected to main housing 242 so that spring 248 also surrounds end cap rod 284 and such that ring 280 is received in recess 264 of main housing 242.

With reference to FIG. 11, the parts of valve component 240 are configured such that in an initial position, spring 248 biases plunger 246 and consequently O-ring 274 into sealing engagement with radial wall 254. Also in the initial or sealed position, plunger 246 is spaced from end cap 250 so that distance d2 exists between plunger rod free end 266a and end cap rod free end 284a.

Figure 14:
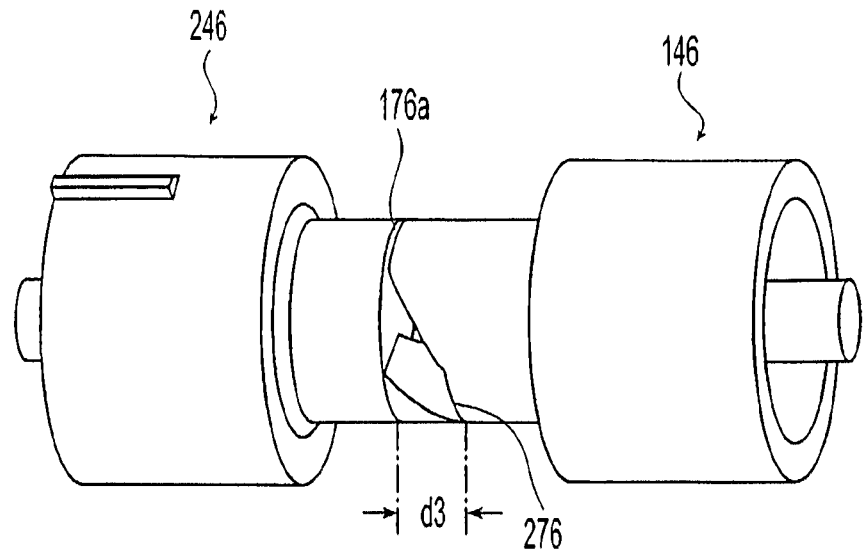
FIG. 14 is an enlarged, perspective view of the plungers of the valve components of FIG. 13, wherein the plungers are in the initial positions.

Referring to FIGS. 7, 11 and 14, operation of the valve V will now be discussed. As shown below, valve component 240 is attached to the fuel cell or the device, while valve component 140 is attached to the cartridge. However, the arrangement can also be reversed. The following table summarizes the operation of valve V:

| Step | Relative Movement of Housing 142 to Housing 242 | Valve Component 240 on Device | Valve Component 140 on Cartridge |
|---|---|---|---|
| 1 | Longitudinal | Closed | Closed |
| 2 | Partial Rotational | Closed | Closed |
| 3 | Partial Rotational | Open | Closed |
| 4 | Partial Rotational | Open | Open |

Figure 12:
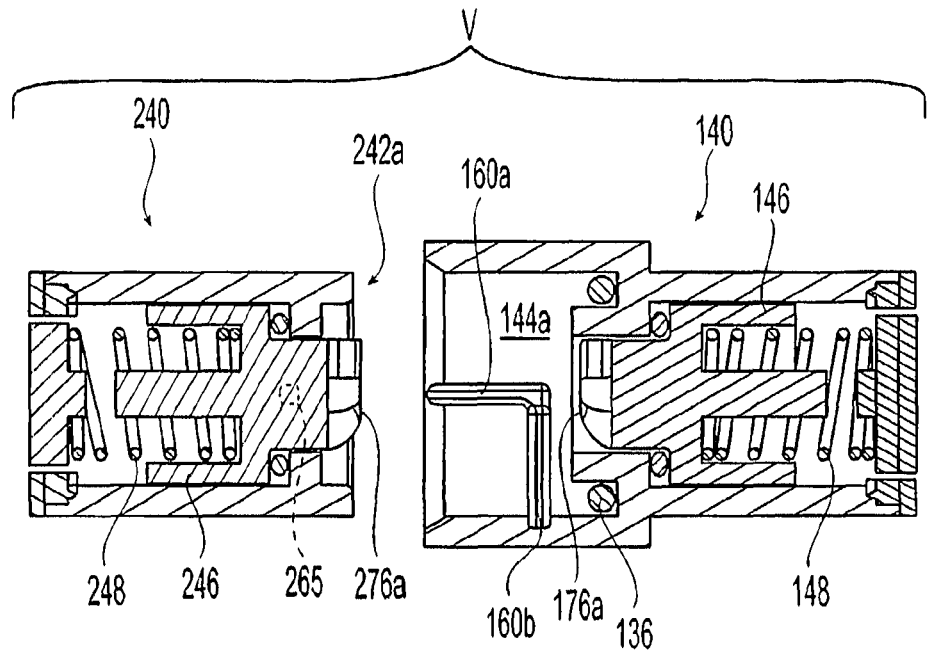
FIG. 12 is an enlarged, cross-sectional view of the first and second valve components of FIGS. 6 and 10, wherein the components are unconnected and out of contact.
Figure 13:
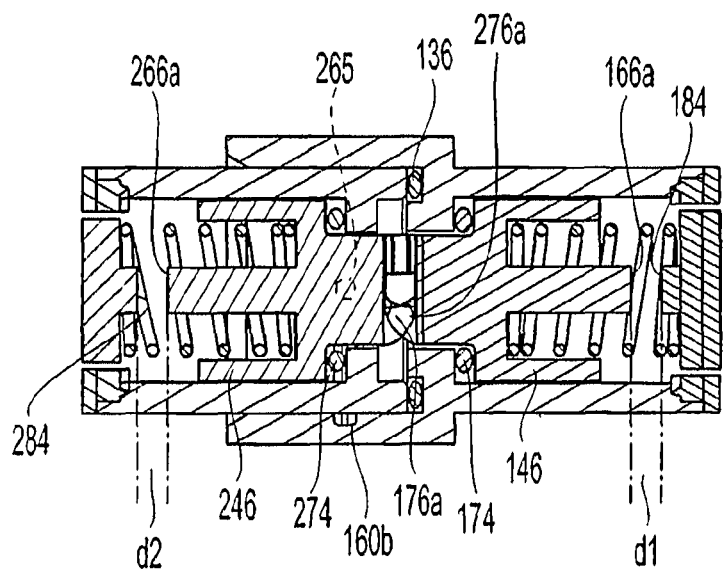
FIG. 13 is an enlarged, cross-sectional view of the valve components of FIG. 12, wherein the components are connected and the plungers are in the initial positions.

The table above will now be discussed in detail. When valve components 140 and 240 approach each other for connection (See FIG. 12), external chamber portion 144a receives first end 242a of component 240 so that a portion of component 240 is received by component 140. End 242a of component 240 contacts external O-ring 136 to form an inter-component seal. To assure proper alignment of components 140 and 240, pin 265 on valve component 240 is received into groove portion 160a of valve component 140. When pin 265 reaches the end of groove portion 160a, cam surface free ends 176a and 276a are out of contact and side-by-side, as best seen in FIG. 14. This is the longitudinal insertion movement of step 1. Distances d1 and d2 have not changed during insertion and plungers 146 and 246 are in their initial or seal positions, as shown in FIG. 13. As a result, at the end of the longitudinal insertion movement of valve component 240, valve component 240 and valve component 140 are closed, since the seals at internal O-rings 174 and 274 prevent fuel flow between components 140 and 240.

Figure 15:
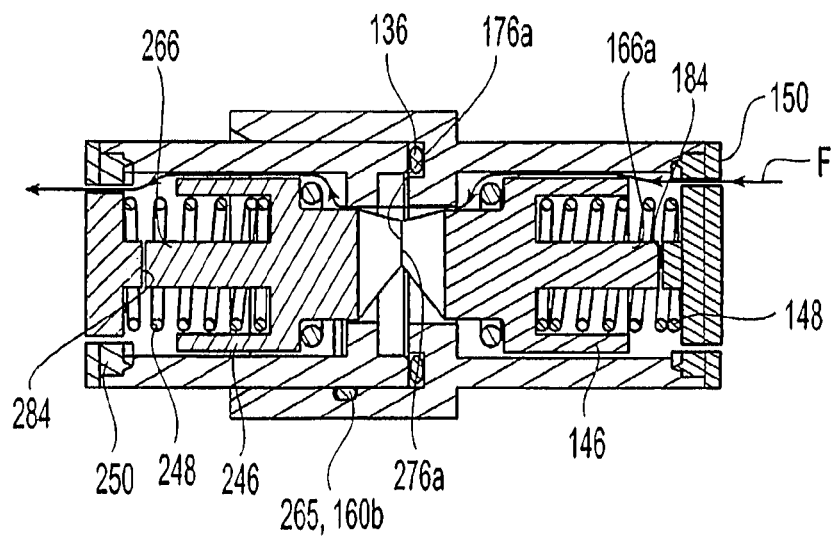
FIG. 15 is an enlarged, cross-sectional view of the valve components of FIG. 13, wherein the components are connected and the plungers are in final positions to allow fuel flow.
Figure 16:
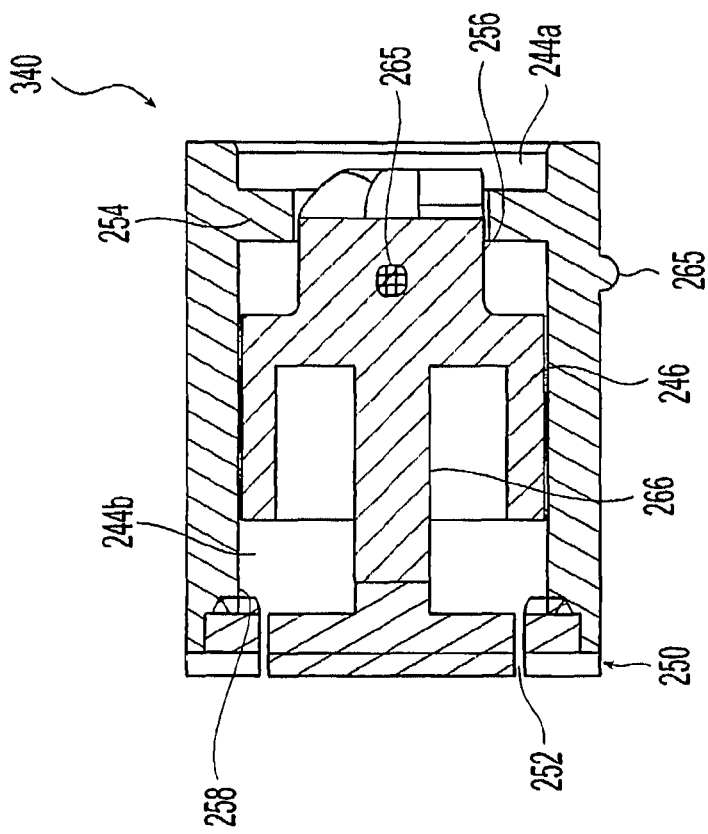
FIG. 16 is an enlarged, cross-sectional view of an alternative embodiment of the second valve component shown in FIG. 11.

Referring to FIGS. 7 and 15, during step 2, main housing 242 is partially rotated so that pin 265 moves along circumferential groove portion 160b until the two cam surfaces 176 and 276 contact each other. Furthermore, O-ring 136 is compressed to establish an inter-component seal between valve components 140 and 240.

In step 3, spring 248 in one embodiment is designed to be weaker than spring 148 so that as component 240 rotates, cam surface ramped portions 176b and 276b contact and allow only plunger 246 biased by weaker spring 248 to move toward end cap 250 decreasing distance d2 while d1 remains substantially unchanged. This rotational movement causes the seal at internal O-ring 274 to open, but the seal at internal O-ring 174 remains closed. During this step, d2 approaches zero and pin 265 of second component 240 has not reached the end of groove portion 160b.

In step 4, main housing 242 is further rotated so that plunger 246 reaches the end of groove portion 160b, this further movement (d2 becomes zero) overcomes the spring 148 so that plunger 146 moves and decreases distance d1. This further rotational movement causes the seal at internal O-ring 174 to open and allows fuel flow F between the components 140 and 240 (as shown in FIG. 15). The components 140, 240 and distances d1, d2, and d3 are configured and dimensioned so that the above discussed operational sequence occurs.

When main housing 242 is rotated in the opposite direction then removed from valve component 140, the sequence is reversed so that plunger 146 returns to its initial position with the aid of spring 148 to close valve component 140 before plunger 246 returns to its initial position with the aid of spring 248 to close valve 240. With reference to FIG. 8, increasing the angle Θ between groove sections 160a,b to greater than 90° allows plunger 246 to exert increased force on external O-ring 136 during steps 2-4.

With reference to FIGS. 11 and 12-15, in an alternative embodiment of valve component 240, internal O-ring 274 can be formed of a material that expands and continues embodiment, the sequence of operation is shown in the table below:

| Step | Relative Movement of Housing 142 to Housing 242 | Valve Component 240 on Device | Valve Component 140 on Cartridge |
|---|---|---|---|
| 1 | Longitudinal | Closed | Closed |
| 2 | Partial Rotational | Closed | Closed |
| 3 | Partial Rotational | Closed | Closed |
| 4 | Partial Rotational | Open | Open |

In such an embodiment, spring 248 is weaker than spring 148 and the valve component 140 operates as discussed above. Valve component 240, however, in steps 2 and 3 has O-ring or seal 274 that expands and continues to seal until main housing 242 is rotated to the point where distance d2 is zero. At this point, expanding O-ring 274 no longer seals component 240 and further rotation of main housing 242 moves plunger 146 against 148 reducing distance d1 and opening flow path through valve components 140 and 240.

When the sequence is reversed, plunger 146 returns to its initial position with the aid of spring 148 to close valve component 140 before plunger 246 returns to its initial position with the aid of spring 248 to close valve 240.

With reference to FIGS. 12-16, in yet another embodiment valve component 340 can be formed without spring 248 and internal O-ring 274 (See FIGS. 10 and 16) and so that distance d2 is zero. Consequently, plunger 246 cannot move and valve component 340 is permanently open. In this alternative embodiment, the sequence of operation is shown in the table below:

| Step | Relative Movement of Housing 142 to Housing 242 | Valve Component 240 on Device | Valve Component 140 on Cartridge |
|---|---|---|---|
| 1 | Longitudinal | Open | Closed |
| 2 | Partial Rotational | Open | Closed |
| 3 | Partial Rotational | Open | Open |

In such an embodiment, valve component 34U is permanently open m steps 1-3. When pin 265 reaches the end of groove 160b, as previously discussed, valve component 140 moves from the closed state to the open state to allow fuel flow between components 140 and 340.

When the sequence is reversed, plunger 146 returns to its initial position with the aid of spring 148 to close valve component 140.

With reference again to FIGS. 10, 6 and 12-15, in yet another embodiment similar to valve component 240, except that this alternate valve component can be formed without rib 270 and without pin 265. In other words, in valve component 240, plunger 246 is movable longitudinally and rotationally relative to main housing 242, while in valve component 140, plunger 146 is movable only longitudinally relative to main housing 142. This arrangement can also be reversed. Consequently, rotational movement of valve component 240 is not necessary to open valve V. Preferably, the O-rings used in this embodiment have sufficient thickness similar to the elastomeric springs illustrated in FIG. 7, and that the springs used provide torsional support to allow the plungers to return to their respective closing position upon disengagement. In this alternative embodiment, the sequence of operation is shown in the table below:

| Step | Relative Movement of Housing 142 to Housing 242 | Valve Component 240 on Device | Valve Component 140 on Cartridge |
| --- | --- | --- | --- |
| 1 | Longitudinal | Closed | Closed |
| 2 | Longitudinal | Open | Closed |
| 3 | Longitudinal | Open | Open |

In such an embodiment, spring Z46 is weaker man spring 145 as previously discussed. Valve component 240 need only be moved longitudinally into valve component 140 to open valve V. During initial insertion of valve component 240 (step 1), spring 248 is overcome before spring 148 so that valve component 240 is opened, but valve component 140 remains closed through step 2. Due to cam surfaces 176, 276 and removal of rib 270 and groove 262 longitudinal motion of main housing 242 causes rotation of plunger 246 with respect to plunger 146; however, spring 148 is not overcome until main housing 242 moves a predetermined distance. In step 3, relative movement of main housing 242 causes plunger 246 to move plunger 146 overcoming spring 148 until plunger 146 moves from the closed state to the open state to allow fuel flow between components 140 and 240. Thus, valve V can be converted from a 2-motion actuated valve (as shown in FIG. 12) to a 1-motion actuated valve, as described above.

When the sequence is reversed, plunger 146 returns to its initial position with the aid of spring 148 to close valve component 140 before plunger 246 returns to its initial position with the aid of spring 248 to close valve 240. Although the above sequences are described with movement of main housing 242 all that is necessary is relative movement between the valve components.

Figure 17:
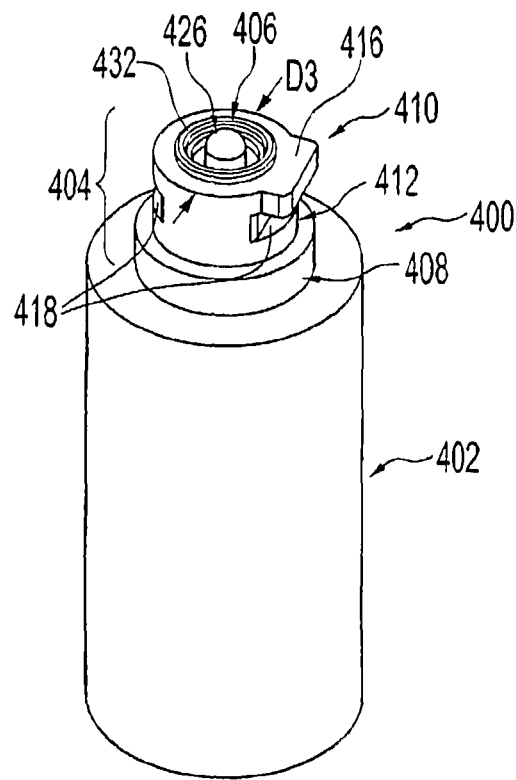
FIG. 17 is a perspective view of a fuel cartridge with a valve assembly in accordance with the present invention.

With reference to FIG. 17, fuel cartridge 400 for use with electronic host device 2, fuel cell FC or refilling device is shown. Fuel cartridge 400 includes storage housing 402, connection portion 404, and first valve component or valve assembly 406. Storage housing 402 includes a chamber (not shown) for containing fuel. Housing 402 may be configured and dimensioned to receive a fuel bladder or fuel liner (not shown). Fuel liners are fully disclosed in commonly owned, co-pending U.S. patent application Ser. No. 10/629,004, entitled "Fuel Cartridge with Flexible Liner," filed on Jul. 29, 2003. The disclosure of this application is hereby incorporated by reference in its entirety. The chamber or liner is fluidly connected to valve assembly 406.

Connection portion 404 includes bottom enlarged portion 408 and top enlarged portion 410, and neck 412 positioned therebetween. Top portion 410 includes key or projection 416. Neck 412 includes generally parallel diametrically opposed flats 418.

Figure 18:
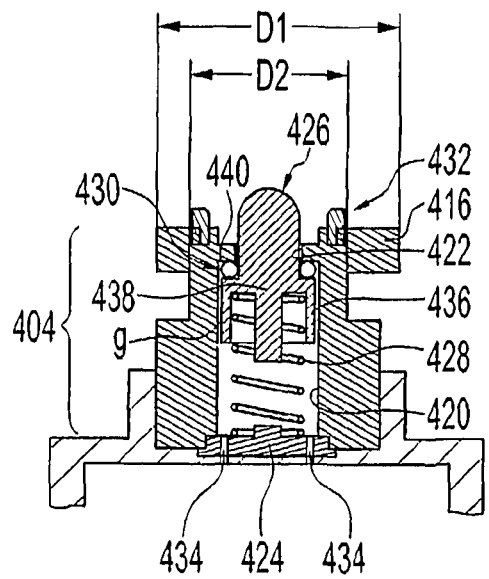
FIG. 18 is an enlarged, cross-sectional view of the valve assembly of FIG. 17.
Figure 18A:
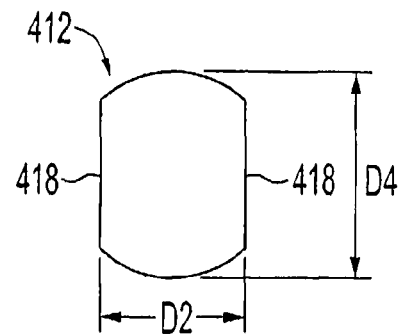
FIG. 18A is an enlarged, schematic view of a valve portion of the fuel cartridge of FIG. 17 showing the outline of the neck portion.

With reference to FIGS. 17-18A, distance D1 of top enlarged portion 410 is the largest distance and includes key portion 416. Distance D3 of top portion 410 is its diameter, excluding key 416. Distance D2 of neck 412, illustrated in FIG. 18a, extends between surfaces of slots 418 and is the smallest distance in neck 412. Distance D4 of neck 412 is its diameter, excluding slots 418 and distance D3 is substantially the same as distance D4. Distance D4 is greater than distance D2.

Connection portion 404 further includes central first bore 420 connected to the fuel chamber of housing 402. Connection portion 404 further includes central second bore 422 connected to first bore 420. Valve assembly 406 includes end cap 424, plunger 426, spring 428, O-ring seal 430, and gasket 432. End cap 424 is removably or irremovably fixed to lower end of connection portion 404. In one preferred embodiment, end cap 424 can be snap fitted or ultrasonically welded to connection portion 404. Alternatively, these components can be joined by adhesive bonding, ultrasonic bonding, welding, spin welding, radio frequency welding, heat sealing, or the like. End cap 424 defines a plurality of openings 434 for fuel to flow therethrough. End cap 424 could also be of a shape that allows the fuel to flow from cartridge 402 into first bore 420, such as a circle with flats (similar to that shown in FIG. 18a) that allows the flow of fuel to flow through the space created by the flats, and has enough surface area to hold spring 428 in place.

Plunger 426 includes base 436 and tip portion 438 extending therefrom. Base 436 is configured and dimensioned to be slidably received within first bore 420 to define gap g for fuel flow, and to receive spring 428 therein. Tip portion 438 is configured and dimensioned to be slidably received within second bore 422. O-ring seal 430 is disposed upstream of base 436 within first bore 420. Also, gasket 432 is disposed within upper end of connection portion 404 and provided a compression seal between cartridge 400 and receptacle 442 as discussed below. Upstanding shields, discussed below, can be added to cartridge 400 to limit access to plunger 426.

Figure 19:
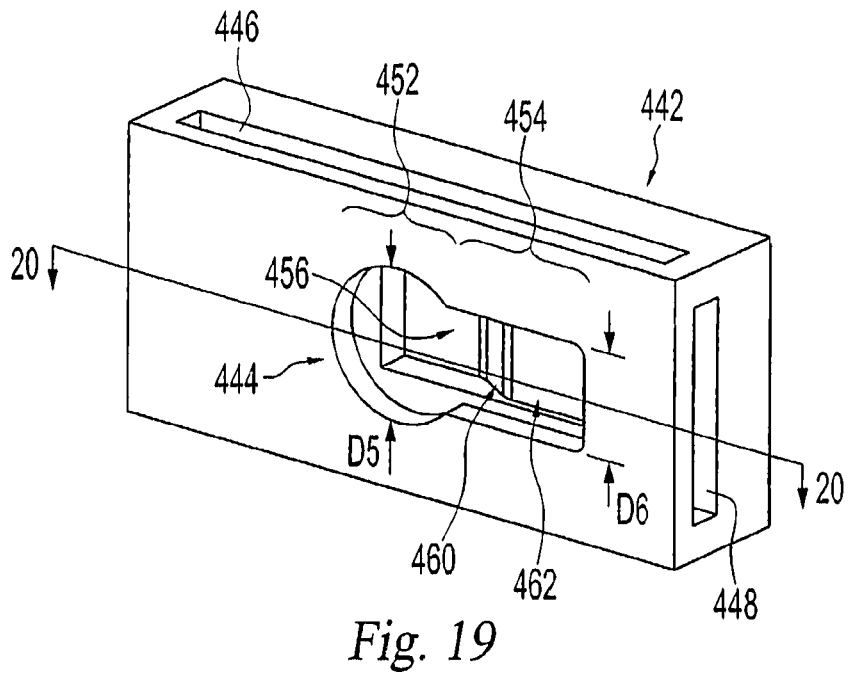
FIG. 19 is a perspective view of a preferred embodiment of a receptacle for use with the cartridge of FIG. 17.
Figure 20:
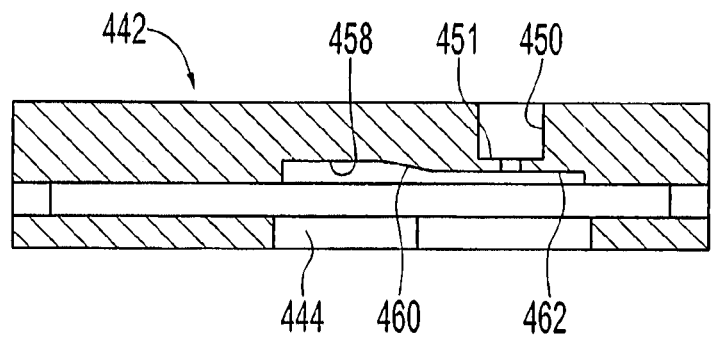
FIG. 20 is a cross-sectional view of the receptacle of FIG. 19 taken along line 20-20.

With reference to FIGS. 19 and 20, fuel cartridge 400 is adapted to connect to receptacle 442, which is coupled to electronic device 2, fuel cell FC, another fuel supply, or a refilling device. Receptacle 442 generally includes key way opening 444 in the front wall to receive connection portion 404, optional slots 446, 448 in the sidewalls, and outlet 450 in the rear wall. Receptacle 442 can be made integral to fuel cell FC or electronic device 2.

Key way opening 444 includes enlarged portion 452 and reduced portion 454. Distance D5 is the diameter of enlarged portion 452 and is slightly larger than diameter D3 of top portion 410, but smaller than diameter D1. This makes the insertion of fuel cartridge 400 into enlarged portion 452 of key way opening 444 sensitive to orientation of cartridge 400, because key portion 416 should align with reduced portion 454.

Distance D6 of reduced portion 454 is less than the larger distance D4 of neck 412, but is greater than distance D2 (See FIG. 18A). This also makes moving of fuel cartridge 400 into reduced diameter portion 454 of key way opening 444 sensitive to orientation of cartridge 400.

Figure 20A:
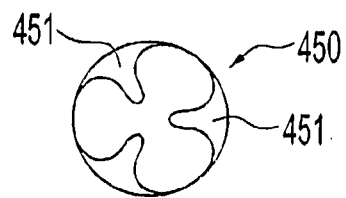
FIG. 20A is a front view of channel 450 showing a plurality of retaining ribs 451.

With reference to FIGS. 19 and 20, intermediate surface 456 inside receptacle 442 includes recessed surface portion 458, cam surface portion or actuator 460 and sealing surface portion 462. Recessed surface portion 458 allows a portion of connection portion 404 on fuel cartridge 400 to be inserted within receptacle 442 without opening the seal of valve 406. Cam surface portion 460 is angled between recessed surface portion 458 and sealing surface portion 462. Sealing surface portion 462 is aligned with fuel outlet 450. Preferably, outlet 450 contains a plurality of retainer ribs 451, as shown in FIG. 20A. Retainer ribs 451 are spaced apart to let fuel flow therethrough and are designed to abut plunger 426 to keep it from entering outlet 450. Retainer ribs 451 can have any shape, including ribs forming a cross within outlet 450.

Figure 21:
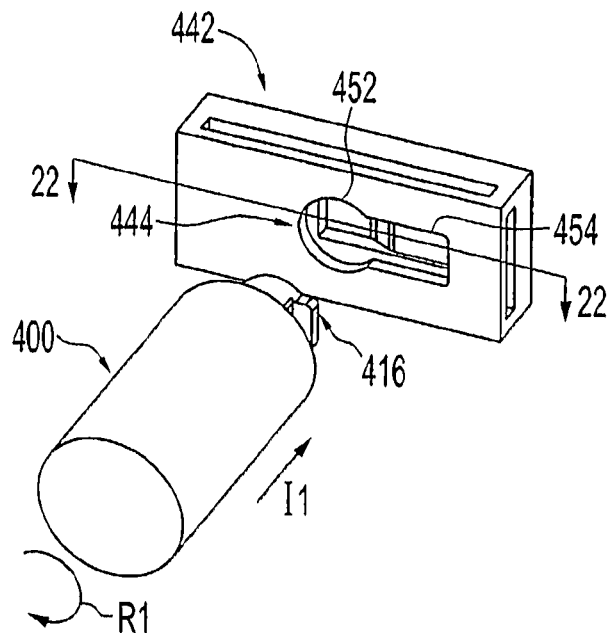
FIG. 21 is a perspective view of the fuel cartridge of FIG. 17 and receptacle of FIG. 19 wherein fuel cartridge is in an initial, uninstalled position.

During the insertion process when cartridge 400 is in an initial uninstalled position (shown in FIG. 21), valve assembly 406 can remain closed. To insert, top enlarged portion 410 is aligned with enlarged portion 452 such that key 416 is aligned with channel 454. Cartridge 400 is then moved translationally in direction I1, and top enlarged portion 410 of cartridge 400 fits within enlarged portion 452 of key way opening 444.

Figure 22:
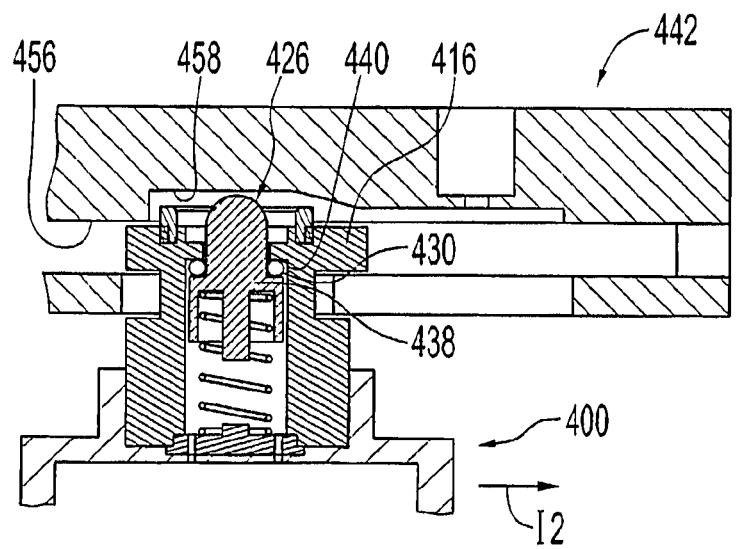
FIG. 22 is a cross-sectional view of the fuel cartridge and receptacle of FIG. 21 along line 22-22 where the fuel cartridge has been partially inserted and is in an intermediate, installed position, where the fuel cartridge valve is in a closed state.

Once inserted, as shown in FIG. 22, plunger 426 does not contact recessed surface portion 458 due to the interference of top enlarged portion 410 against surface 456, keeping valve assembly 406 closed. To move along reduced channel 454 cartridge 400 is rotated about 90° in direction R1 or in the opposite direction to align the smaller distance D2 of neck 412 to distance D6 of channel 454, before it is moved in direction I2.

In one embodiment, receptacle 442 defines slot 446 above key way opening 444 and no corresponding slot below, so that cartridge 400 can only be rotated in clockwise direction R1. Rotation of cartridge 400, also locks cartridge 400 to receptacle 442 since key 416 is no longer aligned with channel 454.

Figure 23:
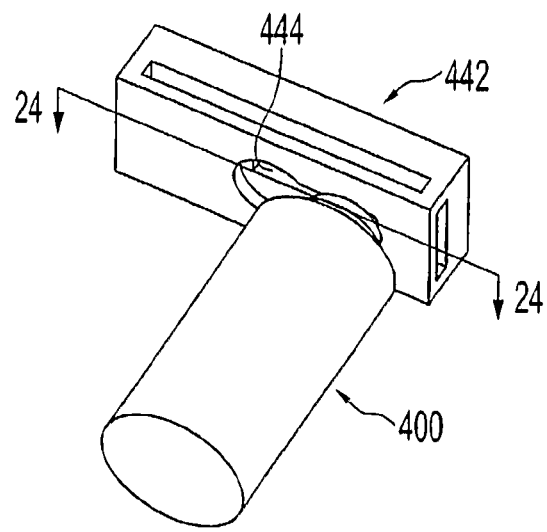
FIG. 23 is a perspective view of the fuel cartridge and receptacle of FIG. 21 wherein the fuel cartridge is in an actuated position, where the fuel cartridge valve is in an open state.
Figure 24:
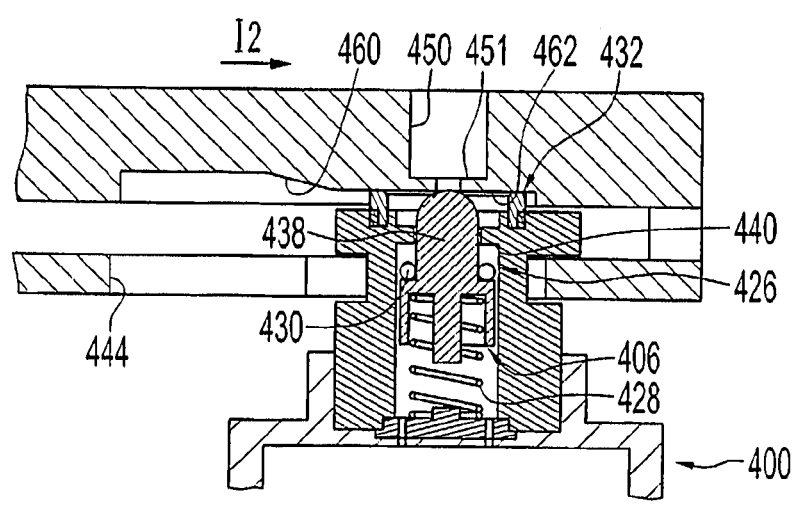
FIG. 24 is a cross-sectional view of the fuel cartridge and receptacle of FIG. 23 along line 24-24 wherein the fuel cartridge valve has been fully inserted and is in the open state.

As best shown in FIGS. 22-24, fuel cartridge 400 is then moved translational direction I2. As cartridge 400 moves in direction I2, tip portion 438 of plunger 426 rides along cam surface portion 460 and moves away from the seal position. Thus, the action of cam surface portion 460 opens the valve assembly 406 of cartridge 400. As gasket 432 contacts sealing surface 462, it establishes a seal between cartridge 400 and receptacle 442. When fuel cartridge 400 reaches the end of key way opening 444 and sealing surface 462, gasket 432 surrounds outlet 450 and is compressed to seal cartridge 400 to receptacle 442.

The components are configured and dimensioned so that valve assembly 406 is not opened until sealing occurs between gasket 432 and sealing surface 440. This can be accomplished by having a relatively thick and resilient O-ring 430. This allows fuel to flow along a flow path from cartridge 400 chamber through valve assembly 406 and through outlet 450. Outlet 450 is in fluid communication with fuel cell FC (See FIG. 1), refilling device or electronic device and thus allows fuel to flow thereto. Outlet 450 may also have a screen to filter the fuel and to keep plunger 438 in the open position. Outlet 450 may also have a check valve assembly similar to valve 406 that cooperates with valve 406 to establish a flow path therethrough. A flexible fuel tube can be attached to outlet 450 to conduct fuel to the fuel cell.

Hence, in this embodiment up to four independent motions may be necessary to connect cartridge 400 to receptacle 442, i.e., a first rotation motion to align key 416 to channel 454, a second translational motion to insert connector 404 into enlarged portion 452 of channel 454, a third rotational motion to align the thin section of neck 412 and lock connector 404 in place and a fourth translational motion to slide neck 412 along channel 454 to open valve 406.

In order to remove cartridge 400 from receptacle 442, the sequence of motions for installation is reversed so the cartridge is moved in the direction opposite to direction I2, unlocked from receptacle 442 by rotation opposite to direction R1 and then removed opposite to direction I1. Movement of cartridge 400 in direction opposite to direction I2 will cause spring 428 to automatically close valve assembly 406 before cartridge 400 reaches enlarged portion 452 of key way opening 444.

In an alternative embodiment, neck 412 of cartridge 400 can be formed with constant smaller diameter D2. As a result, translation of cartridge 400 in direction I2 is not direction sensitive and can occur without the third rotation of cartridge 400 after movement along direction I1. In this modified embodiment, connection of cartridge 400 requires two motions, insertion in translational direction I1 and movement in translational or longitudinal direction I2. The operation of cartridge 400 can be further simplified by removing key 416 so that insertion in direction I1 does not require a specific orientation of cartridge 400.

With reference to FIGS. 25-27, another embodiment of a fuel cartridge of the present invention is illustrated. Cartridge 500 includes storage housing 502, valve assembly 504 and vertical shields 506, 507. Storage housing 502 includes chamber 508 for containing fuel. Housing 502 may be configured and dimensioned to receive a fuel bladder or fuel liner (not shown), as previously discussed. In addition, housing 502 includes optional outer surface portion 509 which can be configured to enhance gripping of cartridge 500. This gripping enhancement can take the form of knurling, serrations, a rubber wrap, or the like.

Valve assembly 504 controls the release of fuel from chamber 508. In a preferred embodiment, valve assembly 504 is a normally closed valve so that valve 504 normally provides a seal for cartridge 500. Normally closed valves include, but are not limited to, the spring biased valves shown in FIGS. 6-24, the valves disclosed in the '006 and '949 parent cases, the poppet or check valves, and those known in the lighter art and disclosed in U.S. Pat. Nos. 6,746,234, 5,957,680 and 5,854,530. Valve assembly 504 includes nozzle 510 protruding from housing 502. Nozzle 510 includes shoulder 512 and is connected to the rest of valve assembly 504 via stem 513. Other normally closed valve configurations are also suitable for the present invention.

Shields 506, 507 are circumferentially extending spaced apart walls that partially surround nozzle 510 and extend a distance above nozzle 510 to shield the nozzle. Cartridge 500 is adapted to connect to receptacle 514 which is a part of electronic device 2, fuel cell FC, another fuel supply, or refilling device. Receptacle 514 includes opening 516, actuator or wedge portion 518, O-ring seal 520, an optional second valve component and outlet 522. The second valve component can provide a seal that is opened before fuel from cartridge 500 can flow to the device and can be located within outlet 522.

Referring to FIGS. 26-29, wedge portion 518 includes U-shaped slot 524 for receiving stem 513 below nozzle 510. Wedge portion 518 further includes beveled cam surface 526. O-ring seal 520 is aligned with outlet 522. When cartridge 500 is in an initial and uninstalled position (as shown in FIG. 26), valve assembly 504 is in a closed state. In order to operatively engage fuel cartridge 500 to receptacle 514 and start fuel flow, shields 506, 507 are aligned to allow wedge portion 518 to extend therebetween. Thus, insertion of cartridge 500 is sensitive to the orientation of cartridge 500. This orientation can occur before or after movement of cartridge in translational direction I1.

Cartridge 500 is moved in direction I1 so that nozzle 510 is inserted within opening 516. After this insertion, as shown in FIG. 26, valve assembly 504 remains in the closed state. Cartridge 500 is then moved in translational direction I2 so that shoulder 512 moves into contact with wedge portion 518, and shoulder 512 moves along cam surface portion 526 of wedge portion 518. This causes nozzle 510 to open, preferably after nozzle 510 contacts O-ring 520 to seal nozzle 510 to outlet 522. Preferably, the components are configured and dimensioned so that valve assembly 504 is not opened until this sealing occurs between nozzle 510 and O-ring 520. This allows fuel to flow from chamber 508 through valve assembly 504 and through outlet 522 to fuel cell FC, refilling device, another fuel supply or electronic device 2.

In order to remove cartridge 500 from receptacle 514, the sequence of motions is reversed. Movement of cartridge 50Q in direction opposite to direction I2 will cause valve assembly 504 to automatically close when nozzle 510 is moved down cam surface 526.

Figure 30:
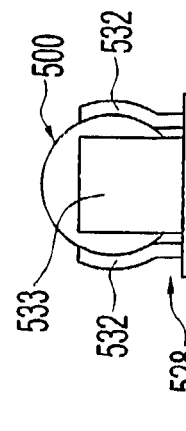
FIG. 30 is a bottom view of the cartridge of FIG. 26 in a cartridge retention assembly.
Figure 29:
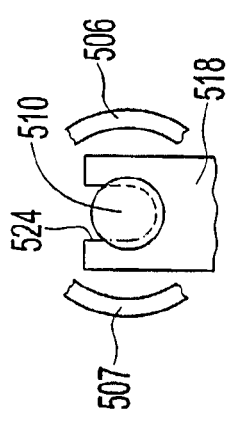
FIG. 29 is a top view of the cartridge and a portion of the receptacle engaging the valve of the cartridge of FIG. 26.
Figure 28:
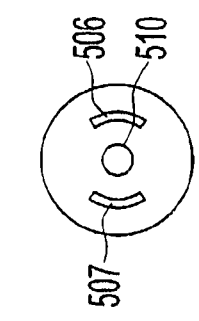
FIG. 28 is a top view of the cartridge of FIG. 25.

Cartridge 500 can be used with optional cartridge retention assembly 528, as shown in FIGS. 26, 27 and 30. Cartridge retention assembly 528 includes base 530 for supporting plurality of spring clips 532,533. Rear spring clip 533 may be have a higher spring force than side spring clips 532 so that a higher force is necessary to insert cartridge 500 against rear spring clip 533, than the force necessary to insert cartridge 500 between side spring clips 532. Spring clips 532,533 are preferably configured and dimensioned so that insertion of cartridge 500 between spring clips 532,533 requires a predetermined insertion force not normally attainable by an unintended user and/or action. Moreover, once cartridge 500 is within spring clips 532,533 spring clips 532, 533 exert a biasing force on cartridge 500 so that removal of cartridge 500 therefrom also requires a predetermined removal force also not normally attainable by an unintended user and/or unintended action.

In an alternative embodiment, cartridge 500 may include recesses (e.g. same location as grip 509 shown in FIG. 25) for alignment with spring clips 532, 533. These recesses may be used as orientation guides cooperative with spring clips 532, 533 to insure proper orientation of cartridge 500. These orientation guides above can be employed with other cartridge retention assemblies described herein. Optionally base 530 can be immovably or slidably connected to receptacle 514, or base 530 can be separate from receptacle 514. Additional guidance features can also be added to housing 502, base 530 and/or receptacle 514 to provide guidance and alignment and assurance that housing 502 and nozzle 510 are being inserted properly onto receptacle 514.

Figure 31B:
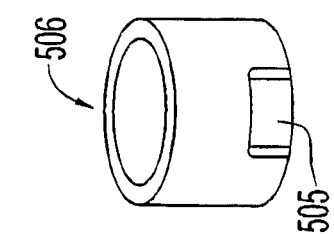
FIG. 31B is a perspective view of another embodiment of the cartridge of FIG. 31A.
Figure 31A:
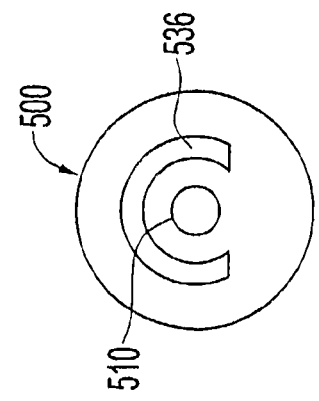
FIG. 31A is a top view of an alternative embodiment of the cartridge of FIG. 28.

With reference to FIG. 31a, shields 506 and 507 can be replaced by single shield 536 sized and dimensioned to shield nozzle 510. Shield 536 defines an opening, as shown, to allow wedge 518 to contact and a lift nozzle 510. Also, as shown in FIG. 31b, shield 506 can cover nozzle 510 circumferentially and defines lower opening 505 to allow access to the nozzle. Opening 505 may be covered by one or more spring loaded gate, e.g., spring supported gate or gate with a live joint, or opening 505 can be covered by a polymeric or elastomeric sheet or film with slit(s) cut therethrough for an actuator, such as wedge 518, to have access to the nozzle.

Figure 32:
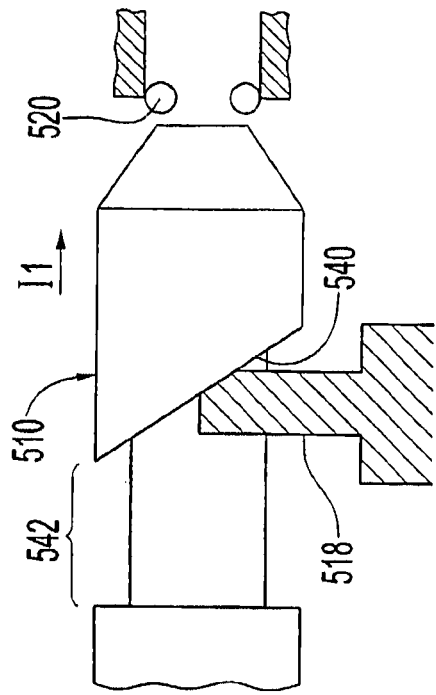
FIG. 32 is an enlarged, elevational view of an alternative embodiment of a nozzle and modified receptacle for use with cartridge of FIG. 26.

With reference to FIG. 32, an alternative embodiment of nozzle 510 is shown. Nozzle 510 includes angled shoulder 540 and slot 542. Shoulder 540 has a ramp surface, as shown. During the motion along direction I2, angled shoulder 540 may ride over wedge 518 to lift nozzle 510 to open valve 504. Alternatively, wedge 518 may have a ramp surface and angled shoulder 540 may move over the ramp surface of wedge 518. Also; in lieu of translational motion 12, nozzle 510 can be rotated so that angle shoulder 540 is moved upward until nozzle 510 comes into sealing contact with O-ring 520 before valve 504 opens. For example, cartridge 500 can be retained against translational movements by spring clips 532 and 533, shown in FIG. 30, and then cartridge 500 is rotated so that nozzle 510 is lifted by wedge 518.

Figure 35:
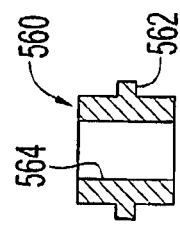
FIG. 35 is a cross-sectional view of the coupling member of the receptacle of FIG. 33.
Figure 33:
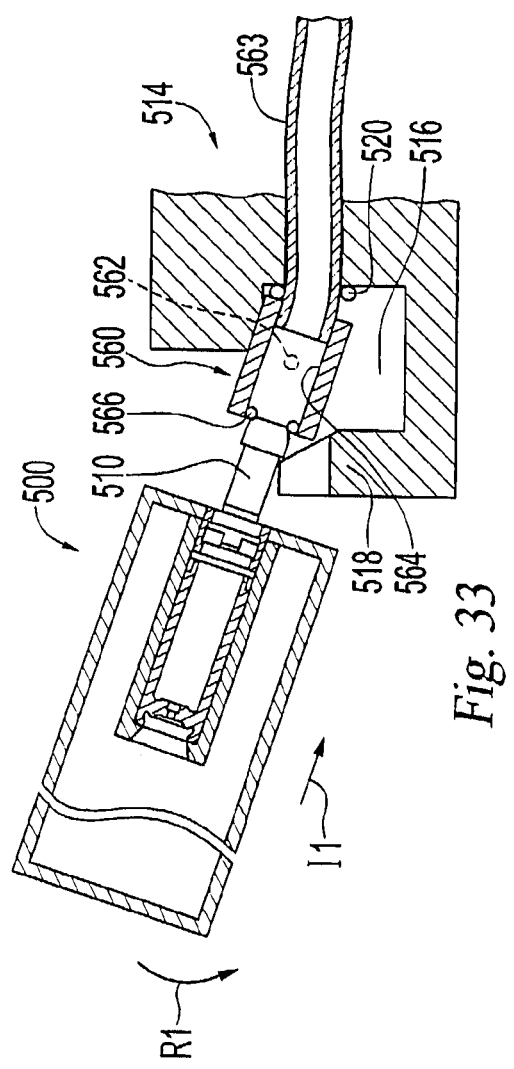
FIGS. 33-34 are cross-sectional views of the fuel cartridge of FIG. 25 and a modified receptacle with a coupling member, wherein the fuel cartridge and the receptacle are in the uninstalled and installed positions, respectively.
Figure 34:
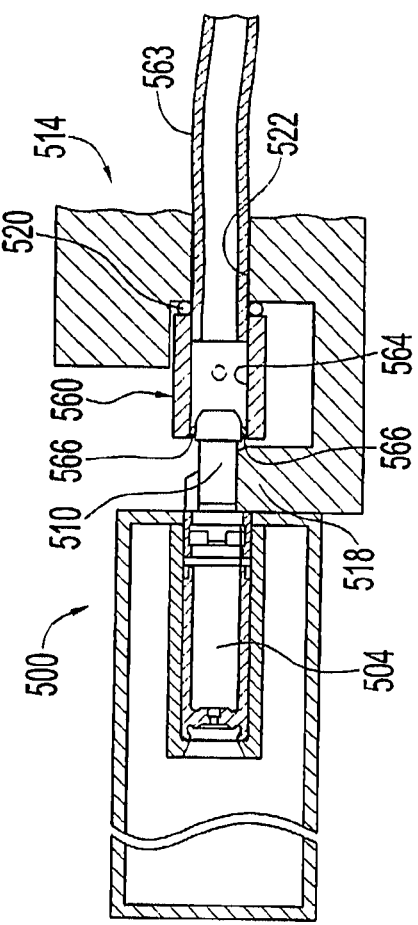

With reference to FIGS. 33 and 34, receptacle 514 may also include pivotable coupling member 560 positioned inside enlarged opening 516. Pivotable coupling member 560 includes pins 562 (see FIG. 35) for pivotally attaching member 560 to receptacle 514. Alternatively, pin 562 can be located on receptacle 514. Coupling member 560 further includes bore 564 therethrough and optional O-ring seal 566. Additionally, bore 564 can be connected to flexible tube 563 to transport fuel from cartridge 500 to the fuel cell.

To insert cartridge 500, coupling member 560 is angled upward, as shown in FIG. 33, to receive nozzle 510. In this position, nozzle 510 can be moved in translational direction I1 to contact O-ring seal 566 without wedge 518 acting on nozzle 510. Then, cartridge 500 is rotated downwardly, as illustrated by arrow R1 so that wedge 518 engages nozzle 510 and opens valve assembly 504. Valve assembly 504 is shown in an open position in FIG. 34. When cartridge 500 is in this installed and operative position, nozzle 510 is in sealing engagement with O-ring seal 566 and coupling member 560 is in sealing engagement with O-ring seal 520. In addition, in this position, fuel may flow through nozzle 510 and through bore 564 to outlet 522.

In an alternative embodiment, coupling member 560 may include a spring for biasing coupling member 560 into the angled upward position of FIG. 33. For example, a torsion spring located around one or both of the pins 562 can be used. As a result, after cartridge 500 is removed therefrom, such modified coupling member will automatically return to the angled upward position to be ready for the next cartridge insertion. On the other hand, to increase operational difficulty, coupling member 560 can be biased away from the angled upward position of FIG. 33 so that a user should align the coupling member to the correct upward position, before cartridge 500 can be inserted. The user would need to keep the coupling member in the correct upward position, while inserting the cartridge. This would require using the user to use both hands at the same time. Alternatively, receptacle 514 and coupling member 560 may have corresponding detents that retain the coupling member in the correct upward position, so that the insertion of the cartridge can be accomplished with one hand. The spring modification and the detent modification can be employed with other similar embodiments with pivotal coupling members described hereafter.

Figure 37:
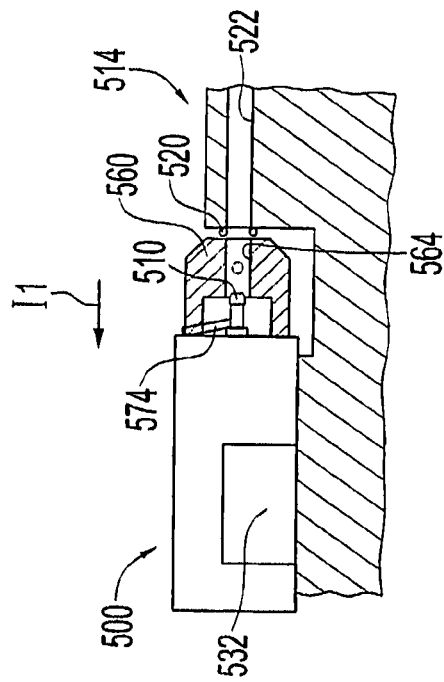
FIGS. 36-37 are cross-sectional views of a modified fuel cartridge and a modified receptacle, wherein the fuel cartridge and the receptacle are in the uninstalled and installed positions, respectively.
Figure 36:
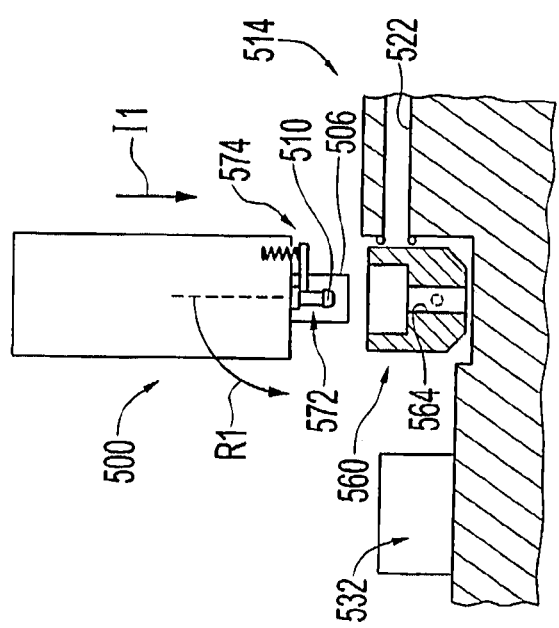

Another embodiment of the present invention is illustrated in FIGS. 36-37. In this embodiment, cartridge 500 has either a normally closed valve 504 or a normally open valve 572. A normally open valve is a valve that is normally biased to the open position to let the fuel out of the cartridge. A normally open valve needs an actuator, preferably a spring loaded actuator, to act on or to depress the valve to a closed position. In this embodiment, normally open valve 572 has nozzle 510 and is actuated by spring-loaded, pivoted actuator 574 to press nozzle 510 toward the cartridge to keep valve 572 closed. Cartridge 500 is inserted into receptacle 514 along direction I1 and rotated along direction R1 similar to the embodiment discussed in FIGS. 33-34, except that with normally open valve 572, wedge 518 is omitted. Instead, actuator 574 contacts a wall on coupling member 560 and is pushed in a direction opposite to direction I1 to open valve 572 to allow fuel to flow through the valve. Preferably, actuator 574 is not depressed enough to release fuel prior to the nozzle sealing with O-ring 520. Alternatively, actuator 574 could be positioned on the opposite side of the cartridge, such that the valve was not opened until cartridge was rotated and nozzle 510 was sealed. In addition, the rotation could be less than a right angle turn similar to FIG. 33, and a flexible tube connection is used instead of seal 520, as shown in FIGS. 33-34, or flexible tube 563 is connected to conduit 522. Normally open valves and spring biased pivotal actuators are known in the lighter art and are disclosed in the '234, '680 and '530 patents, discussed above. Other normally open valves are known to those of ordinary skilled in the art. These references are incorporated herein by reference in their entireties.

Figure 39:
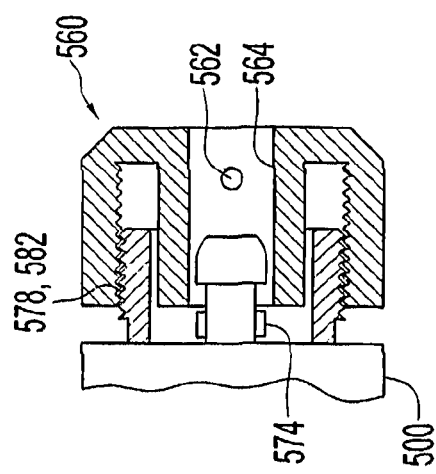
FIGS. 38-39 are partial, cross-sectional views of modified shields and a modified coupling member in the uninstalled and installed positions, respectively.
Figure 38:
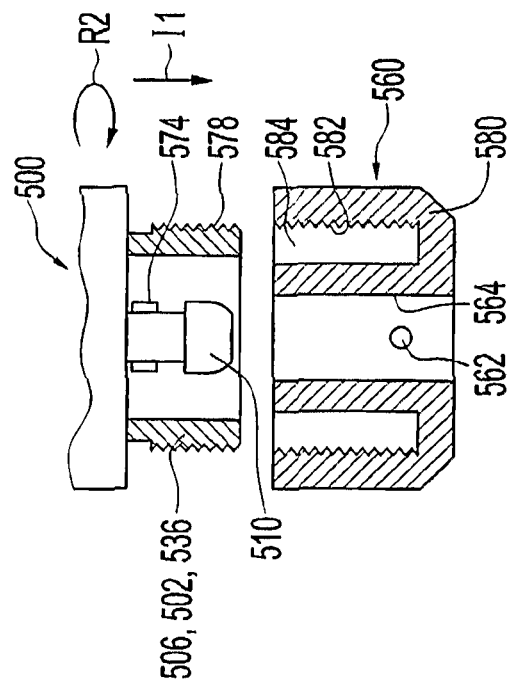

FIGS. 38-39 illustrate an alternate way for connecting cartridge 500 to coupling member 560. Shields 506, 507 or shield 536 or a shield that covers nozzle 510 completely may have external threads 578 formed thereon. Coupling member 560 has external wall 580 with internal threads 582 formed thereon corresponding to threads 578. During insertion along direction I1, cartridge 500 is also rotated or twisted in direction R2 to engage threads 578 to threads 582. Shields 506 and 507 or 536 are received in channel 584. After cartridge 500 is secured to coupling member 560, both are rotated in direction R1 to align channel 564 to outlet 522, similar to the embodiment shown in FIG. 37. Shields 506, 507, 536 or a circumferential shield can be attached to coupling member with bayonet mount. Wedge 518 on receptacle 514 or valve actuator 574 can be provided to open nozzle 510.

As shown in FIGS. 40 and 41 coupling member 560 may also have springs 586 that biases against shields 506, 507 or 536 during insertion. The shield has pin 588 disposed on an outside surface and coupling member 560 has L-shape channel 590 on an inside surface. During insertion, pin 588 travels in direction I1 along first leg 592 of channel 590 and is then rotated to travel along second leg 594 of channel 590 to lock. Spring 586 biases against insertion in direction I1 to increase the level of difficulty of insertion and to more securely lock pin 588 after pin 588 is inserted into second leg 594.

Normally closed valve 504 and normally open valve 572 can be used interchangeably for each other in the embodiments described above and below. Biased or unbiased pivotal actuator 574 can be used with both normally closed valve 504 and normally open valve 572. Similarly, wedge 518 can also be used to actuate both normally closed and normally open valves. Typically, wedge 518 has a cam surface and the cam surface can be oriented to pull a nozzle open or to push a nozzle shut. For example, in FIG. 24 cam surface 460 is adapted to push open a normally closed valve, and in FIGS. 33 and 34 wedge 518 has a cam surface that pulls a normally closed valve open. A cam surface can also be adapted to open and close normally open valves. Also, as discussed above, normally closed valves are valves that normally seals and is actuated to open to allow fluid flow, and include, but are not limited to, check valves or poppet valves, FIGS. 42-47 show various embodiments of cartridges for use with covers. The covers can be removably or fixedly attached to the cartridges. The covers limit access to the nozzle by an unintended user and/or unintentional actions.

With reference to FIG. 42a, cartridge 500 has spaced apart shields 506 and 507, which in this embodiment are spaced further away from nozzle 510 and pivotally support actuator 574. The valve connected to nozzle 510 could be either a normally closed valve or a normally open valve, and actuator 574 can operate to either lift nozzle 510 to open a normally closed or open valve or depresses nozzle 510 downward to close a normally open valve. Actuator 574 is typically biased by a spring 577 (see FIG. 43) under push button 575. On the other end of actuator 574 is end 596 which acts on nozzle 510. Cartridge 500 further includes detent arms 598 extending from the upper surface thereof and is adapted to retain cover 600. Many other methods are available to attach the cover to the cartridge. With reference to FIG. 42a, protective cover 600 is removably attached to cartridge 500. Before cover 600 is coupled to cartridge 500, as shown in FIG. 43, a predetermined force is needed to remove cover 600 from cartridge 500. When cover 600 is on cartridge 500, it isolates the actuator and the valve from actuation. Cover 600 can include optional gripping members 602.

Figure 42B:
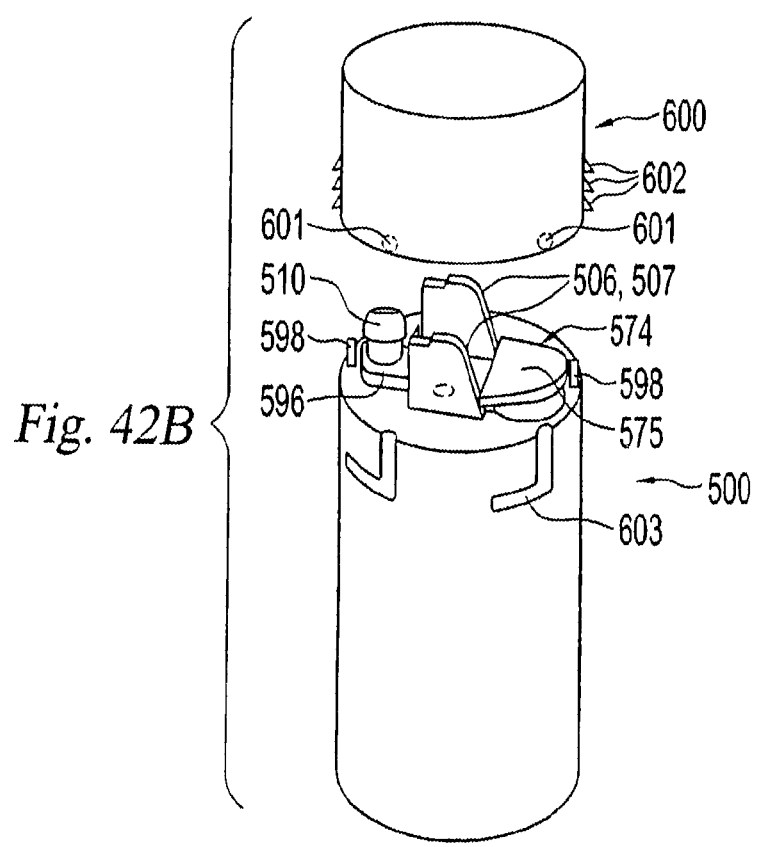
FIG. 42B is a perspective view of the cartridge and cover of FIG. 42A with locking channel.
Figure 43:
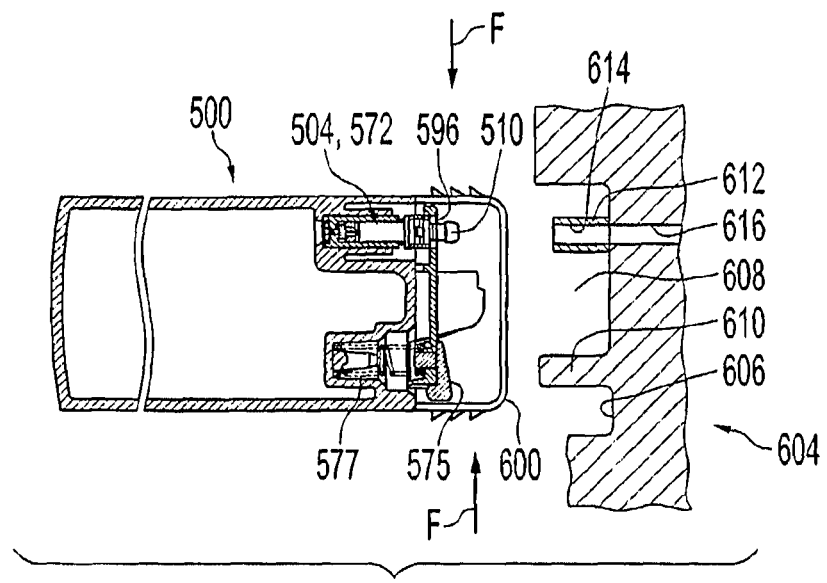
FIGS. 43-44 are cross-sectional views of the fuel cartridge and cover of FIG. 42 and a receptacle, wherein the fuel cartridge and the receptacle are in the uninstalled and installed positions, respectively.

With reference to FIG. 42b, cover 600 has at least one projection 601, which is adapted to ride with at least one channel 603 formed on the body of the cartridge. Preferably, channel 603 has a tortuous path, e.g., an L-channel, as shown. When this cover 600 is placed on top of cartridge 500, projection 601 is positioned within L-channel 603 so that cover 600 is securely held to cartridge 500. Preferably, cover 600 is moved at least in two directions, i.e., along L-shaped channel 603, before it can be separated from cartridge 500. Alternatively, cover 600 may comprise an inner cover member, which has projections 601 and an outer cover member. The inner cover member and the outer cover member are movable and/or rotatable relative to each other and the user need to apply a sufficient force on the outer cover member and to transmit this force to the inner cover member to separate projections 601 from channel 603. This further raises the level of difficulty of remaining cover 600. Other suitable covers include caps used in child-resistant medicine bottles and caps for chemical or solvent containers.

Receptacle 604 is adapted to receive cartridge 500, and includes exterior surface 606 that defines opening 608 for receiving cartridge 500. Exterior surface 606 further includes outwardly extending plunger 610 and coupling member 612. Coupling member 612 includes bore 614 in fluid communication with outlet 616. Bore 614 or outlet 616 may include a valve assembly similar to valve 406 to create an internal seal, such as the valves disclosed in the parent '006 and '949 patent applications. Plunger 610 can be spring-loaded, or it can be a spring. Additionally, plunger 610 or other actuators can be connected to or made integral with outlet 616, and outlet 616, as discussed herein, may include a valve component.

With reference to FIGS. 42a, 42b, and 43, cartridge 500 is supplied to users with cover 600 coupled thereto. In order to use cartridge 500, a user should apply a predetermined compressive force F on cover 600 to remove cover 600 from detents 598 or move cover 600 in multiple motions to separate it from the cartridge.

Figure 44:
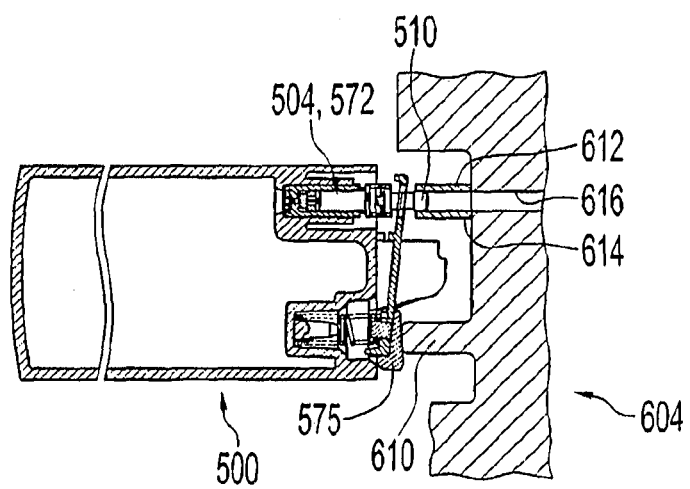

To install fuel cartridge 500 to receptacle 604 and start fuel flow or establish a flow path, cartridge 500 is moved in translationally so that cartridge 500 is disposed in opening 608, nozzle 510 is disposed within bore 614 and is in sealing engagement with coupling member 604. Continued movement of cartridge 500 causes plunger 610 to engage push button 575 of actuator 574 and compress spring 577. This causes actuator 574 to pivot and move nozzle 510 to the open position, as shown in FIG. 44. This allows fuel to flow from cartridge 500 through valve assembly 504, 572 and through outlet 616 to fuel cell FC, refilling device, another fuel supply and/or electronic device. Cartridge 500 can be disengaged by pulling in the opposite direction. Receptacle 604 may further include cartridge retention assembly 528, as shown in FIG. 30 to retain cartridge 500.

Figure 45:
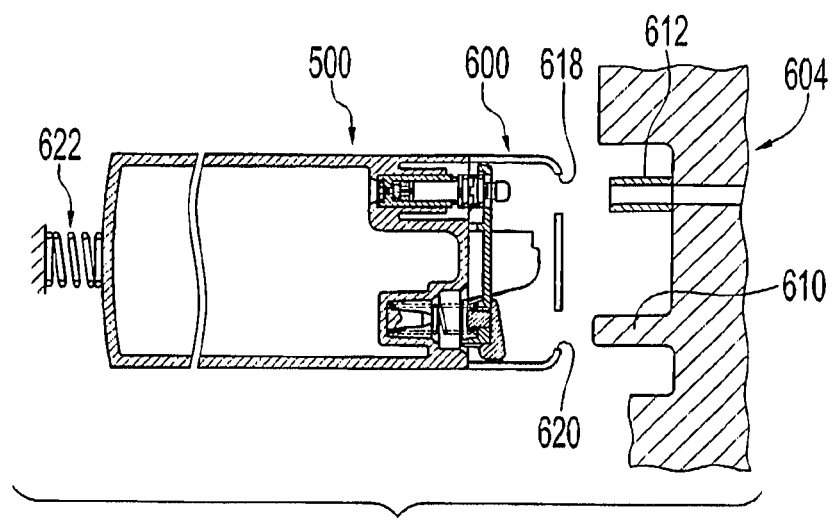
FIGS. 45-46 are cross-sectional views of a fuel cartridge of FIG. 42 with another cover and receptacle, wherein the fuel cartridge and the receptacle are in the uninstalled and installed positions, respectively.
Figure 46:
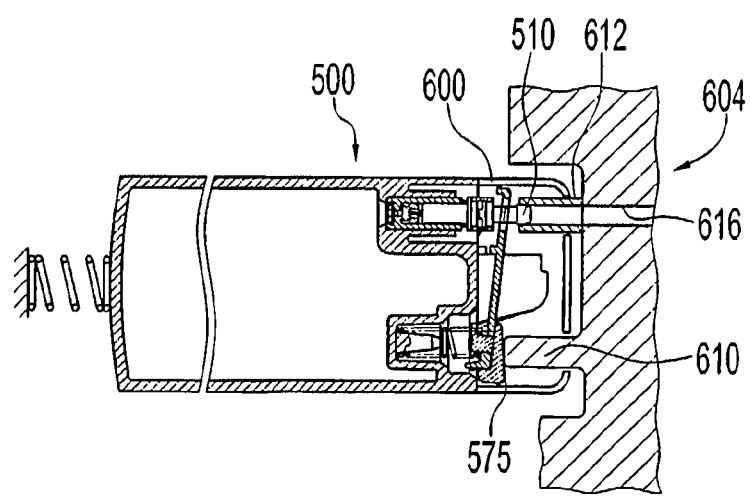

As shown in FIGS. 45 and 46, cover 600 has apertures 618 and 620 defined on the top thereof. In this embodiment cover 600 is fixedly attached to cartridge 500 by various known means. Cover 600 can be soft and flexible or it can be relatively rigid to provide structural support. Apertures 618 and 620 are sized and dimensioned to receive coupling member 612 and plunger 610, respectively, during insertion. Receptacle 604 may also include high force coil spring 622 instead of rear spring clip 533. Receptacle 604 may further include side spring clips 532.

As used herein, high force springs, stiff springs, or springs with high spring constant require a force of at least about 3 kg in a simple or single motion to actuate or depress or insert the cartridge, more preferably at least about 4 kg and most preferably at least about 5 kg. This force can be as low as about 2.25 or 2.5 kg. Such high force can be provided by springs or detents.

Figure 47:
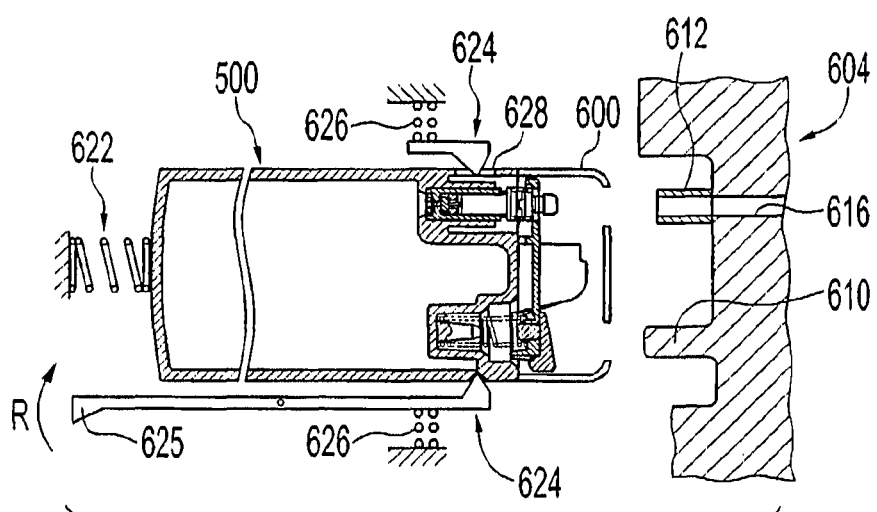
FIG. 47 is a cross-sectional view of a fuel cartridge of FIG. 42 with a cover and a modified receptacle, wherein the cartridge is in an uninstalled position.

With reference to FIG. 47, receptacle 604 may further comprise an additional retention mechanism. This retention mechanism includes at least one detent arms 624 with springs 626 for biasing arms 624 toward the cartridge. Preferably, the spring force provided by springs 626 is significantly less than the spring force provided by spring 622. Detent arms 624 as biased by springs 626 help align and hold cartridge 500 in the proper orientation. Additionally, cartridge 500 may include recesses 628 for receiving tips of detent arms 624 to lock cartridge 500 within receptacle 604. Optionally, arm 624 may be pivotally supported and extend rearward, as shown. At its distal end, arm 624 may have finger actuating portion 625 so that a user may rotate arm 624 in direction R to disengage arm 624 from cartridge 500 to remove the cartridge from receptacle 604.

Figure 48:
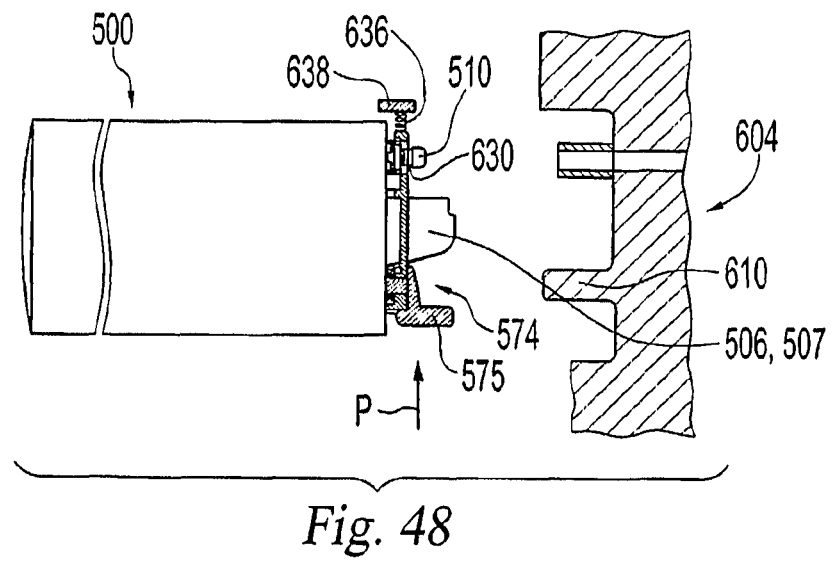
FIG. 48 is a plan view of a modified fuel cartridge, and a partial, cross-sectional view of a receptacle in an uninstalled position.
Figure 49:
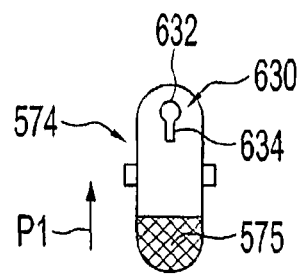
FIG. 49 is a plan view of a valve actuator of FIG. 48.

With reference to FIG. 48, cartridge 500 can also have a sliding actuator adding an additional movement during insertion. Valve actuator 574 in this embodiment is pivotally and slidably coupled to shields 506, 507. Actuator 574 has push button 575 on one end and at the other end aperture 630. Referring to FIG. 49, aperture 630 includes enlarged portion 632 and reduced portion 634. Nozzle 510 in this embodiment is connected to a normally closed valve. Initially, nozzle 510 extends through enlarged portion 632 of aperture 630. Enlarged portion 632 has a diameter greater than that of the nozzle 510 so that pivoting push button 575 does not move or open nozzle 510. Thus, in this position actuator 574 is not operatively associated with nozzle 510. Cartridge 500 further includes spring 636 connecting stop 638 to a portion of valve actuator 574. Spring 636 biases valve actuator 574 toward alignment with enlarged portion 632. Spring 636 may connect valve actuator 574 to another part of cartridge 500, e.g., shields 506, 507.

In order to properly insert cartridge 500, as shown in FIG. 49, the user pushes valve actuator 574 along direction P1 using push button 575 so that nozzle 510 moves into reduced portion 634 of aperture 630. In this position actuator 574 is operatively associated with nozzle 510. Then user installs cartridge 500 into receptacle 604, as discussed above. The L-shape push button 575 cooperates with plunger 610 of receptacle 604 to keep actuator 574 in the engaged position. When the user removes cartridge 500, valve actuator 574 returns to its initial disengaged position due to spring 636.

Figure 50:
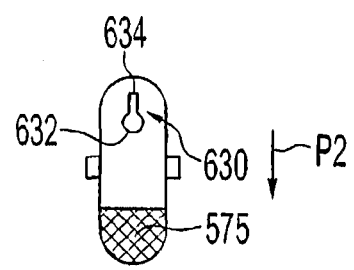
FIG. 50 is a plan view of a modified valve actuator for use with cartridge of FIG. 48.

Alternatively, as shown in FIG. 50, the locations of enlarged portion 632 and reduced portion 634 can be reversed, and valve actuator 574 is first moved in the direction P2 prior to inserting cartridge 500 to receptacle 604. Receptacle 604 may also have a detent or other mechanisms that can hold valve actuator 574 in the engaged position while the cartridge is inserted.

Figure 51:
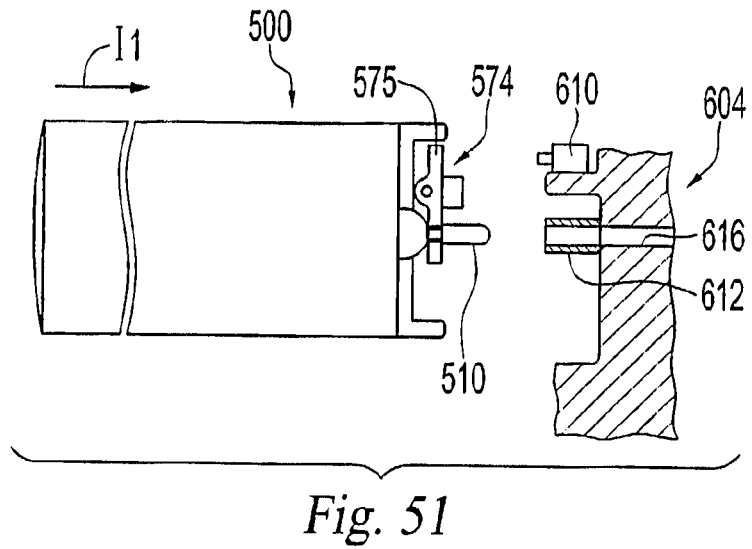
FIGS. 51-52 are plan views of a modified fuel cartridge and partial, cross-sectional views of a modified receptacle, wherein the fuel cartridge and the receptacle are in the uninstalled and installed positions, respectively.
Figure 52:
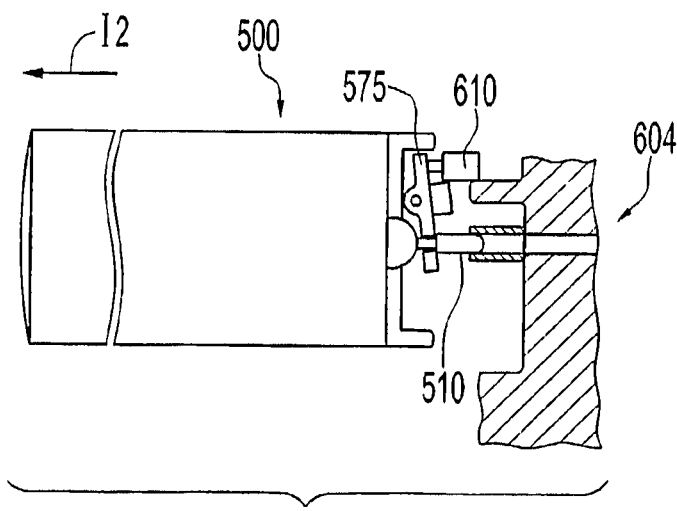

With reference to FIG. 51, receptacle 604 may have a slidable plunger. After cartridge 500 is inserted along direction I1, as discussed above, plunger 610 is slid in direction I2 to depress push button 575 to open the valve. Alternatively, multiple motions including translational and rotational may be required to move plunger 610 into an actuating position. These motions can be guided by features, markings and/or directions on the cartridge or receptacle.

Figure 53:
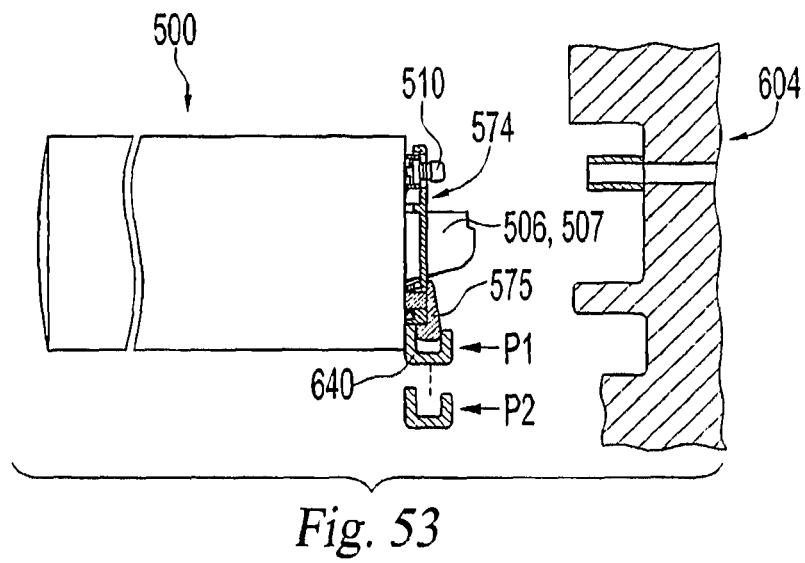
FIG. 53 is a plan view of a fuel cartridge and a partial, cross-sectional view of a receptacle and a removable latch member for use therewith, wherein the removable latch is shown in a blocking and unblocking positions.

FIGS. 53-59 and 65-79 show various embodiments of cartridges including stops, latches or locking members for providing operational resistance to unintended users and/or unintentional actions. With reference to FIG. 53, cartridge 500 and receptacle 604 as previously discussed are shown with removable latch member 640. Clip 640 can be reused by the user by returning the clip to the blocking position. Alternatively, latch 640 in this embodiment is intended as a single-use item and can be a breakaway piece or a clip. Additionally, clip 640 can be designed so that multiple movements of the clip is necessary to remove same. In the present embodiment, latch member 640 has a C-shape to fit around push button 575 of actuator 574 preventing actuation, as shown in position P1. In order to actuate valve 504, 572, latch member 640 is removed from engagement with actuator 574, as shown in position P2.

Figure 54:
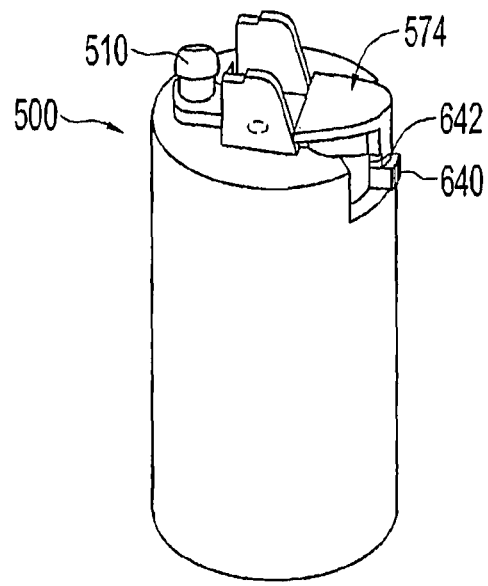
FIG. 54 is a perspective view of a modified fuel cartridge with a movable latch or blocking member.
Figure 55:
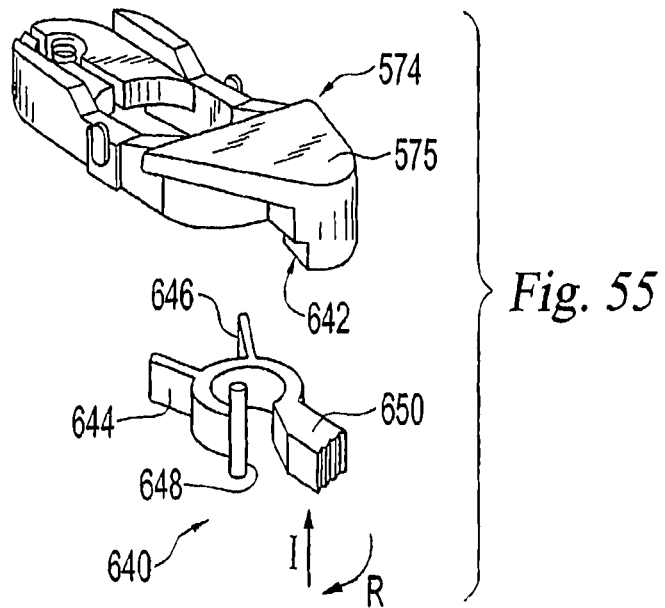
FIG. 55 is an enlarged, exploded view of the valve actuator and the latch member of FIG. 54.
Figure 56A:
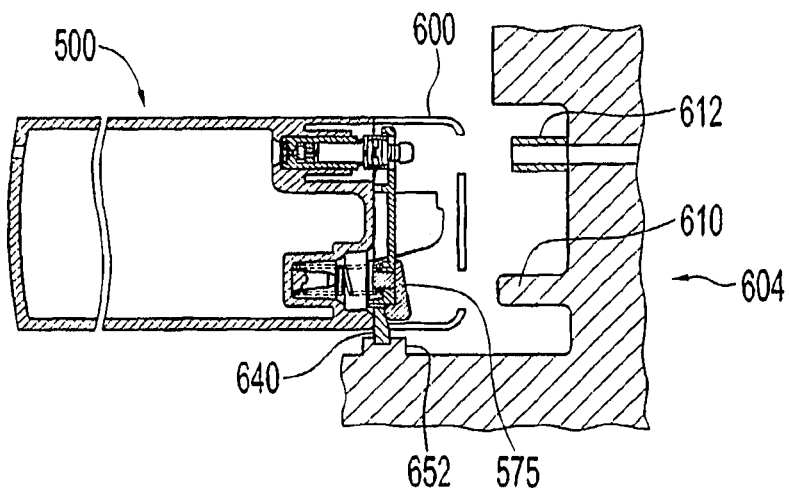
FIG. 56A is a cross-sectional view of the fuel cartridge of FIG. 54 and a modified receptacle, wherein the fuel cartridge is in an uninstalled position.

As illustrated in FIGS. 54-56, cartridge 500 can be used with another latch or blocking member 640. In this embodiment, latch 640 is located inside the cartridge, and actuator 574 defines notch 642 to retain latch 640 in a non-interfering or non-blocking position. Latch member 640 and the modified valve actuator are fully disclosed in U.S. Pat. No. 5,487,657, incorporated by reference herein in its entirety. Latch member 640 is provided with extensions 644, 646 which securely retain latch 640 inside cartridge 500. Latch member 640 is also provided with stop 648. Latch 640 may be provided with finger actuation portion 650, which may contain a ridged surface for increased gripping. Latch 640 in this embodiment is a spring when made out of a flexible material, such as polymers or metals. Spring/latch 640 can be compressed by moving finger actuation portion 650 toward stop 648. Latch 640 automatically returns to the uncompressed state when the force on finger actuation portion 650 is removed.

In the normal position, finger actuation portion 650 is positioned immediately below push button 575 to arrest motion by the actuator that would open valve 504, 572. To allow actuation, finger actuation portion 650 is moved toward stop 648, along direction R. Holding finger actuation portion 650 in this position, finger actuation portion 650 may be moved in direction I so that finger actuation portion 650 is held in notch 642. At this point the cartridge can be inserted into receptacle 604 and plunger 610 can depress actuator 574 to release the fuel.

Referring to FIG. 56, this embodiment of cartridge 500 can have cover 600 and can be used with receptacle 604, as discussed above. To insert cartridge 500, finger actuation portion 650 can be manually moved to the actuation position, i.e., along direction R and direction I, before insertion. Alternatively, receptacle 604 can have angled surface 652 sized and configured to automatically move finger actuation portion 650 in direction R to the actuated position. Angled surface 652 holds finger actuation portion 650 in the actuation position and movement along direction I is not necessary in this embodiment. Upon withdrawal, due to the spring action, finger actuation portion 650 returns to its blocking position.

Additionally, once push button 575 is depressed, i.e., after cartridge 500 is inserted, the finger actuation portion is moved in the direction opposite to I, and when push button 575 and actuator 574 return to the closed position, i.e., when cartridge 500 is withdrawn, finger actuated portion 650 automatically moves along a direction opposite to R and returns to the blocking position.

Figure 56B:
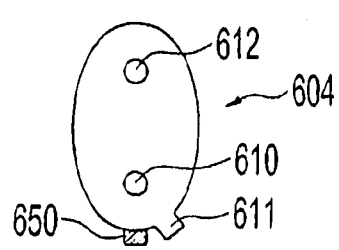
FIG. 56B is a front view of another modified receptacle with a relief.

Referring to FIG. 56b, receptacle 604 can have relief 611, so that cartridge 500 can only be inserted when finger actuation portion 650 is moved to the non-interfering position to align with relief 611. Cartridge 500 may have a notch to hold finger actuation portion 650 as discussed above, or a user may manually hold finger actuation portion 650 to align it with relief 611 during insertion.

Figure 57:
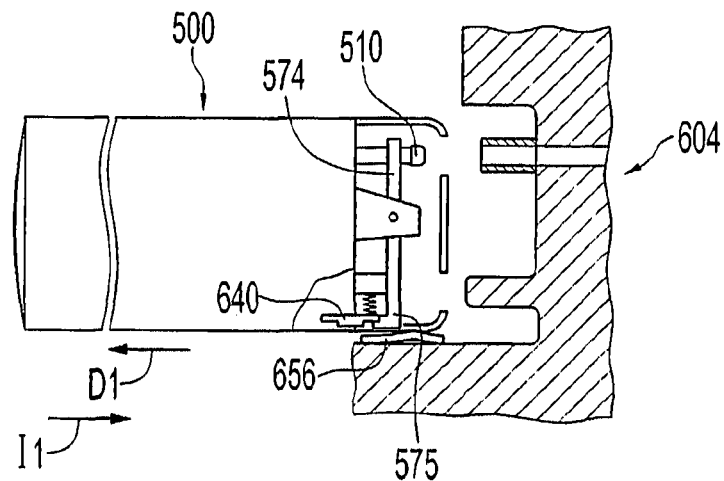
FIGS. 57-58 are plan views of a modified fuel cartridge with another movable latch member and partial, cross-sectional views of a modified receptacle, wherein the fuel cartridge and the receptacle are in the uninstalled and installed positions, respectively.
Figure 58:
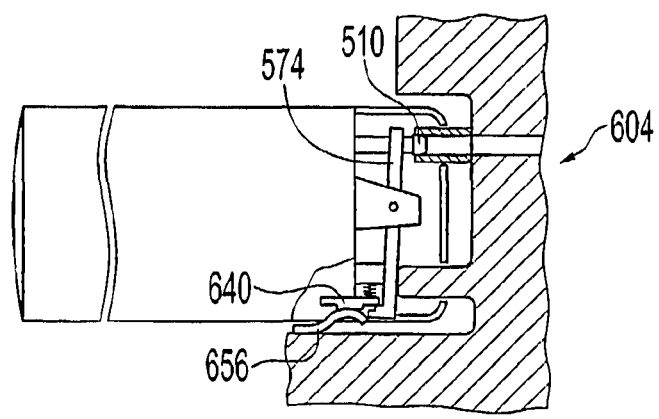
Figure 59C:
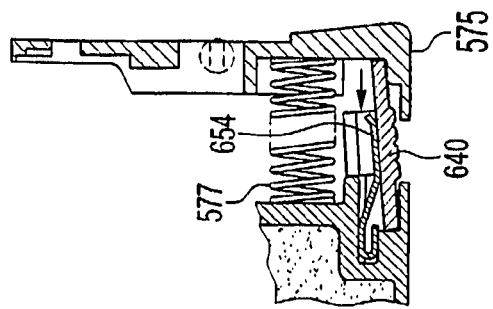
FIGS. 59A-59C are cross-sectional views of a portion of the fuel cartridge and latch member of FIG. 57.
Figure 59B:
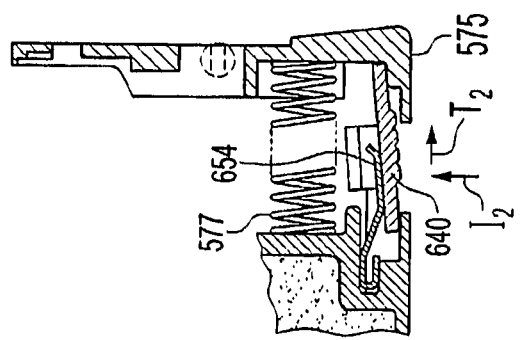
Figure 59A:
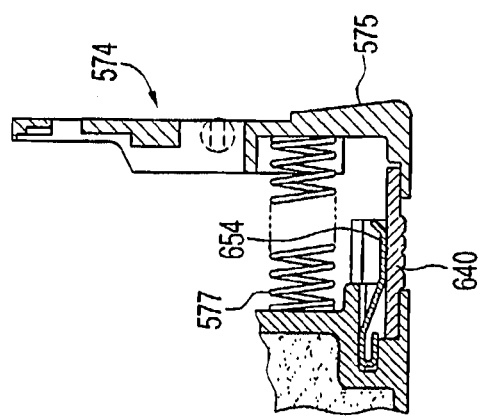

FIGS. 57-58 illustrate another embodiment of latch 640. FIG. 57 illustrates cartridge 500 with cover 600 prior to insertion into receptacle 604. In this embodiment, latch 640 is relatively rigid and is biased by spring 654, as shown in FIGS. 59A-59C. In the blocking position of FIG. 59A, latch 640 is positioned between push button 575 and an outer wall of cartridge 500. The interference between the latch and the push button prevents actuation of valve 504, 572 since nozzle 510 cannot be moved significantly. To actuate push button 575, latch 640 is moved at least inward in inward direction I2 to a non-interfering position. Latch 640 can also be moved upward along direction $T_2$ to retain latch 640 in the non-interfering position, as shown in FIG. 59B. When latch 640 is in the non-interfering position, push button 575 can be depressed, as shown in FIG. 59C, so that nozzle 510 can move to actuate valve 504, 572.

Prior to installation, a user may move latch 640 in directions I2 and $T_2$ to put latch 640 in the non-interfering position. Alternatively, the user may directly insert cartridge 500 to receptacle 604 without manipulating latch 640. As shown in FIGS. 57 and 58, receptacle 604 has biased spring 656, which bends to allow cartridge 500 to pass but exerts force on latch 640 to move it to the non-interfering position.

After actuation of the valve or when cartridge is removed from receptacle push button 575 returns to its original position and spring 654 biases latch 640 back to the non-interfering position. This latch is fully described in U.S. Pat. No. 5,584,682, which is incorporated herein by reference in its entirety.

Figure 60:
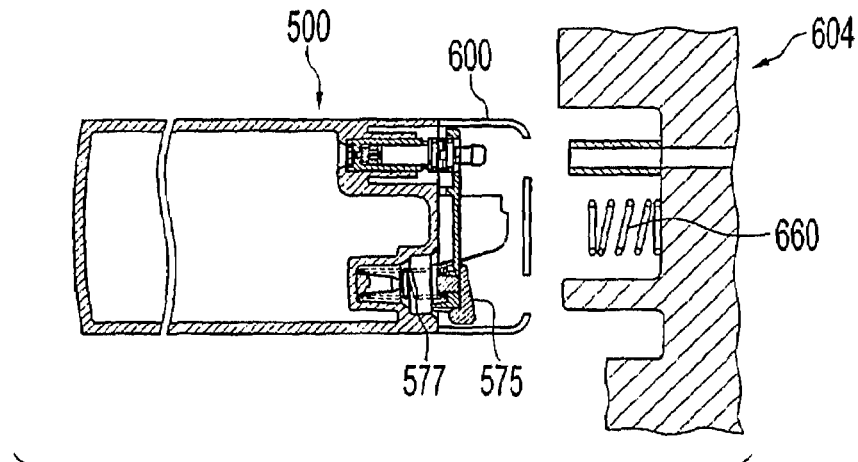
FIGS. 60-61 are partial, cross-sectional views of a modified fuel cartridge with a high force spring and a modified receptacle with a high force spring, wherein the fuel cartridge and the valve assembly are in the uninstalled and installed positions, respectively.
Figure 61:
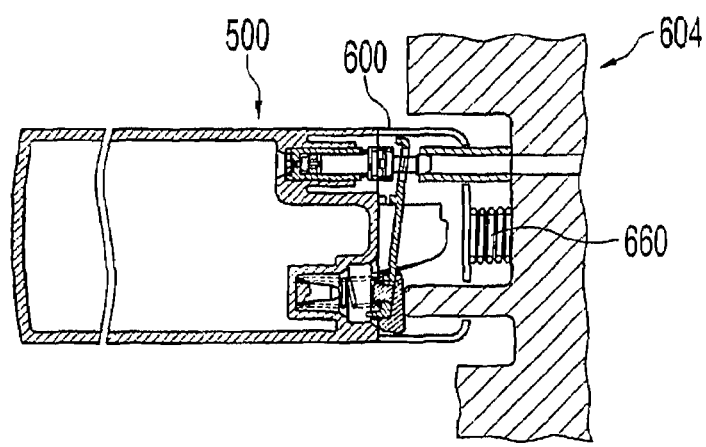

With reference to FIGS. 60-61, receptacle 604 may also have spring 660, which is depressed during the insertion of cartridge 500. Preferably, spring 660, which is similar to high force spring 622, has a high spring constant to increase the difficulty of inserting the cartridge. Alternatively, spring 577 biasing push button 575 can also be made stiffer to resist unintended insertion. High force springs are disclosed in U.S. Pat. No. 5,854,530, which is incorporated herein by reference in its entirety. Biased retaining arms 624 of FIG. 47 can also be used with this embodiment. In addition, nozzle 510 can be extended to insure sealing due to the force/movement and tolerances of the location on the cartridge in relation to receptacle 604 and plunger 610 can be spring loaded to insure that actuator 574 is depressed.

Figure 62:
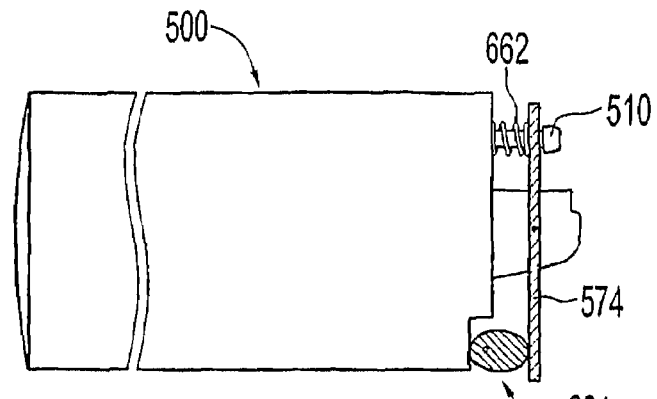
FIGS. 62-63 are plan views of a modified fuel cartridge with cross-sectional views of a rotatable cam, wherein the fuel cartridge and the valve assembly are in the blocking and unblocking positions, respectively.
Figure 63:
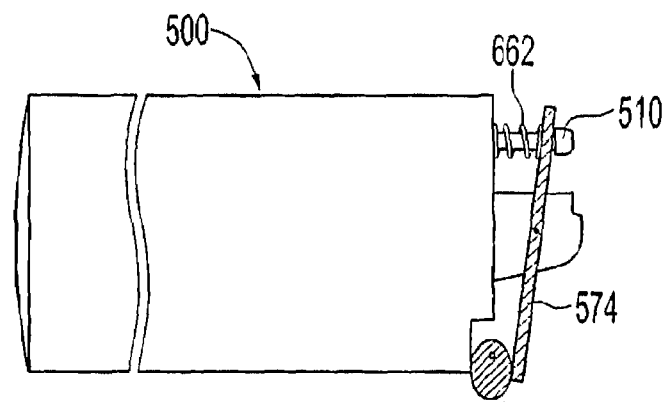
Figure 64:
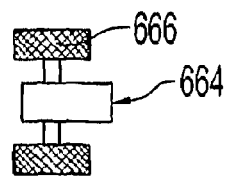
FIG. 64 is a plan view of the cam of FIG. 62.

FIGS. 62-64 illustrate another embodiment of cartridge 500. Here, nozzle 510 is being biased upward by spring 662. Spring 662 also pushes pivotal valve actuator 574 in the same direction. In the blocking position, cam 664 is positioned at the opposite end of actuator 574 to block valve actuator 574 from moving in the direction that spring 662 urges. Cam 664 essentially has an oval shape with a longer side and a shorter side. Cam 664 can be moved to the non-interfering position by rotating until its shorter side is under push button 575 to allow the valve actuator to move, thereby allowing spring 662 to open nozzle 510. As best shown in FIG. 64, cam 664 can be connected to finger actuation portions 666 via a spindle. A user may rotate 664 by twisting finger actuation portions 666, which can extend or protrude outward from the housing of the fuel cell or electronic device to be available to the user. Receptacle 604 may retain plunger 610 which would prevent the full insertion of cartridge 500 until cam 664 is rotated to the non-interfering position. Preferably, normally closed valve 504 is used with this embodiment.

Figure 65:
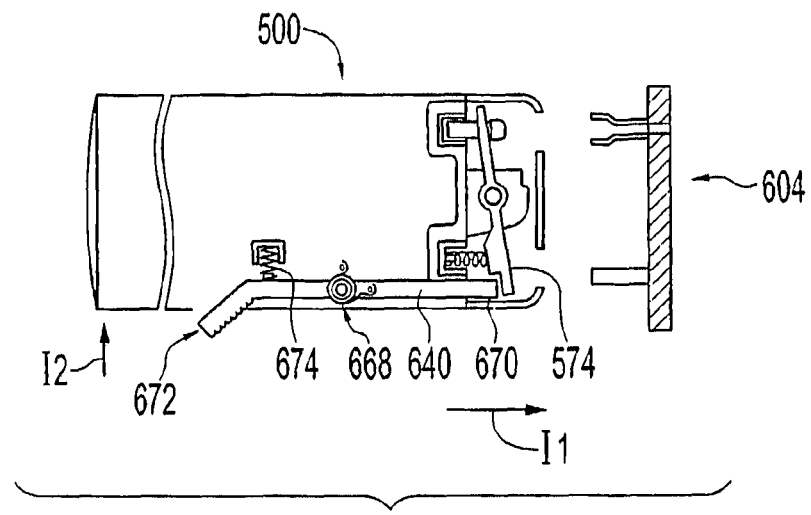
FIGS. 65-66 are plan views of a modified fuel cartridge with partial, cross-sectional views of a pivotable latch member and a receptacle, wherein the fuel cartridge and the valve assembly are in the uninstalled and installed positions, respectively.
Figure 66:
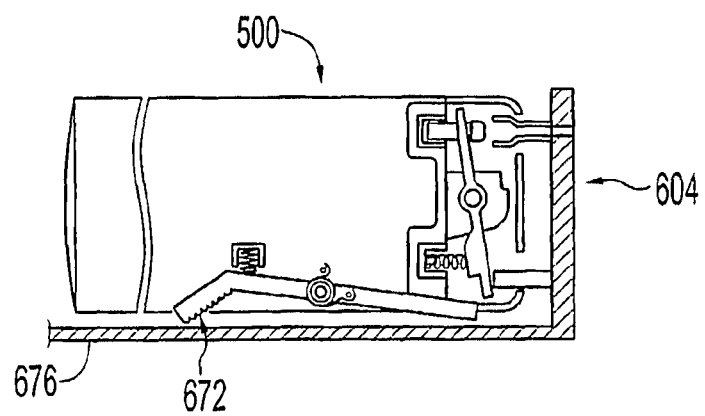

Referring to FIGS. 65 and 66, latch 640 can be pivotally connected to cartridge 500 at 668. In this embodiment, pivotal latch 640 is generally elongated and at one end has blocking portion 670. At the other end, latch 640 has finger actuation portion 672. Latch 640 is biased into the blocking portion as shown in FIG. 65, for example, by spring 674 and/or by the torsional spring mounted to pivot 668. Latch 640 can be moved to the non-blocking position when a user presses finger actuation portion 672 in direction I2, as shown in FIG. 66. An advantage of this embodiment is that finger actuation portion 672 is spaced apart from push button 575 so that two hands are required to operate both of the components simultaneously to actuate the valve. Hence, this increases the difficulty of operating the valve in cartridge 500.

To insert cartridge 500 into receptacle 604, a user may depress finger actuation portion 672 prior to or during insertion. Alternatively, receptacle 604 may have side wall 676 that depresses finger actuation portion 676 during insertion, as shown in FIG. 66. Wall 676 retains latch 640 in the non-blocking position while cartridge 650 is retained in receptacle 604. Additionally, a second latch 640, which can selectively block the other end of actuator 574, may be provided opposite to the first latch 640 so that a user uses two fingers to press on finger actuation portions 672.

Figure 69:
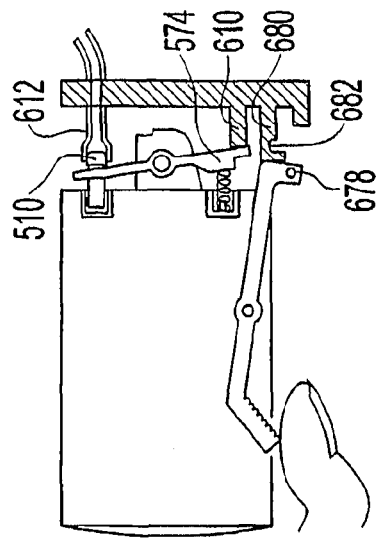
FIG. 69 is a plan view of the fuel cartridge and a partial, cross-sectional view of the receptacle of FIG. 67, wherein the fuel cartridge is in a partially installed position and the latch member is in an intermediate latch position.
Figure 70:
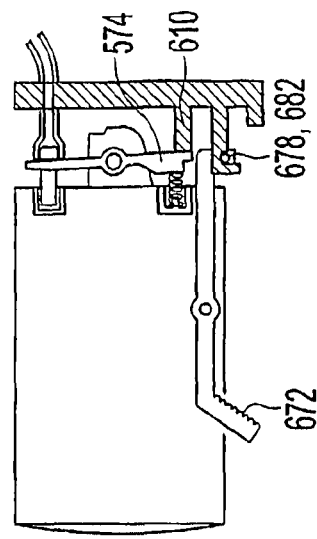
FIG. 70 is a plan view of the fuel cartridge and a partial, cross-sectional view of the receptacle of FIG. 67, wherein the fuel cartridge is in an installed position, the valve actuator is activated, and the latch member is in a second latch position securing the latch member in an unlocked position.
Figure 67:
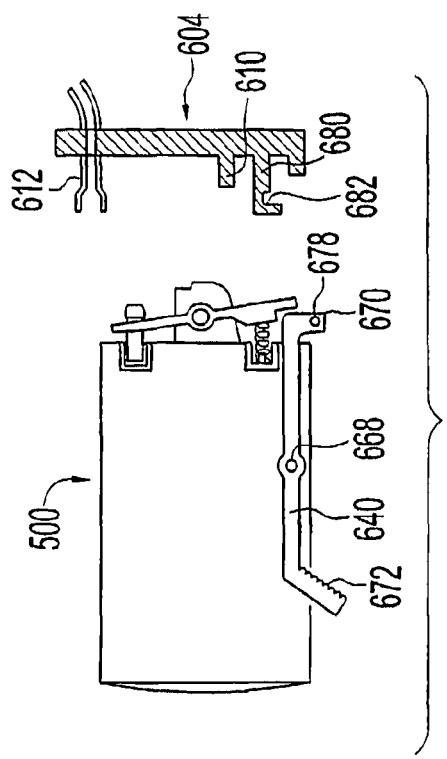
FIG. 67 is a plan view of a modified fuel cartridge with a partial, cross-sectional view of a modified pivotable latch member and a receptacle, wherein the fuel cartridge is in an uninstalled position and the latch member is in a locking position.
Figure 68:
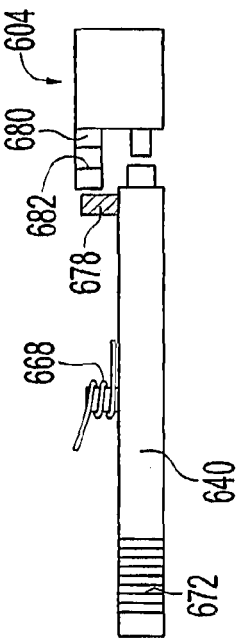
FIG. 68 is a plan view of the latch member and the receptacle of FIG. 67.

FIGS. 67-70 illustrate another way of retaining pivotal latch 640 in the non-interfering position while inside receptacle 604. Here, latch 640 has blocking end 670 with knob 678 adapted to cooperate with receptacle 604 to remain in the non-interfering position. In addition to plunger 610, receptacle 604 has rod 680 which defines notch 682. Notch 682 is adapted to receive and retain knob 678 of latch 640. When a user depresses actuator portion 672, end 670 moves to a non-interfering position with actuator 574. As plunger 610 depresses push button 575/valve actuator 574, notch 682 and knob 678 align with each other. The user then releases finger actuation portion 672 and knob 678 is retained in notch 682, and pivotal latch 640 is held by receptacle 604 in the non-interfering portion. To remove cartridge 500, the user depresses finger actuation portion 672 before and while removing cartridge 500 from the receptacle. Also as illustrated in FIG. 69, finger actuating portion 672 should be fully depressed so that the opposite end of latch 640 clears notch 682, so that cartridge 500 can be fully inserted.

Figure 71:
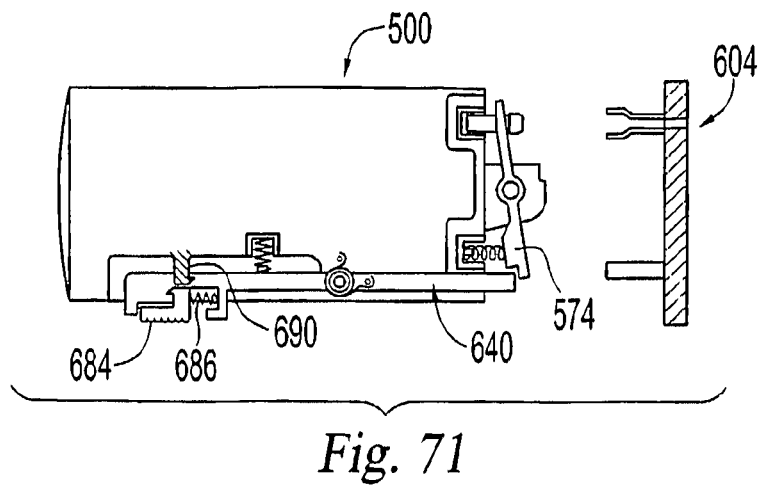
FIGS. 71-73 are plan views of a modified fuel cartridge with a two-motion pivotable latch member and partial, cross-sectional views of a receptacle, wherein the latch is in the locked and unlocked positions.
Figure 72:
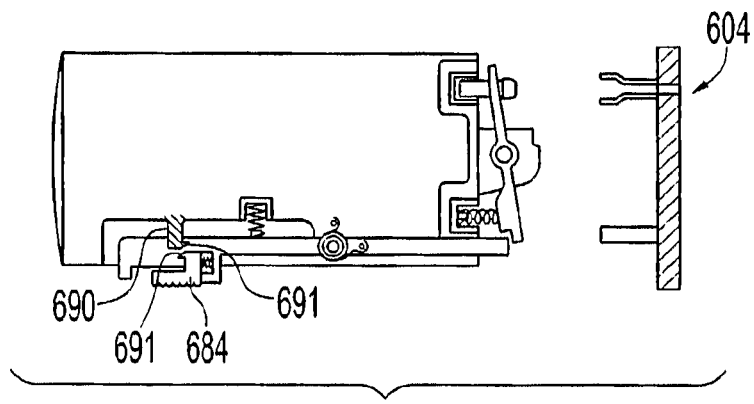
Figure 73:
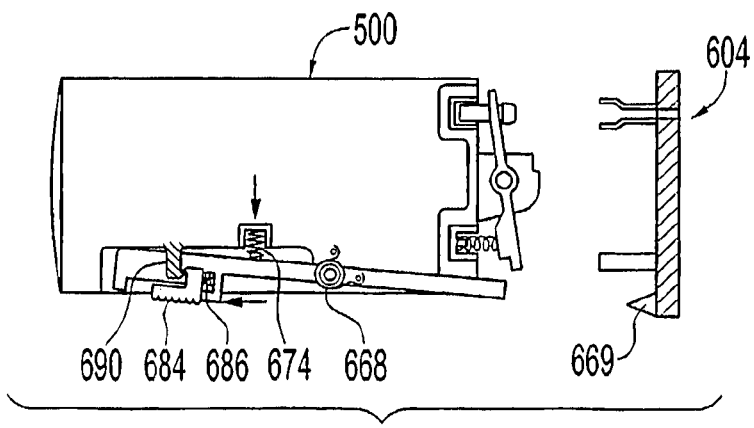

The pivotal latch member of FIGS. 65-66 cap also be retained in the non-interfering or non-blocking position in another manner, as shown in FIGS. 71-73. In this embodiment, latch 640 has a biased retaining member 684 slidably disposed to latch 640. Retaining member 684 is biased by spring 686 so that retaining member 684 can slide relative to latch 640. The body of cartridge 500 has stop 690, which in the interfering or blocking position, is located opposite to and blocks the movement of latch 640 from the interfering position to the non-interfering position. In the interfering position, latch 640 prevents the depression of actuator 574. To move latch 640 to the non-interfering position, a user first moves retaining member 684 against the biasing force of spring 686 until retaining member 684 no longer aligns with stop 690, as shown in FIG. 72. Thereafter, pivotal latch 640 can be moved to the non-interfering position, as discussed above and shown in FIG. 73. In this position, retaining member 684 is pressed against stop 690 by spring 686 and latch 640 is retained in the non-interfering position. Optionally, retaining member 684 and stop 690 may have corresponding detents 691 to hold latch 640 in the non-interfering position. To remove cartridge 500 the user again pushes retaining member 684 against spring 686 to release the contact between stop 690 against spring 686 to release the contact between stop 690 and retaining member 684. Latch 640 would then return to the blocking position due to the force of springs 674 and/or the torsional spring around pivot 668. Alternatively, receptacle 604 may have release detent 669, as shown in FIG. 73, so that when cartridge 500 is inserted release detent 669 pushes on one end of latch 640 to rotate the latch to release retaining member 684 from stop 690. As long as cartridge 500 is inside receptacle 604, latch 640 does not return to the interfering position until cartridge 500 is withdrawn. The latch shown in FIGS. 71-73 is disclosed in commonly owned U.S. patent application Ser. No. 10/389,975, which is incorporated herein by reference in its entirety.

Figure 74:
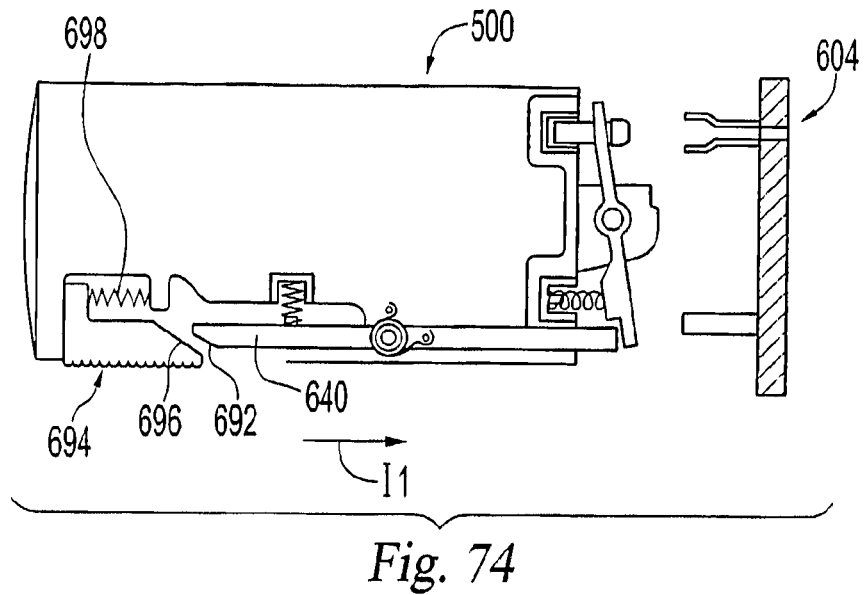
FIGS. 74-75 are plan views of another modified fuel cartridge with another two motion pivotable latch member and partial, cross-sectional views of a receptacle, wherein the latch is in the locked and unlocked positions.
Figure 75:
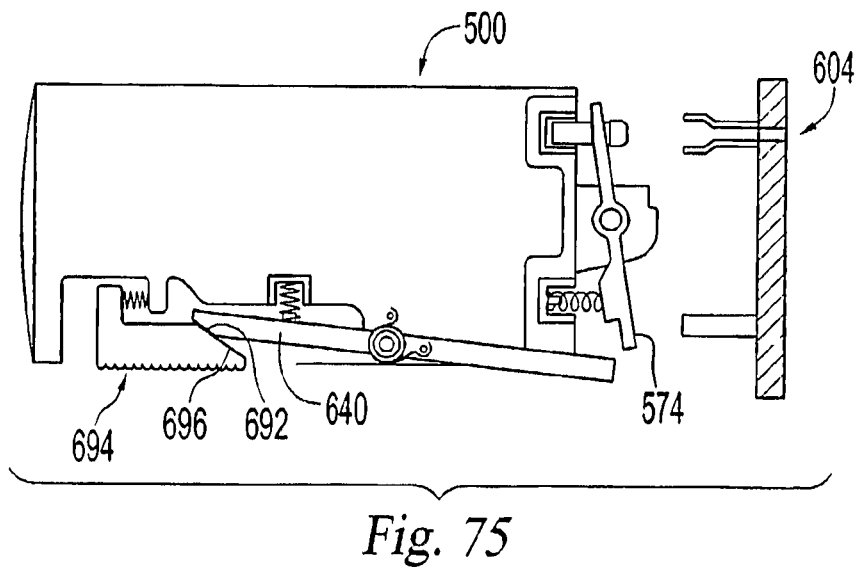

Another pivotal latch 640 is shown in FIGS. 74-75. Here, lower end 692 of latch 640 is angled to act as a cam surface. Cartridge 500 also has finger actuating portion 694, which includes angled upper end 696 that acts as a cam surface cooperating with lower cam surface 692. Finger actuation portion 694 is biased against the body of cartridge 500 by spring 698.

Before cartridge 500 is inserted into receptacle 604, a user moves finger actuating portion 694 against spring 698 toward latch 640, so that interaction of angled surfaces 692 and 698 causes pivoting of latch 640 to the non-interfering position, as shown in FIG. 75. Then, cartridge 500 is inserted and actuated as discussed above. After the insertion of cartridge 500, finger actuation portion 694 normally returns to its initial position by force of springs 698. Upon removal of cartridge 500, and release of latch member 640, the latch member is biased back into its initial locked position, as shown in FIG. 74. The latch shown in FIGS. 74-75 is disclosed in commonly owned U.S. patent application Ser. No. 10/647,505, which is incorporated herein by reference in its entirety.

Figure 76:
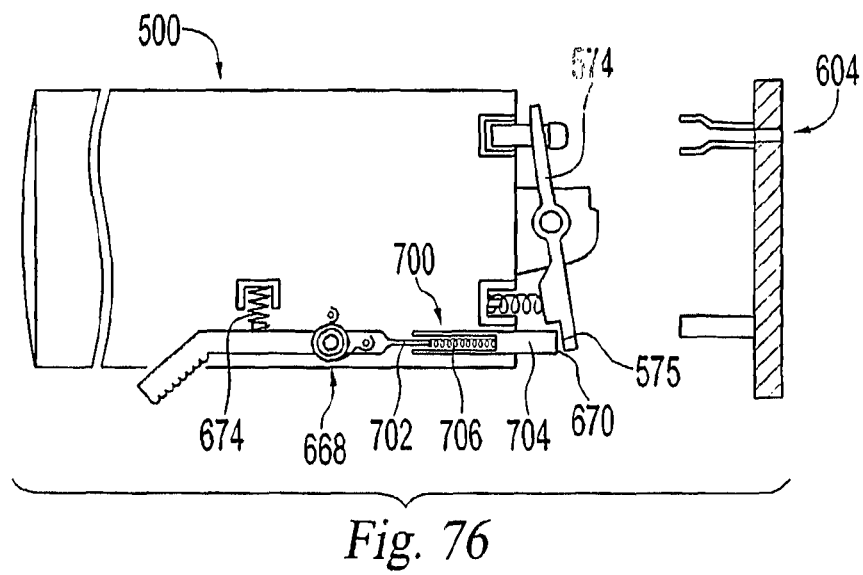
FIGS. 76-77 are plan views of a modified multi-mode fuel cartridge with another two-piece pivotable latch member and partial, cross-sectional views of a receptacle, wherein the fuel cartridge is in the interfering and actuated positions, respectively.
Figure 77:
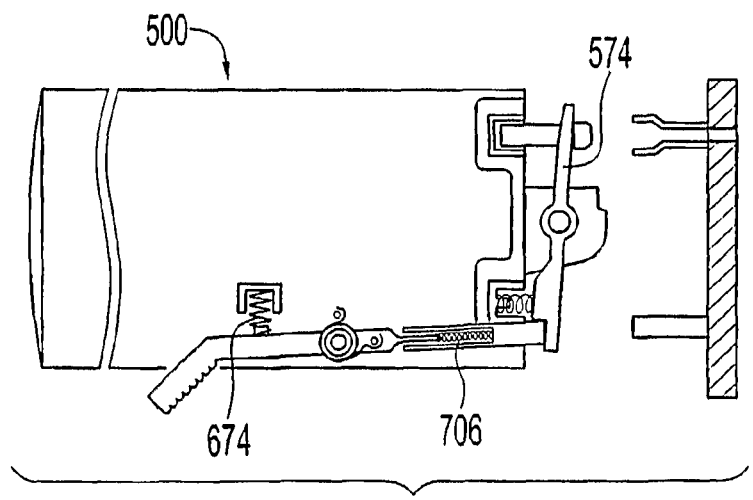

Referring to FIGS. 76-77, pivotal latch 640 of FIGS. 65-66 can be operated in multiple modes. Pivotal latch 640 can be operated in the fashion described above with respect to FIGS. 65-66. In another mode, latch 640 can have spring-loaded telescopic length or portion 700 disposed between high force end 670 and pivot point 668. Length 700 comprises inner portion 702 disposed inside outer portion 704. Outer portion 704 is supported on an inner portion 702 by spring 706. Preferably, spring 706 is stiff or has high spring constant to resist compression. A force acting on push button 575 exceeding a high predetermined level is necessary to compress length 700 to actuate the valve. Multi-mode latches are disclosed in commonly owned U.S. Pat. Nos. 6,488,492B2 and 6,726,469B2, the disclosures of which are incorporated herein by reference. In yet another mode, biasing spring 674 can also be stiff or has a high spring constant to resist compression.

Figure 78:
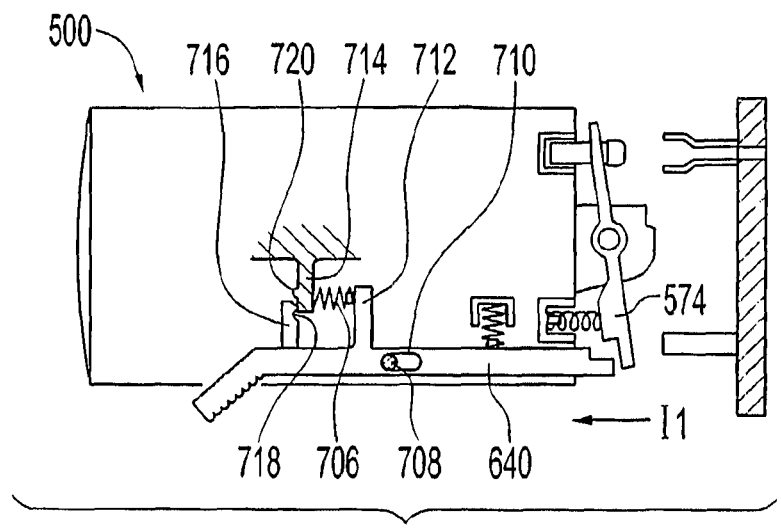
FIGS. 78-79 are plan views of a modified fuel cartridge with an alternative pivotable latch member and partial, cross-sectional views of a receptacle, wherein the fuel cartridge is in the interfering and non-interfering positions, respectively.
Figure 79:
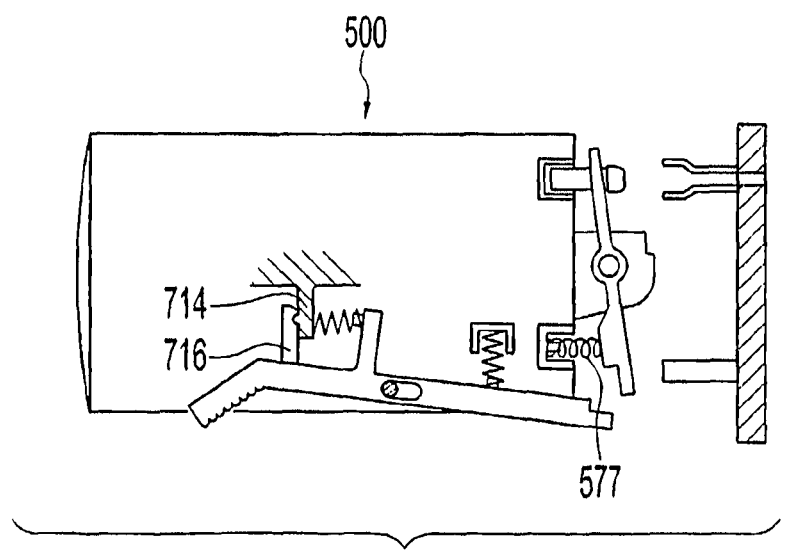

Another multiple-mode latch 640 is illustrated in FIGS. 78-79. Instead of spring-loaded telescopic length 700, pivotal latch 640 is allowed limited translational movement along direction I1 provided by pin 708 on the body of the cartridge disposed in an elongated slot 710 on latch 640. High spring constant spring 706 in this embodiment is disposed between arm 712 of latch 640 and stop 714 on the body of cartridge 500. The operation of the multi-mode latch in this embodiment is similar to the operation of multi-mode latch 640 of FIGS. 76-77, i.e., actuator 574 can be actuated by rotating latch 640 to a non-interference position or by exerting a force higher than a predetermined level. Additionally, features from the embodiment of FIGS. 76-77 can be incorporated into this embodiment. For example, stiff spring 674 and/or telescopic arm 700 can be incorporated into the embodiment of FIGS. 78-79.

Additionally, as shown in FIG. 78, latch 640 may further have arm 716 with notch 718 adapted to cooperate with a pin 720 on stop 714 to retain pivotal latch 640 in the non-interfering position, as shown. To increase the difficulty of actuating the valves in cartridge 500, spring 577 biasing valve actuator 574 can be made stiffer to resist compression.

Figure 80:
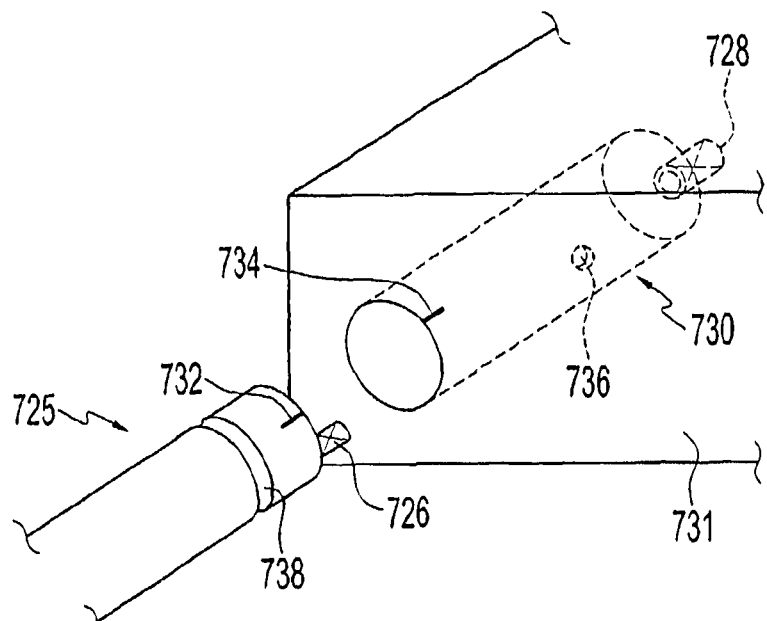
FIG. 80 is a partial perspective view of another cartridge of the present invention and corresponding receptacle in the electronic device or fuel cell.

In other embodiments of the present invention, the operational resistance of the fuel supply systems relies on the cognitive ability of the intended users. In FIG. 80, cartridge 725 has eccentrically located valve component 726, which is adapted to create a flow path with valve component 728 disposed in receptacle 730. Receptacle 730 is disposed in electrical device 731, which is powered by fuel cell FC, or is otherwise connected to fuel cell FC. Cartridge 725 is substantially circular, but can have other shapes. At least one of the valve components 726 and 728 has an internal seal and preferably both valve components have internal seals, as discussed above. An inter-component seal between the two valve components can be established before a flow path is established. Valve components with internal seals and inter-component seals are fully discussed in the parent '006 application.

Preferably, unless cartridge 725 and receptacle 730 are properly aligned, no flow path between valve components 726 and 728 can be established. Since valve component 728 is not normally visible, as shown, matching markers 732 and 734 are provided to assist in the alignment. The alignment of markers 732 and 734, coupled with the location of valve component 728 deep in the receptacle, requires a cognitive ability that is not readily possessed by unintended users. Additionally, receptacle 730 may have at least one detent 736 adapted to snap into channel 738 on cartridge 725 when the cartridge is inserted. Detent 736 and channel 738 provide a feedback, such as a snapping sound or a click when engaged. Detent 736 and channel 738 are positioned so that when they are engaged valve components 726 and 728 are spaced apart (even if aligned) or are otherwise unengaged. At this point, the unintended users may think that full insertion has been completed and would not push the cartridge in further. Intended users can be instructed, e.g., by brochures or product inserts, to push the cartridge further until the valve components are engaged. Additionally, when valve components 726 and 728 are engaged, another snapping sound or click is provided to signal to the intended users that the cartridge is fully and properly inserted.

Figure 81:
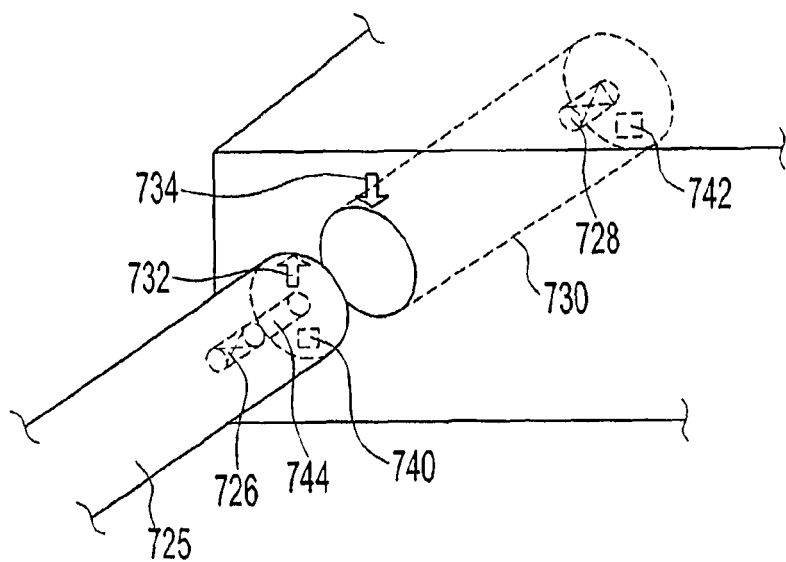
FIG. 81 is a partial perspective view of another cartridge of the present invention and corresponding receptacle in the electronic device or fuel cell.

In another embodiment shown in FIG. 81, valve components 726 and 728 are located along the centerline of the cartridge and the receptacle. In this case, cartridge 725 has an eccentrically located sensor 740 and receptacle 730 has a corresponding eccentrically located sensor 742. Unless sensors 740 and 742 are aligned, no flow path can be established between the valve components. In one example, sensors 740 and 742 can be electrical or magnetic sensors that when aligned can return a signal when queried by a controller. If the correct signal is received, then the controller can open valve component 728, which can be a solenoid valve, to open the fuel path, or the controller can open another flow restrictor downstream of valve component 728. Alternatively, sensors 740 and 742 can be a projection and a cavity adapted to receive the projection. Until the projection and the cavity are aligned and the projection is received in the cavity, valve components 726 and 728 are spaced apart and do not engage. The projection can be on the cartridge or on the receptacle. Hence, in this embodiment, unless cartridge 725 and receptacle 730 are properly aligned, the valve components can be electrically or spatially disengaged.

Another feature of this embodiment is that valve component 726 on cartridge 725 is located at or near the bottom of valve channel 744 to limit access to valve component 726 and, therefore, the fuel in the cartridge when the cartridge is not connected to the receptacle. In this case, valve component 728 is upstanding from the inner surface of receptacle 730 and is adapted to be received inside valve channel 744 to engage valve component 726. To further limit access to unintended users, the diameter of valve channel 744 can be made small, as disclosed in related '006 application. For example, the diameter of valve channel 744 is less than about 10 mm and more preferably less than about 5 mm. Also, valve component 726 is located preferably at least about 2 mm and more preferably at least 5 mm from the opening of valve channel 744.

Figure 82A:
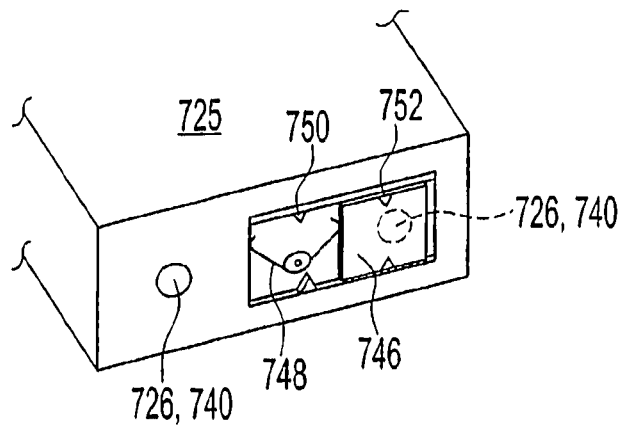
FIGS. 82A-82B are perspective front views of a cartridge with a sliding gate.
Figure 82B:
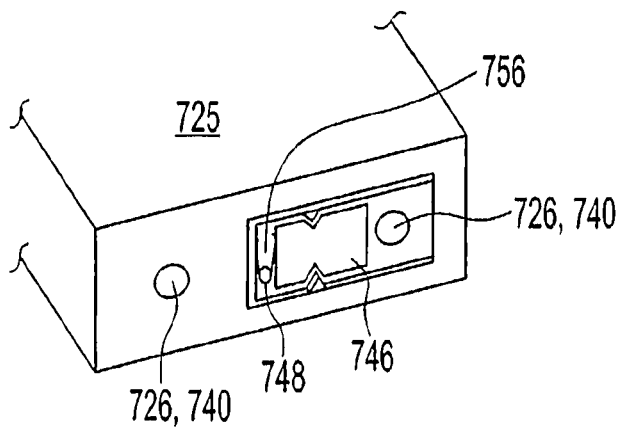

In accordance with another aspect of the present invention, cartridge 725 has valve component 726, sensor/projection 740, and a movable gate disposed thereon to limit access to either the valve component or the sensor/projection, when cartridge 725 is not connected. As shown in FIGS. 82a and 82b, cartridge 725 has sliding gate 746, which is configured to cover either valve component 726 or sensor/projection 740, or both. Gate 746 can be spring-loaded by spring 748 to bias gate 746 to the covered position and gate 746 is movable to the open position to expose valve component 726 or sensor/projection 740, before cartridge 725 is inserted into receptacle 730. Gate 746 can be opened by the user or by other forces, e.g., magnetic or electrical force.

Figure 83:
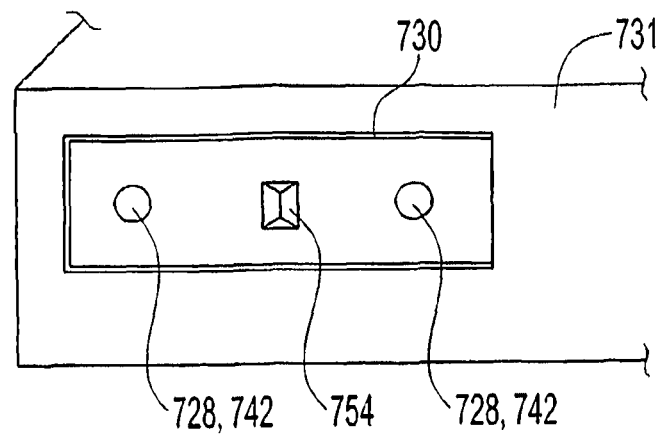
FIG. 83 is a perspective front view of a receptacle having a detent to release the gate from the opened position to return the gate to the closed position when the cartridge is removed from the receptacle.

The tracks, on which sliding gate 746 is movable, may have detents 750 that are adapted to engage notches 752 and hold gate 746 in the open position. Receptacle 730, as shown in FIG. 83, has matching valve component 728 and matching sensor/cavity 742. Valve components 726, 728 and sensors or projection/cavity 740, 742 are discussed above with respect to FIGS. 80-81. Receptacle 730 may also have release ramp 754. After the cartridge is inserted, release ramp 754 enters space 756 and overcomes the holding force between detents 750 and notches 752. Spring 748 then biases gate 746 to contact either engaged valve components 726/728 or engaged sensors or projection/cavity 740/742. Since these components are engaged, gage 746 is stopped and cannot close. However, as the cartridge is removed from the receptacle, these components are disengaged and gate 746 is automatically returned to its closed position shown in FIG. 82a. Gate 746 can also be sized and dimensioned to cover the entire opening of receptacle 730, and gate 746 may comprise two or more gates.

In another embodiment, gate 746 can be pivotally connected to cartridge 725. For example, gate 746 can be pivoted at one corner to the front face of the cartridge and a torsional spring can bias the gate to the closed position.

Figure 84:
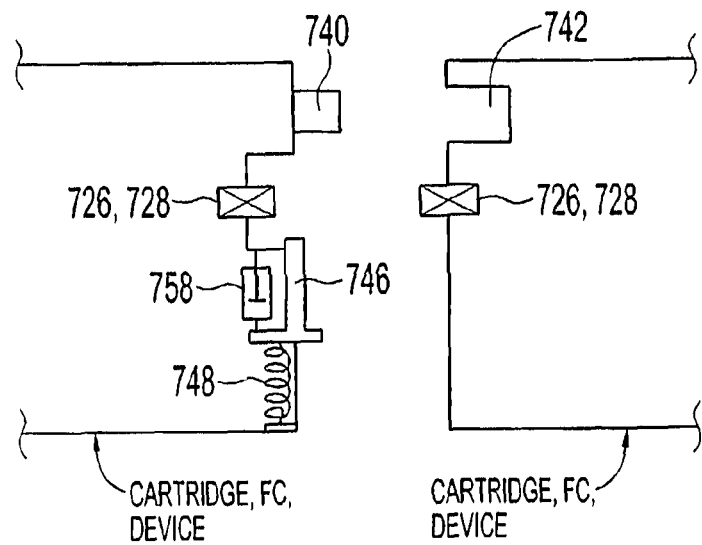
FIG. 84 is a schematic top view of a cartridge fuel cell or device having time delay gate.

In another embodiment, spring-biased gate 746 can be opened for a predetermined amount of time before it closes, so that the intended user has a fixed amount of time to insert cartridge 725 into receptacle 730. This time period is predetermined so that unintended users would generally not have sufficient time to insert. As shown in FIG. 84, spring-biased gate 747 is connected to damper 758. After gate 746 is moved to the open position as shown, spring 748 exerts a force on gate 746 toward the closed position. Damper 758 slows, but normally cannot stop the movement of gate 746. Mechanical dampers are well known in the art. One exemplary damper is the damper attached to spring-loaded doors to slow the closing of the doors. Typically, these dampers have a sealed container of fluid, e.g., a gas (air) or a liquid (oil) and a plate. The plate is pushed by a spring against the viscosity of the fluid. As stated above, gate 746 can be provided on the cartridge, on the FC or on the device. Alternatively, the damper can be replaced by a metal spring that can be compressed and can remain in the compressed state for a short duration of time, e.g., a few seconds, before the spring flexes back to its uncompressed length. Such springs are typically used in children's pop-up toys.

Figure 84A:
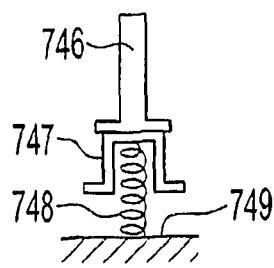
FIGS. 84A and 84B are an alternate time delay gate.
Figure 84B:
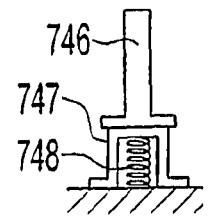

Additionally as illustrated in FIGS. 84a and 84b, the damper can be replaced by suction cup 747 positioned over a spring, such as spring 748. When gate 746 is opened, suction cup 747 is attached by suction to surface 749 and compresses spring 748 therein. Since surface 749 is seldom truly flat, the suction between the suction cup and surface 749 can only resist the biasing force of spring 748 for a relative short duration of time, e.g., for a few second, before spring 748 overcomes the suction force and returns gate 746 back to the closed position.

In another embodiment, the fuel supply system has an on/off switch 760. Switch 760 is operatively connected to a power source, e.g., a battery or the fuel cell, and the power source is connected to a solenoid actuator 762. Each of the power source, the switch and/or the solenoid actuator can be located on cartridge or fuel supply 725, on fuel cell FC or on the device, as illustrated in FIGS. 85 and 87. When switch 760 is closed or in the ON position, solenoid actuator is activated to open gate 746 and hold it in the open position to expose valve component 726 or sensor 740 previously covered by gate 746. Alternatively, solenoid actuator 762 and valve component 726 can be integrated together, or be replaced by a solenoid valve, so that when switch 760 is in the ON position, the power source opens valve component 726 and when switch 760 is in the OFF position, valve component 726 is closed. Additionally, the system shown in FIG. 87 can have optional switch 761, which separately controls the opening and closing of gate 746. In this configuration, when switch 760 is closed, gate 746 is not immediately opened. Hence, the user can insert cartridge 725 into the device or connect cartridge 725 to a fuel cell. Then, the device or the fuel cell through a controller closes switch 761 to open gate 746. Alternatively, the receptacle may have a device, e.g., a magnet, that closes switch 761 during the insertion so that gate 746 opens before the insertion is completed so that valve 726 and/or sensor 740 are exposed to complete the insertion.

An advantage of this embodiment is that when the power source is located on the fuel cell or the electronic device that the fuel cell powers and cartridge 725 is separated therefrom, valve component 726 and/or gate 746 cannot be opened and the fuel contained in the cartridge is isolated. An advantage of including optional gate 761 is that the user can activate switch 760 without opening gate 746 and thereby limit access to valve 726, 740 while the cartridge is outside of the device or fuel cell.

The exemplary paths that a finger-actuated portion 764 can be moved by the user to move switch 760 from the OFF position to the ON position are illustrated in FIGS. 86a-d. The more tortuous paths provide more operation resistance to unintended users. Other paths can be selected. A direct or straight path is shown in FIG. 86a. A path that requires at least two movements of finger actuated portion 764 is shown in FIG. 86b. A curvilinear path is shown in FIG. 86d. A path having multiple OFF positions is illustrated in FIG. 86c. This path has the capability of having the finger-actuated portion starting at different positions and the actual paths to the ON position can be different each time. An advantage of this multiple path approach is that an unintended user may not be able to master a particular path to the ON position either by watching an intended user or by trial and error. Hence, operation of the fuel supply system of FIG. 86c demands higher cognitive ability.

Switch 760 can be biased to the OFF position as illustrated schematically in FIG. 88a. When such biased switch 760 is positioned on the cartridge, receptacle 730 can have a return ramp 766 disposed thereon as shown in FIG. 89a. Return ramp 766 is slanted as shown, so that as cartridge 725 is withdrawn in the direction indicated by the arrow, finger actuation portion 764 rides down the ramp and away from the ON position. The biasing force then can return the switch to the OFF position. An exemplary upstanding profile of return ramp 766 is shown in comparison to the upstanding profile of finger actuation portion 764 in FIG. 90. When finger actuation portion 764 is riding on return ramp 766, the ramp should be sufficient in height to engage portion 764, and after portion 764 has returned to the OFF position the ramp should be sufficiently low to allow clearance for the withdrawal of the cartridge, including the switch. Ramp 766 can have a sawtooth profile as shown or it may have a square-wave profile.

Referring to FIG. 88b, finger actuation portion 764 can be sized and dimensioned to be lower than the side wall of the cartridge, fuel cell or device. An advantage of having finger actuation portion 764 withdrawn is that an adult user who would have meatier fingers than children can push the pulp of his/her finger to contact finger actuation portion 764 to move switch 760. Younger children may not be able to access the withdrawn switch. Similarly, finger actuation portion 672 (FIGS. 65-66, 69-73) and finger actuation portion 694 (FIGS. 74-75, 76-79) can also be made in the withdrawn configuration to increase the operational difficulty of operating the fuel supply.

Biased switch 760 of FIG. 88 and ramp 766 can be reconfigured to automatically turn switch 760 on, while cartridge 725 is being inserted properly, as shown in FIG. 89b. In this embodiment, switch 760 is preferably biased to both the ON and to the OFF position, i.e., the biasing spring is biased in a diagonal direction relative to the right angle channel, so that after the switch is moved beyond the bend or elbow of the channel, finger actuation portion 764 is biased either to the ON or OFF position depending on the interaction with ramp 766. As cartridge 725 is inserted ramp 766 pushes switch 760 from the OFF position to the ON position.

Switch 760, as shown in FIGS. 85 and 86, can also be a mechanical switch, i.e., not electrically or magnetically connected to an electrical circuit illustrated in FIG. 87. In the ON position, finger actuation portion 764 of switch 760 is aligned with a relief or channel in the device or fuel cell so that portion 764 is not interfering with the walls of the device or fuel cell. In the OFF position, finger actuation portion 764 is not aligned with the relief or channel and is therefore interfering with the walls of the device or fuel cell. Hence, in the OFF position the cartridge cannot be inserted. The alignment of the finger actuation portion to a relief on the device is illustrated above with reference to FIG. 56b.

Figure 91:
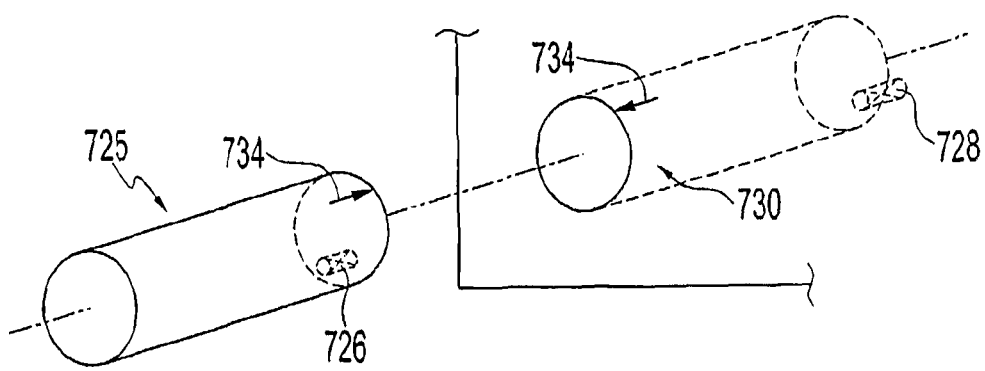
FIG. 91 is a partial schematic view of a cartridge and receptacle having corresponding magnetic valve.
Figure 92:
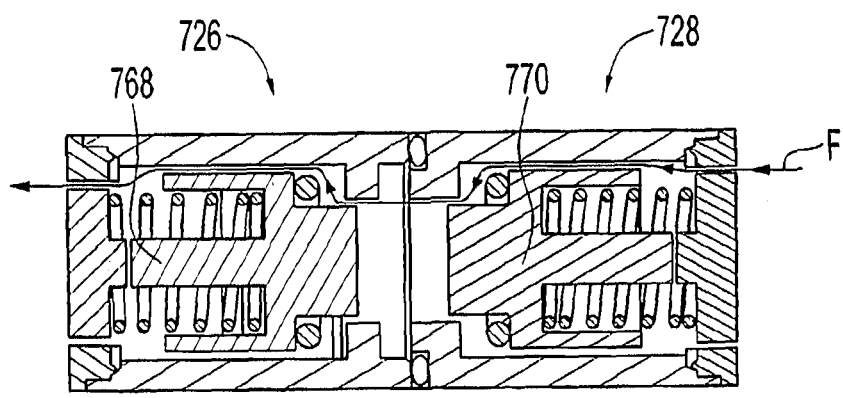
FIG. 92 is a cross-sectional view of the magnetic valves of FIG. 91.

Additionally, valve components containing magnetic materials can be used to increase the operational resistance of the fuel supply system. The embodiment shown in FIG. 91 is similar to the embodiment of FIG. 80, in that valve components 726 and 728 are eccentrically located. One difference is that these valve components do not need to physically contact each other to open a flow path, and preferably physical contact does not open a flow path therebetween. As shown in FIG. 92, at least one of the valve components is a check valve, i.e., having a spring-loaded plunger 768, 770 biased into a sealing relationship with an O-ring and sealing surface. In this case, plunger 768, 770 is made from a magnetic material. The magnetic forces in valve components 726 and 728 are selected to repel each other. In this embodiment, when the two valve components are properly aligned opposite to each other the magnetic force repel each other against the spring force to open a flow path in through the valve components.

Figure 93A:
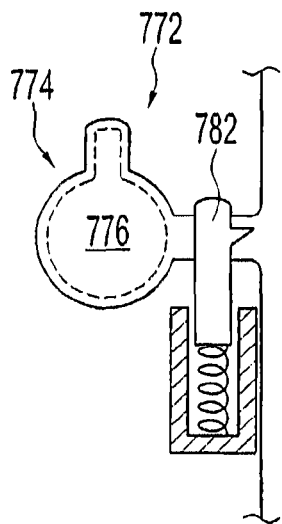
FIGS. 93A-C are schematic views of another receptacle in accordance with the present invention.
Figure 93B:
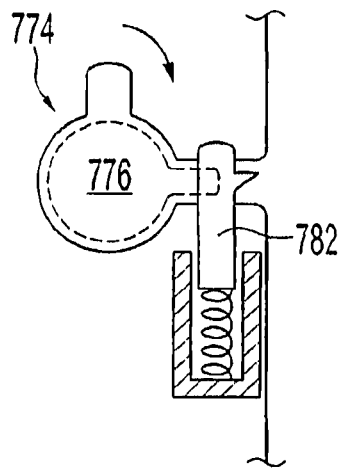
Figure 93C:
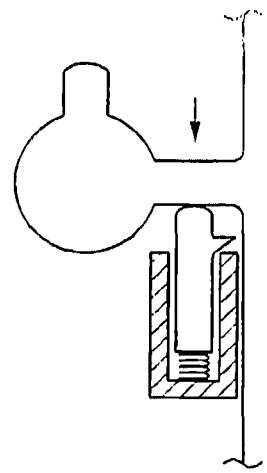
Figure 93D:
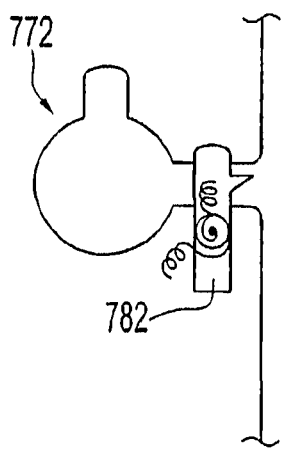
FIGS. 93D-E are schematic views of an alternative embodiment of the receptacle of FIGS. 93A-C.
Figure 93E:
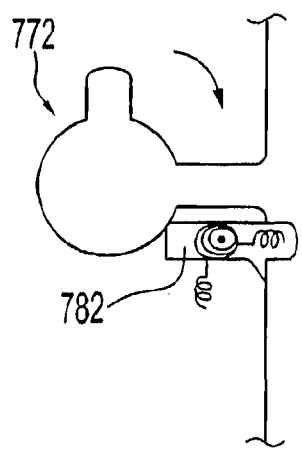
Figure 93F:
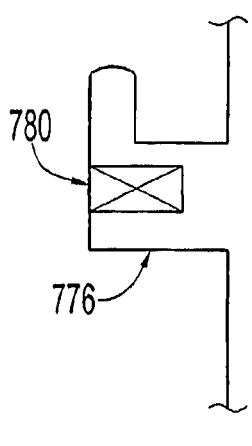
FIG. 93F is a partial side view of a cartridge usable with the receptacles of FIGS. 93A-E.

In yet another embodiment of the present invention, a cartridge can be inserted into a receptacle on the fuel cell or device after the cartridge or a latch on the cartridge is moved in multiple directions. On the other hand, to remove the cartridge a user only has to move the cartridge or the latch in one direction. One example of this embodiment is illustrated in FIGS. 93a-f, which is similar to the embodiment shown in FIGS. 17-24. Receptacle 772 has keyed entry 774, which is adapted to receive matching keyed connector 776 of cartridge 778. As shown in FIG. 93a, keyed connector 776 is aligned and inserted into keyed entry 774. Keyed connector 776 can have valve 780 and other electrical and mechanical connections. After insertion, cartridge 778 is rotated in the direction shown in FIG. 93b to lock cartridge 778 to receptacle 772. In the locking position, keyed connector 776 is kept in this position by the interference between keyed connector 776 and spring-loaded latch 782. Hence, at least two motions are necessary to insert the cartridge, i.e., alignment/insertion and rotation to lock. To remove the cartridge from the receptacle, latch 782 is depressed, as shown in FIG. 93c. Keyed connector 776 and the cartridge can now be removed. Preferably, receptacle 772 has a spring that is compressed when keyed connector 776 is inserted, so that when latch 782 is depressed the compressed spring pushes the cartridge out. Alternatively, spring-loaded latch 782 can be pivoted and rotated out of the interference position, as shown in FIGS. 93d and 93e. Only one motion is necessary to remove the cartridge.

Figure 94A:
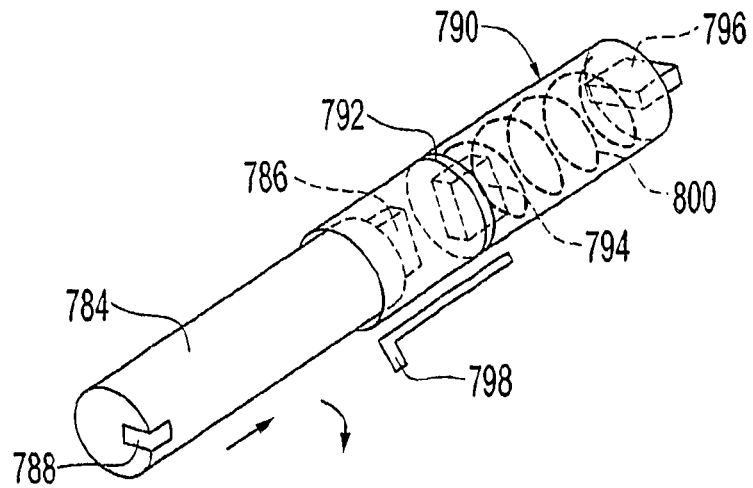
FIGS. 94A-B are schematic views of another embodiment of a cartridge and receptacle of the present invention.
Figure 94B:
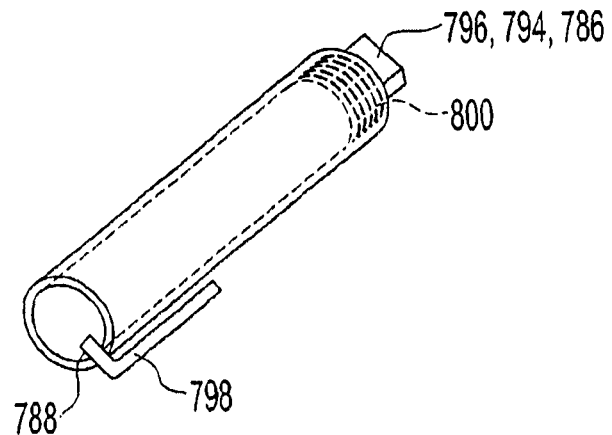

Another example of this concept is shown in FIGS. 94a-b. Cartridge 784 has key 786 at its front end and notch 788 at its back end as shown. Receptacle 790 has spring-biased front plate 792, which has front entry 794. Receptacle 790 further has back entry 796, which preferably is orientated at a different angle than front entry 794. Cartridge key 786 is sized and dimensioned to be received by front entry 794 on plate 792, and front entry 794 is sized and dimensioned to be received by back entry 796. To insert, cartridge 784 must be positioned so that keys 786 and 794 are aligned to each other. Then the cartridge is rotated as shown so that keys 794 and 796 are aligned. After cartridge 784 is fully inserted, latch 798 can be inserted into notch 788 to retain the cartridge. Preferably, latch 798 is rotatable into and out of the retaining position. The cartridge can be removed by moving latch 798 away from notch 788. Spring 800, which has been compressed and rotated during insertion, releases its stored energy and pushes (and rotates) cartridge 784 out of receptacle 790. Similar to the example shown in FIG. 93, the insertion requires multiple steps (alignment, insertion, rotation of cartridge and rotation of latch), and a single release motion (counter-rotation of latch).

The valve embodiment illustrated in FIGS. 6-15 can also be modified to require multiple motions for connection but a single motion for withdrawal. As best illustrated with FIGS. 12, 13 and 15, to connect valve component 240 to valve component 140 the two valve components are brought together along a linear line so that projecting pin 265 is received in groove section 160a. Then the two valve components are rotated relative to each other so that projecting pin 265 is received in groove section 160b. Separation of these two valve components requires movements in the reverse direction.

Figure 95:
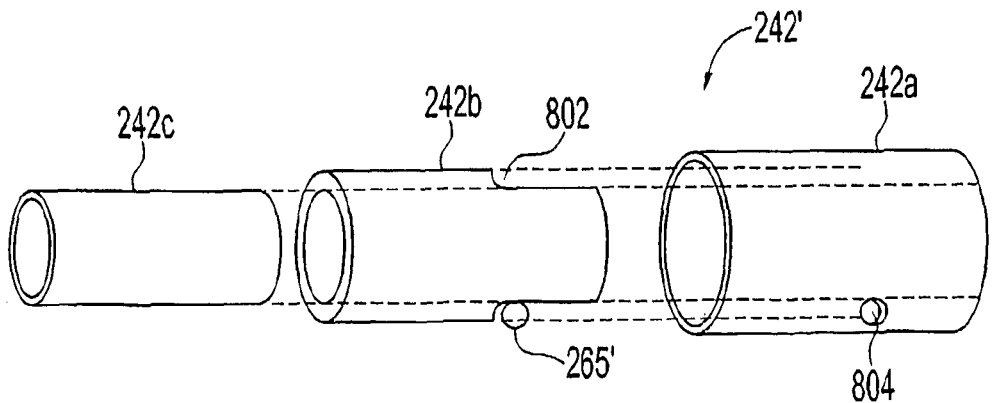
FIG. 95 is an exploded view of a modified housing of the valve component of FIGS. 10-11.
Figure 96:
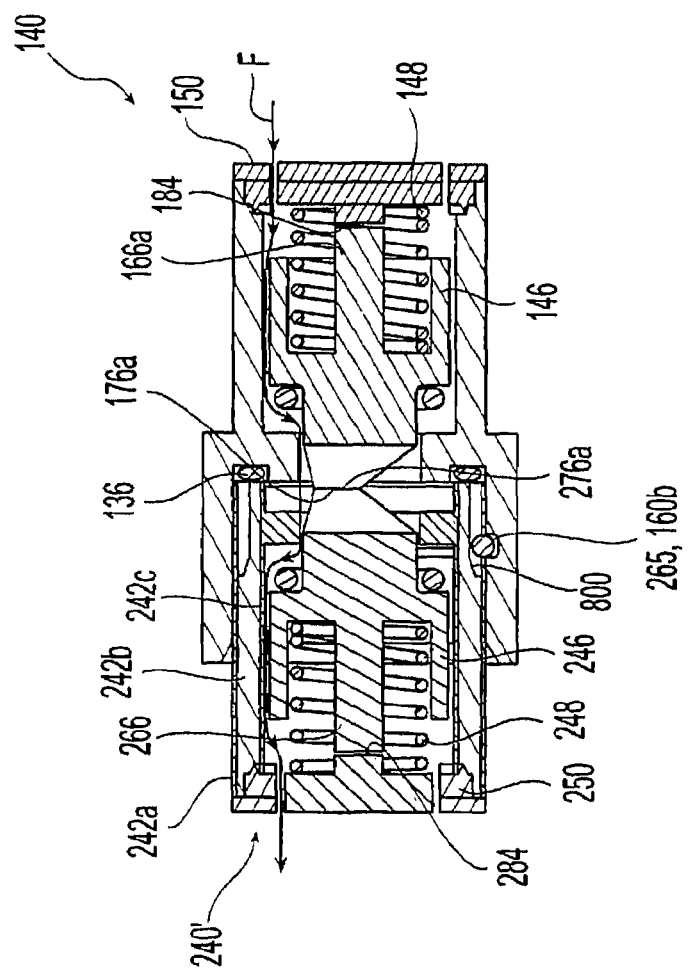
FIG. 96 is a cross-sectional view of the valve shown in FIG. 15 with the modified valve housing of FIG. 95.

As illustrated in FIG. 95, modified main housing 242' of valve component 240' comprises three concentric sleeves: outer sleeve 242a, middle sleeve 242b and inner sleeve 242c. All three sleeves are sized and dimensioned to fit concentrically within each other, as illustrated in FIG. 96. In this embodiment, projecting pin 265 is modified to be loose sphere 265', such as a ball bearing or a BB pellet. Middle sleeve 242b defines shoulder 802, which is adapted to receive sphere 265'. Middle sleeve 242b can be fixedly attached to end cap 250 for easy gripping. When middle sleeve 242b is inserted fully into outer sleeve 242a, sphere 265' partially protrudes from hole 804 on outer sleeve 242a and is retained by hole 804. The insertion of modified valve component 240' is similar to that described in FIGS. 12, 13 and 15, i.e., inward along the longitudinal direction and then a! rotation. To disconnect the two valve components, a user pulls on end cap 250, which pulls middle sleeve 242b outward. As soon as the end of middle sleeve 242b passes sphere 265', the sphere is no longer supported and drops into the void created between outer sleeve 242a and inner sleeve 242c. Sphere 265' is no longer in contact with groove 160, and valve components 140 and 240' can be readily separated from each other. Preferably, continuing pulling on end cap 250 should completely separate the two valve components. Alternatively, shoulder 802 can be replace by a channel 802 that is sized and dimensioned to guide sphere 265 toward hole 804.

In yet another embodiment, a valve of the present invention comprises corresponding valve components 806 and 808. These valve components are similar to the cooperating valve components discussed in the '006 and '949 parent applications and to corresponding valve component 140 and 240 discussed above, in that each valve component has a biased sealing plunger that is normally urged against a sealing surface and the valve component opens when the plunger is moved away from the sealing surface.

In this embodiment, at least one of the valve components 806, 808 has a plunger that cannot be moved away from the sealing surface, e.g., the plunger is locked until the plunger is first unlocked for example by rotating the plunger a predetermined amount. Preferably, this valve component is connected to the fuel supply so that it is more difficult to access the fuel in the fuel supply when the fuel supply is not attached to the electronic device or to the fuel cell.

Figure 97:
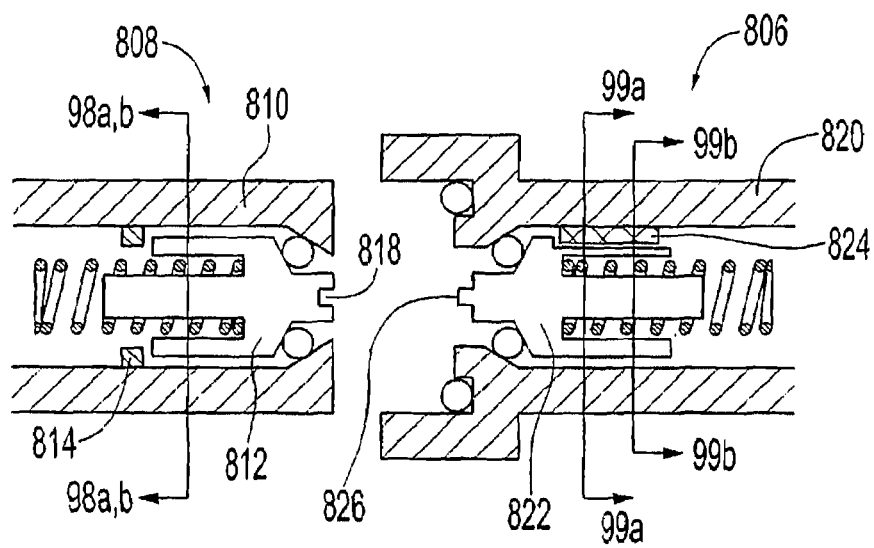
FIG. 97 is a cross sectional view of another valve in accordance to the present invention.
Figure 98A:
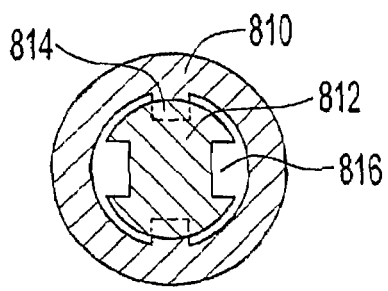
FIGS. 98A and 98B are cross sectional views along line 98a,b in FIG. 97.
Figure 98B:
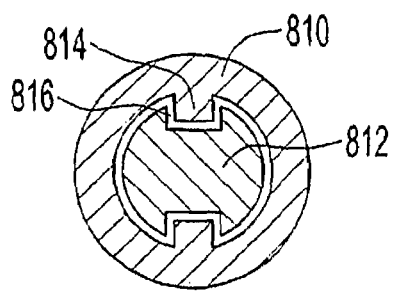

Referring to FIG. 97, valve component 808 comprises outer housing 810 and plunger 812 slidingly disposed therein. Plunger 812 is biased by a spring against a sealing surface as shown. The spring biases plunger 812 in the longitudinal direction as well as rotationally about the longitudinal direction to a normal position. In the normal position, as best illustrated in FIG. 98a, plunger 812 is locked or preventing from moving away from the sealing surface because stops 814 on housing 810 interferes with plunger 812. In order to open valve component 808, plunger 812 should be rotated until notches 816 are aligned with stops 814, as best illustrated in FIG. 98b. The spring that biases plunger 812 keeps the plunger in a sealing position until notches 816 align with stops 814 and plunger 812 moves backward away from the sealing surface. The amount of rotation required to open valve component 808 depends on the number and location of corresponding stops 814 and notches 816. Preferably, valve component 808 is attached to the fuel supply. Alternatively, stops 814 may be disposed on plunger 812 and notches 816 can be disposed on housing 810.

Figure 99A:
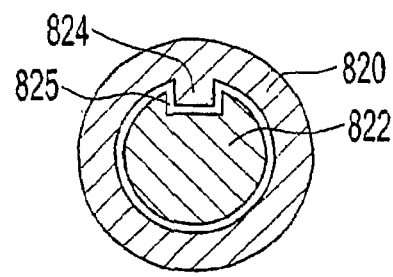
FIGS. 99A and 99B are cross sectional views along lines 99a and 99b in FIG. 97.
Figure 99B:
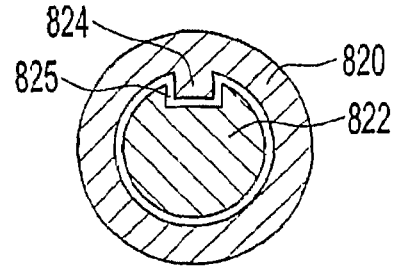

Plunger 812 has on its leading edge key 818, which is shaped and dimensioned to match to corresponding key 826 on plunger 822 of opposing valve component 806, as shown in FIG. 97. Preferably, plunger 822 does not rotate so that it can provide the anchoring while plunger 812 rotates to open. To that end, plunger 822 has channel 825 defined thereon and housing 820 of valve component 806 has ridge 824 that fits within channel 825, so that plunger 822 does not rotate relative to housing 820 and to plunger 812 when the two plungers are engaged, as best shown in FIGS. 99a and 99b. It is noted that ridge 824 does not need to extend the length of channel 825 as shown, but can be significantly shorter.

When the two plungers are engaged, the housing of the two valve components are movable relative to each other to align notch 816 to stop 814 valve component Plunger 822 is movable relative to housing 820 in the longitudinal direction to open valve component 806. Preferably, valve component 806 is attached to the fuel cell or to the device that the fuel cell powers. When valve components 806 and 808 are separated or more specifically when plungers 812 and 822 disengage from each other the spring biasing plunger 812 rotates plunger 812 back to the locking position. It is further noted that valve component 806 may not have a seal and is therefore always open, so long as valve component 802 has non-rotational key 826.

Similar to the embodiments described above, valve components 806 and 808 are movable in at least two directions relative to each other to connect to each other. More specifically, these two valve components are moved longitudinally toward each other and at least rotationally relative to each other to unlock before the valve components are connected to establish a flow path therebetween. Additionally, the longitudinal motion may occur after the rotational motion to open the valve component after unlocking same.

Additionally, stop 814 can be modified to yield when a force exceeding a predetermined level is applied to it. Hence, plunger 812 can also be moved to open valve component 808 without being unlocked. Stop 814 can be made from a yieldable material, such as polymers, or stop 814 can be a high force spring, similar to those described above. In this embodiment, valve component can be opened by rotating plunger 812 or by applying a high force to overcome stop 814.

While it is apparent that the illustrative embodiments of the invention disclosed herein fulfill the objectives stated above, it is appreciated that numerous modifications and other embodiments may be devised by those skilled in the art including combining different embodiments. Specifically, one or more elements of any embodiment can be used with or be interchanged with other elements in any other embodiments described herein.

Additionally, any child-resistant features for lighters disclosed in the patent literature or commercial products can be incorporated into the present invention. Such child-resistant lighter patents include, but are not limited to the ones assigned to the owner of the present invention:

| | | | |
|---|---|---|---|
| 4,758,152 | 5,427,522 | 5,642,993 | 6,046,528 |
| 4,773,849 | 5,431,558 | 5,655,902 | 6,065,958 |
| 4,830,603 | 5,435,719 | 5,735,294 | 6,077,069 |
| 4,889,482 | 5,427,522 | 5,769,098 | 6,077,070 |
| 5,002,482 | 5,445,518 | 5,823,765 | 6,095,799 |
| 5,092,764 | 5,456,598 | 5,833,448 | 6,206,689 |
| 5,096,414 | 5,483,978 | 5,854,530 | 6,382,960 |
| 5,120,215 | 5,487,657 | 5,927,962 | 6,386,860 |
| 5,125,829 | 5,520,197 | 5,934,895 | 6,488,492 |
| 5,215,458 | 5,584,682 | 5,957,680 | 6,491,515 |
| 5,262,697 | 5,628,627 | 5,980,239 | 6,527,546 |
| 5,417,563 | 5,636,979 | 6,045,354 | 6,726,469 |

Child-resistant lighter patents assigned to others are also suitable for use with the present invention. Non-limiting examples of these suitable patents include:

| | | | |
|---|---|---|---|
| 5,531,591 | 5,368,473 | 4,784,602 | 5,634,787 |
| 5,458,482 | 5,240,408 | 4,784,601 | 5,607,295 |
| 5,437,549 | 5,186,618 | 4,904,180 | 5,788,474 |
| 5,409,372 | 5,145,358 | 5,971,748 | 5,288,226 |
| 5,401,163 | 4,859,172 | 5,868,561 | |

The child-resistant features in all of these references are incorporated herein by reference in their entireties.

Additionally, child resistant features from the caps of hazardous cleaning containers or medicine bottles can be used with the present invention, and these child resistant caps are incorporated herein by reference in their entireties.

We claim:

1. A fuel cell system comprising:
   a receptacle having an outlet fluidly connected to a fuel cell;
   an actuator; and
   a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell, wherein the actuator is pivotally connected to the fuel supply and operatively associated with the valve, wherein when the actuator is depressed at a first end a second end of the actuator engages the valve
   wherein the receptacle further comprises a coupling member adapted to receive the valve and wherein during insertion the actuator is depressed by the receptacle.

2. The fuel cell system of claim 1, wherein the coupling member is pivotally connected to the receptacle.

3. A fuel cell system comprising:
   a receptacle having an outlet fluidly connected to a fuel cell;
   an actuator; and
   a fuel supply including a valve, wherein the fuel supply is removably connectable to the receptacle such that a flow path is selectively established between the valve and the outlet wherein the actuator is at least partially attached to the fuel supply and is connected to the valve, and the actuator selectively opens the valve to establish a flow path for a fuel stored in the fuel supply to be transported to the fuel cell;
   wherein the actuator is pivotally connected to the fuel supply and operatively associated with the valve;
   wherein when the actuator is depressed at a first end a second end of the actuator engages the valve;
   wherein the receptacle comprises a plunger that depresses the actuator at said first end when the fuel supply is inserted into the receptacle.

4. The fuel cell system of claim 3, wherein the plunger is biased by a spring, or comprises a spring.

5. The fuel cell system of claim 3, wherein the plunger is slidable relative to the receptacle to engage said first end, or the actuator is slidable relative to the fuel supply to engage the valve.

6. A fuel cell system comprising:
   a receptacle having an outlet fluidly connected to a fuel cell;
   an actuator; and
   a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell, and
   a latch operably associated with the actuator and is movable between an interfering position and a non-interfering position, wherein in the interfering position the latch increases the difficulty of actuating the valve and in the non-interfering position the actuator is movable to actuate the valve.

7. The fuel cell system of claim 6, wherein the latch is removably attached to the fuel supply and in the non-interfering position is separated from the fuel supply.

8. The fuel cell system of claim 7, wherein the latch is movable in at least two directions to be separated from the fuel supply.

9. The fuel cell system of claim 6, wherein the latch is movable in at least one direction to move between the interfering position and the non-interfering position.

10. The fuel cell system of claim 9, wherein said direction is
    (i) substantially parallel to the longitudinal direction of the fuel supply,
    (ii) substantially perpendicular to the longitudinal direction of the fuel supply, or
    (iii) substantially perpendicular to a line substantially parallel to a longitudinal axis of the fuel supply.

11. The fuel cell system of claim 9, wherein the latch is movable in at least two directions to move between the interfering position and the non-interfering position.

12. The fuel cell system of claim 11, wherein one of the two directions is
    (i) a direction substantially along the longitudinal direction of the fuel supply,
    (ii) a direction substantially perpendicular to the longitudinal direction of the fuel supply, or
    (iii) a direction substantially perpendicular to a line substantially parallel to a longitudinal axis of the fuel supply.

13. The fuel cell system of claim 11, wherein
    (i) a first direction is substantially perpendicular to the longitudinal direction and a second direction is substantially along the longitudinal direction of the fuel supply,
    (ii) a first direction is substantially toward a longitudinal axis of the fuel supply, or
    (iii) first direction is substantially perpendicular to a line substantially parallel to a longitudinal axis of the fuel supply and a second direction is substantially along the longitudinal direction of the fuel supply.

14. The fuel cell system of claim 9, wherein
    (i) said direction is a rotation about an axis,
    (ii) said direction is a pivotal motion about an axis, or
    (iii) said direction is a translational direction.

15. The fuel cell system of claim 6, wherein the latch is biased into the interfering position.

16. The fuel cell system of claim 15, wherein the latch comprises a live joint, and is bent into the non-interfering position.

17. The fuel cell system of claim 15, wherein the latch is supported by a spring.

18. The fuel cell system of claim 6, wherein the latch comprises a cam.

19. The fuel cell system of claim 6, wherein the latch is
    (i) pivotally attached to the fuel supply,
    (ii) is located at least partially within the fuel supply, or
    (iii) is located at least partially on the housing of the fuel supply.

20. A fuel cell system comprising:
    a receptacle having an outlet fluidly connected to a fuel cell;
    an actuator; and
    a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
    a latch operably associated with the actuator and is movable between an interfering position and a non-interfering position, wherein in the interfering position the latch increases the difficulty of actuating the valve and in the non-interfering position the actuator is movable to actuate the valve, wherein the latch comprises a user actuation portion spaced apart from an actuation portion of the actuator, such that two hands are necessary to simultaneously act on the latch user actuation portion and the actuator actuation portion.

21. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve,
a second latch, wherein each latch comprises a user actuation portion spaced apart from an actuation portion of the actuator, such that two fingers are necessary to simultaneously press the finger actuation portions to move the latches to the non-interfering position.

22. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve, wherein the latch comprises a first portion and a second portion, wherein the first portion comprises a user actuation portion and the second portion is movable between the interfering and non-interfering positions.

23. The fuel cell system of claim 22, wherein when the user actuation portion is actuated, the second latch portion is moved to the non-interfering position.

24. The fuel cell system of claim 23, wherein after the user actuation portion is actuated, the second latch portion is held in the non-interfering position.

25. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve, wherein the latch comprises a high force spring resisting the actuation of the actuator, such that in the interfering position the actuator is movable to move the valve to an open position when a force of at least about 3 kg is applied to the actuator.

26. The fuel cell system of claim 25, wherein the force is at least about 4 kg.

27. The fuel cell system of claim 26, wherein the force is at least about 5 kg.

28. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve, wherein the latch is moved to the non-interfering position before the fuel supply to the receptacle can be inserted.

29. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve, wherein the receptacle moves the latch to the non-interfering position when the fuel supply is received into the receptacle.

30. The fuel cell system of claim 29, wherein the receptacle comprises a detent to move the latch to the non-interfering position when the fuel supply is inserted into the receptacle.

31. The fuel cell system of claim 30, wherein the detent is spring-loaded.

32. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve, wherein the latch automatically moves to the interfering position when the fuel supply is withdrawn from the receptacle.

33. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
a latch operably associated with the actuator and is movable between an interfering position and a non-interfering position, wherein in the interfering position the latch increases the difficulty of actuating the valve and in the non-interfering position the actuator is movable to actuate the valve, wherein the receptacle comprises a detent to move the latch to the interfering position when the fuel supply is withdrawn from the receptacle.

34. A fuel cell system comprising:
a receptacle having an outlet fluidly connected to a fuel cell;
an actuator; and
a fuel supply including a valve, wherein the fuel supply is removably connectable to the receptacle such that a flow path is selectively established between the valve and the outlet, and the actuator selectively opens the valve to establish a flow path for a fuel stored in the fuel supply to be transported to the fuel cell,
wherein the receptacle comprises a first key and a second key wherein a spring is located between the first and second key and the fuel supply comprises a third key and wherein when the fuel supply is connected to the receptacle the third key fits within the second key and the second key fits within the first key.

35. The fuel cell system of claim 34, wherein when the fuel supply is not connected to the receptacle the first key and the second key are not connected to each other.

36. The fuel cell system of claim 35, wherein during the connection process the third key is inserted into the second key and then the fuel supply is rotated and pushed to compress said spring to insert the second key into the third key.

37. The fuel cell system of claim 36, wherein the receptacle further comprises a retainer to retain the fuel supply to the receptacle.

38. The fuel cell system of claim 37, wherein the retainer is movable to disconnect the fuel supply from the receptacle.

39. The fuel cell system of claim 37, the fuel supply is movable in at least two directions to connect to the receptacle and the fuel supply is movable in at least one direction to disconnect from the receptacle.

40. The fuel cell system of claim 35, wherein the compressed spring assists in the disconnection of the fuel supply from the receptacle.

* * * * *